(12) United States Patent
Asano et al.

(10) Patent No.: US 8,300,816 B2
(45) Date of Patent: Oct. 30, 2012

(54) INFORMATION PROCESSING UNIT, TERMINAL UNIT, INFORMATION PROCESSING METHOD, KEY GENERATION METHOD AND PROGRAM

(75) Inventors: Tomoyuki Asano, Tokyo (JP); Masafumi Kusakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 12/515,298

(22) PCT Filed: Oct. 3, 2007

(86) PCT No.: PCT/JP2007/069387
§ 371 (c)(1),
(2), (4) Date: May 18, 2009

(87) PCT Pub. No.: WO2008/059672
PCT Pub. Date: May 22, 2008

(65) Prior Publication Data
US 2010/0054465 A1    Mar. 4, 2010

(30) Foreign Application Priority Data

Nov. 16, 2006  (JP) ................................. 2006-310182
Nov. 16, 2006  (JP) ................................. 2006-310226

(51) Int. Cl.
*H04L 9/00* (2006.01)
(52) U.S. Cl. .......................................... 380/46; 380/279
(58) Field of Classification Search .................. 380/279, 380/46
See application file for complete search history.

(56) References Cited

U.S. PATENT DOCUMENTS

2004/0255049 A1*  12/2004  Italiano et al. ................ 709/250
2006/0015514 A1*   1/2006  Suga ............................. 707/100

FOREIGN PATENT DOCUMENTS

JP    2008-131072    6/2008
JP    2008-131079    6/2008

OTHER PUBLICATIONS

Yong Ho Hwang et al., "Efficient Broadcast Encryption Scheme with Log-Key Storage", CiteSeer. IST, 2005, pp. 1-13.

(Continued)

*Primary Examiner* — Cordelia Zecher
(74) *Attorney, Agent, or Firm* — Finnegan Henderson Farabow Garrett & Dunner LLP

(57) ABSTRACT

It relates to an information processing unit, a terminal unit, an information processing method, a key generation method and a program that enable reduction of the number of keys to be held by users and aims at providing an information processing unit capable of generating a directed-graph representing an encryption key generation logic to derive a set-key for encrypting a content or a content-key. The technique relates to a scheme that divides a set of user terminals into some subsets, allocates a set-key and an intermediate-key to each subset, and upon input of an intermediate-key correlated with a subset, outputs the set-key corresponding to the subset and the intermediate-key of the subset associated by the directed-edge. Further, it relates to a technique of replacing the directed-edge in the directed-graph with a shorter directed-edge. The effect of reducing the number of intermediate-keys held by each user is expected from the technique.

53 Claims, 29 Drawing Sheets

OTHER PUBLICATIONS

Nuttapong Attrapadung et al., "Subset Incremental Chain Based Broadcast Encryption with Shorter Ciphertext", Proceedings of Symposium on Information Theory and Its Applications, 28th, vol. 1, Nov. 20, 2005, pp. 57-60.

Notification of Reason(s) for Refusal corresponding to Japanese Patent Application No. 2006-310182 mailed Mar. 6, 2012, with English translation (16 pages).

Notification of Reason(s) for Refusal corresponding to Japanese Patent Application No. 2006-310226 mailed Mar. 6, 2012, with English translation (15 pages).

Hwang et al., "Efficient Broadcast Encryption Scheme with Log-Key Storage", Dept. of Electronic and Electrical Eng., POSTECH, Korea, Oct. 2005, pp. 1-15.

Attrapadung et al., "Subset Incremental Chain Based Broadcast Encryption with Shorter Ciphertext", The 28th Symposiumon Information Theory and Its Applications, Onna, Okinawa, Japan, Nov. 20-23, 2005, pp. 57-61.

Asano et al., "Subset Incremental Chain Based Broadcast; Encryption with Small Computational Overhead", The 2007 Symposium on Cryptography and Information Security, Saseba, Japan, Jan. 23-26, 2007, pp. 1-8.

* cited by examiner

FIG.18

| USER | (A) BASIC SCHEME (k=6) | (B) BASIC SCHEME (k=3) | (C) PRESENT INVENTION (k=6) | (D) DIFFERENCE BETWEEN BASIC SCHEME (k=6) AND PRESENT INVENTION (k=6) | (E) DIFFERENCE BETWEEN BASIC SCHEME (k=3) AND PRESENT INVENTION (k=6) |
|---|---|---|---|---|---|
| 1 | 1 | 1 | 1 | 0 | 0 |
| 2 | 7 | 7 | 7 | 0 | 0 |
| 3 | 8 | 7 | 8 | 0 | -1 |
| 4 | 10 | 6 | 8 | 2 | -2 |
| 5 | 8 | 7 | 7 | 1 | 0 |
| 6 | 12 | 11 | 10 | 2 | 1 |
| 7 | 11 | 11 | 9 | 2 | 2 |
| 8 | 11 | 8 | 7 | 4 | 1 |
| 9 | 8 | 6 | 6 | 2 | 0 |
| 10 | 12 | 11 | 11 | 1 | 0 |
| 11 | 13 | 11 | 10 | 3 | 1 |
| 12 | 13 | 9 | 11 | 2 | -2 |
| 13 | 11 | 7 | 8 | 3 | -1 |
| 14 | 13 | 10 | 12 | 1 | -2 |
| 15 | 12 | 10 | 10 | 2 | 0 |
| 16 | 10 | 6 | 7 | 3 | -1 |
| 17 | 8 | 6 | 6 | 2 | 0 |
| 18 | 12 | 11 | 11 | 1 | 0 |
| 19 | 13 | 11 | 12 | 1 | -1 |
| 20 | 13 | 9 | 9 | 4 | 0 |
| 21 | 13 | 10 | 10 | 3 | 0 |
| 22 | 15 | 13 | 11 | 4 | 2 |
| 23 | 14 | 13 | 12 | 2 | 1 |
| 24 | 12 | 9 | 9 | 3 | 0 |
| 25 | 11 | 9 | 7 | 4 | 2 |
| 26 | 13 | 13 | 10 | 3 | 3 |
| 27 | 14 | 13 | 11 | 3 | 2 |
| 28 | 12 | 10 | 9 | 3 | 1 |
| 29 | 12 | 8 | 9 | 3 | -1 |
| 30 | 12 | 10 | 10 | 2 | 0 |
| 31 | 11 | 10 | 9 | 2 | 1 |
| 32 | 7 | 5 | 5 | 2 | 0 |
| 33 | 7 | 5 | 5 | 2 | 0 |
| 34 | 11 | 10 | 10 | 1 | 0 |
| 35 | 12 | 10 | 11 | 1 | -1 |
| 36 | 12 | 8 | 9 | 3 | -1 |
| 37 | 12 | 10 | 10 | 2 | 0 |
| 38 | 14 | 13 | 12 | 2 | 1 |
| 39 | 13 | 13 | 11 | 2 | 2 |
| 40 | 11 | 9 | 8 | 3 | 1 |
| 41 | 12 | 9 | 9 | 3 | 0 |
| 42 | 14 | 13 | 12 | 2 | 1 |
| 43 | 15 | 13 | 11 | 4 | 2 |
| 44 | 13 | 10 | 10 | 3 | 0 |
| 45 | 13 | 9 | 10 | 3 | -1 |
| 46 | 13 | 11 | 12 | 1 | -1 |
| 47 | 12 | 11 | 11 | 1 | 0 |
| 48 | 8 | 6 | 6 | 2 | 0 |
| 49 | 10 | 6 | 7 | 3 | -1 |
| 50 | 12 | 10 | 10 | 2 | 0 |
| 51 | 13 | 10 | 12 | 1 | -2 |
| 52 | 11 | 7 | 8 | 3 | -1 |
| 53 | 13 | 9 | 10 | 3 | -1 |
| 54 | 13 | 11 | 10 | 3 | 1 |
| 55 | 12 | 11 | 11 | 1 | 0 |
| 56 | 8 | 6 | 6 | 2 | 0 |
| 57 | 11 | 8 | 7 | 4 | 1 |
| 58 | 11 | 11 | 9 | 2 | 2 |
| 59 | 12 | 11 | 10 | 2 | 1 |
| 60 | 8 | 7 | 7 | 1 | 0 |
| 61 | 10 | 6 | 8 | 2 | -2 |
| 62 | 8 | 7 | 8 | 0 | -1 |
| 63 | 7 | 7 | 7 | 0 | 0 |
| 64 | 2 | 2 | 2 | 0 | 0 |
| TOTAL NUMBER OF KEYS | 705 | 577 | 571 | 134 | 6 |
| AVERAGE NUMBER OF KEYS | 11.02 | 9.02 | 8.92 | 2.09 | 0.09 |
| MAXIMUM NUMBER OF KEYS | 15 | 13 | 12 | 3 | 1 |

FIG.27

| USER | (A) BASIC SCHEME | (B) PRESENT INVENTION | (C) DIFFERENCE BETWEEN BASIC SCHEME AND PRESENT INVENTION |
|---|---|---|---|
| 1 | 1 | 1 | 0 |
| 2 | 7 | 10 | -3 |
| 3 | 8 | 12 | -4 |
| 4 | 10 | 8 | 2 |
| 5 | 8 | 11 | -3 |
| 6 | 12 | 11 | 1 |
| 7 | 11 | 14 | -3 |
| 8 | 11 | 7 | 4 |
| 9 | 8 | 9 | -1 |
| 10 | 12 | 12 | 0 |
| 11 | 13 | 13 | 0 |
| 12 | 13 | 10 | 3 |
| 13 | 11 | 12 | -1 |
| 14 | 13 | 13 | 0 |
| 15 | 12 | 13 | -1 |
| 16 | 10 | 6 | 4 |
| 17 | 8 | 7 | 1 |
| 18 | 12 | 13 | -1 |
| 19 | 13 | 13 | 0 |
| 20 | 13 | 12 | 1 |
| 21 | 13 | 12 | 1 |
| 22 | 15 | 14 | 1 |
| 23 | 14 | 13 | 1 |
| 24 | 12 | 9 | 3 |
| 25 | 11 | 9 | 2 |
| 26 | 13 | 13 | 0 |
| 27 | 14 | 13 | 1 |
| 28 | 12 | 12 | 0 |
| 29 | 12 | 11 | 1 |
| 30 | 12 | 13 | -1 |
| 31 | 11 | 13 | -2 |
| 32 | 7 | 4 | 3 |
| 33 | 7 | 4 | 3 |
| 34 | 11 | 12 | -1 |
| 35 | 12 | 13 | -1 |
| 36 | 12 | 10 | 2 |
| 37 | 12 | 11 | 1 |
| 38 | 14 | 12 | 2 |
| 39 | 13 | 13 | 0 |
| 40 | 11 | 9 | 2 |
| 41 | 12 | 9 | 3 |
| 42 | 14 | 13 | 1 |
| 43 | 15 | 13 | 2 |
| 44 | 13 | 11 | 2 |
| 45 | 13 | 11 | 2 |
| 46 | 13 | 13 | 0 |
| 47 | 12 | 12 | 0 |
| 48 | 8 | 6 | 2 |
| 49 | 10 | 5 | 5 |
| 50 | 12 | 12 | 0 |
| 51 | 13 | 12 | 1 |
| 52 | 11 | 11 | 0 |
| 53 | 13 | 9 | 4 |
| 54 | 13 | 12 | 1 |
| 55 | 12 | 11 | 1 |
| 56 | 8 | 9 | -1 |
| 57 | 11 | 7 | 4 |
| 58 | 11 | 13 | -2 |
| 59 | 12 | 11 | 1 |
| 60 | 8 | 10 | -2 |
| 61 | 10 | 8 | 2 |
| 62 | 8 | 12 | -4 |
| 63 | 7 | 9 | -2 |
| 64 | 2 | 2 | 0 |
| TOTAL NUMBER OF KEYS | 705 | 668 | 37 |
| AVERAGE NUMBER OF KEYS | 11.02 | 10.44 | 0.58 |
| MAXIMUM NUMBER OF KEYS | 15 | 14 | 1 |

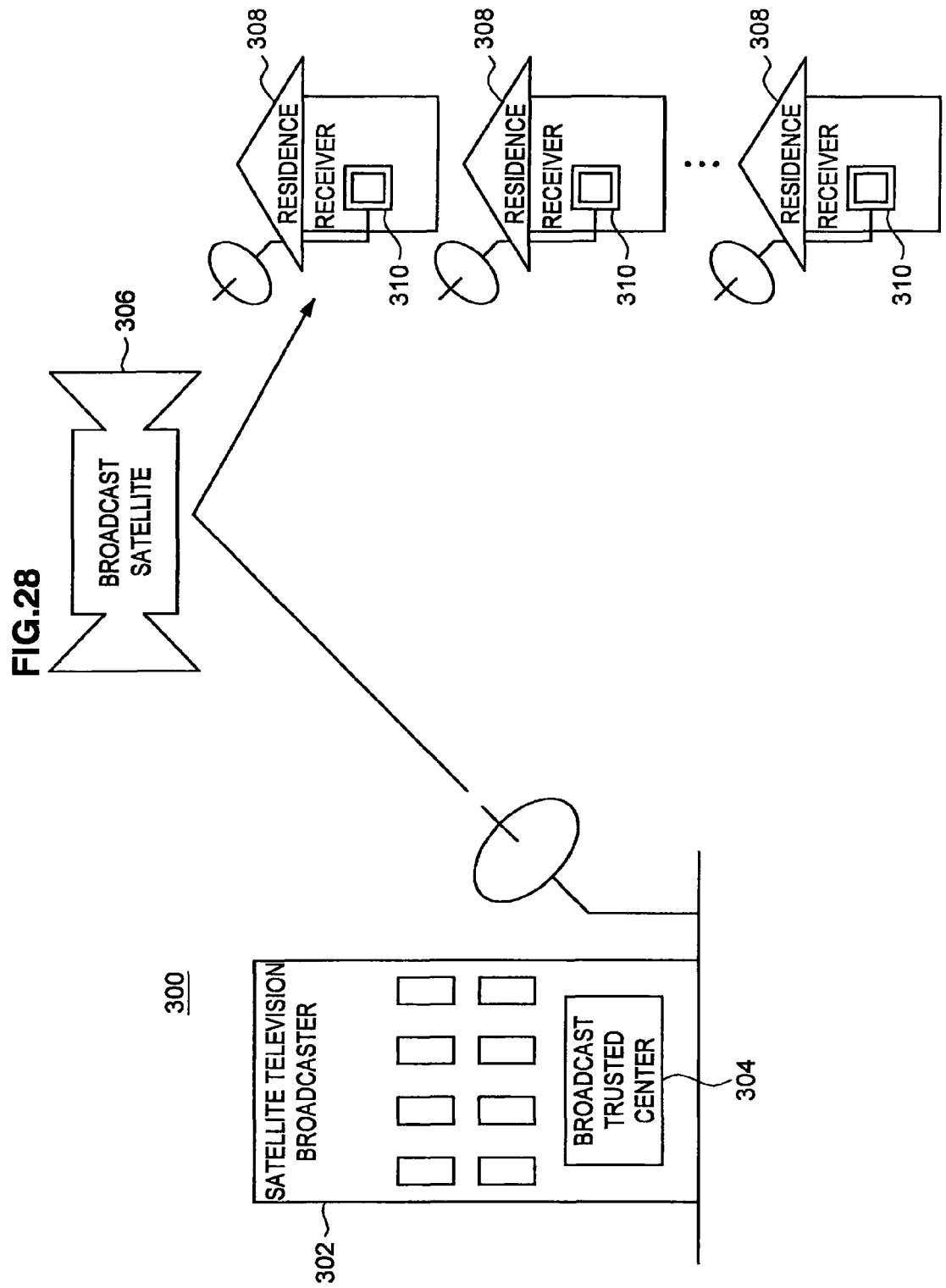

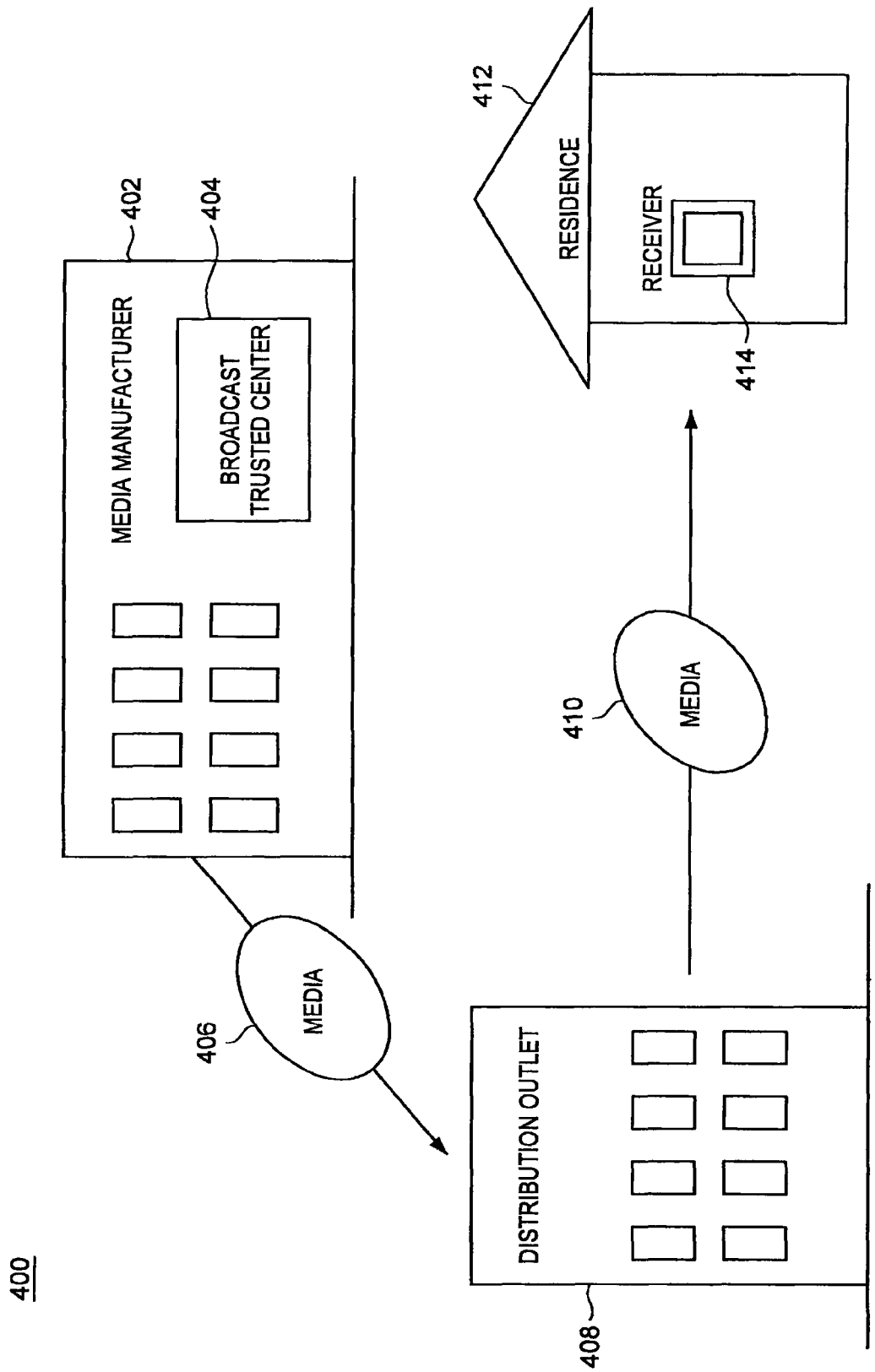

INFORMATION PROCESSING UNIT, TERMINAL UNIT, INFORMATION PROCESSING METHOD, KEY GENERATION METHOD AND PROGRAM

TECHNICAL FIELD

The present invention relates to an information processing unit, a terminal unit, an information processing method, a key generation method and a program.

BACKGROUND ART

Development of encryption technology related to contents distribution over a network or the like attracts a growing interest today. Particularly, a method of securely and efficiently distributing an encryption key for decrypting encrypted contents attracts a special attention. Generally, a mechanism is necessary in which there are n-number (n is a natural number of two or above) of recipients who have valid reception rights with respect to one distributor who distributes encrypted contents, and only the n-number of recipients among an infinite number of interceptors existing on the network can decrypt the encrypted contents. Further, because the number n of recipients who have the valid reception rights varies with time, there is a demand for a mechanism capable of flexibly dealing with a change in a set of recipients.

Furthermore, in the implementation of such a mechanism, the processing load related to generation, holding and distribution of an encryption key, encryption of contents and so on occurs in the distributor, and the processing load related to holding and reception of a decryption key, decryption of contents and so on occurs in the recipient as a matter of course. It is true that the load on the above-described encryption distribution processing load is relatively decreasing with various recent technological developments such as improvement in the throughput, the storage capacity or the like of an information processing device and improvement in the communication speed of an information transmission path. However, due to a drastic increase in the number of consumers of contents distribution services and a demand for the encryption technology that is secure enough to guard against skilled malicious interceptors, the processing load imposed by encryption distribution increases accordingly.

In such circumstances, as a technique to securely transmit information to a group of recipients arbitrarily selected by a distributor using a broadcast channel, schemes such as the revocation scheme and the broadcast encryption scheme have been proposed. One example of the broadcast encryption scheme is an encryption key distribution scheme which is disclosed in the following non-patent document 1, and a feature of the scheme is that an improvement in a key derivation path is made on the key distribution scheme using the existing hierarchical tree structure. Specifically, this scheme, in which a set of recipients is regarded as being divided into a plurality of subsets, creates a new subset by adding, to a certain subset, a recipient not included in the subset, and as a result of repeating this, creates a chain of subsets, and then derives an encryption key corresponding to each subset along the chain. It is thereby possible to reduce the number of keys to be held by a recipient, the amount of calculations to generate a decryption key and the traffic for key distribution.

[Non-patent document 1] Nuttapong Attrapadung and Hideki Imai, "Subset Incremental Chain Based Broadcast Encryption with Shorter Ciphertext", The 28th Symposium on Information Theory and Its Applications (SITA2005)

DISCLOSURE OF THE INVENTION

Problems to be Solved by the Invention

It is true that the encryption key distribution scheme according to the non-patent document 1 described above has a significant advantage compared to key distribution schemes such as the CD scheme (Complete Subtree scheme) and the SD scheme (Subset Difference scheme) according to related art. However, from a practical point of view assuming the implementation, there is a problem that the number of keys to be held by a terminal unit at the recipient's end and the amount of calculations necessary for content decryption are still large in the case where the number of recipients is large.

The present invention has been accomplished to solve the above problem and an object of the present invention is thus to provide a novel and improved information processing unit, a terminal unit, an information processing method, a key generation method and a program capable of reducing the number of keys to be held by a terminal unit at the recipient's end.

Means for Solving the Problems

In order to solve the above problems, according to an aspect of the present invention, there is provided an information processing unit that includes a directed graph acquisition section to acquire a directed graph generated by, in a temporary directed graph composed of a plurality of directed edges, replacing at least one of the directed edges constituting the temporary directed graph with a shorter directed edge; and a key generation section to generate a set key for encrypting or decrypting contents or a contents key based on the directed graph acquired by the directed graph acquisition section.

Further, in order to solve the above problems, according to an aspect of the present invention, there is provided an information processing unit, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j ($i \leq j$), it is assumed a set ($i \rightarrow j$) is notated as $\{\{i\}, \{i, i+1\}, \ldots, \{i, i+1, \ldots, j-1, j\}\}$, and a set ($i \leftarrow j$) is notated as $\{\{j\}, \{j, j-1\}, \ldots, \{j, j-1, \ldots, i+1, i\}\}$, a first horizontal coordinate axis correlated with the root node and having coordinate points correlated respectively with subsets included in a set ($1 \rightarrow n$) and arranged on a horizontal coordinate axis with a degree of inclusion increasing from left to right is set, a second horizontal coordinate axis correlated with the root node and having coordinate points correlated respectively with subsets included in a set ($2 \leftarrow n$) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set ($lv \rightarrow rv-1$) and arranged on a horizontal coordinate axis with a degree of inclusion increasing from left to right is set, and a fourth horizontal coordinate axis correlated with a certain intermediate node v and having coordinate points correlated respectively with subsets included in a set (lv+

1←rv) and arranged on a horizontal coordinate axis with a degree of inclusion increasing from right to left is set, the information processing unit including a directed graph acquisition section to acquire a directed graph generated by replacing at least one of the directed edges constituting a temporary directed graph formed by arranging a plurality of directed edges with a length of $n^{i/k}$ (i=0, 1, . . . , x−1) on the first to fourth horizontal coordinate axes according to a natural number x satisfying $n^{(x-1)/k} < (rv-lv+1) \leq n^{x/k}$ for a given integer k, with a shorter directed edge, and a key generation section to generate a set key for encrypting or decrypting contents or a contents key based on the directed graph acquired by the directed graph acquisition section.

Further, in order to solve the above problems, according to an aspect of the present invention, there is provided an information processing unit including a tree structure setting section to configure a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, . . . , {i, i+1, . . . , j−1, j}} and a set (i←j) as {{j}, {j, j−1}, . . . , {j, j−1, . . . , i+1, i}} for natural numbers i and j (i≦j), set a number assigned to a leaf node located at a left end as lv and a number assigned to a leaf node located at a right end as rv in a plurality of leaf nodes located lower than a certain intermediate node v or a certain root node v, further including a coordinate axis setting section to set a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, and place one temporary coordinate point each on left of a coordinate point located at a left end of the first to fourth horizontal coordinate axes and on right of a coordinate point located at a right end of the second to fourth horizontal coordinate axes, and set a coordinate point located at a right end of the first horizontal coordinate axis as a temporary coordinate point, further including a temporary directed graph generation section to generate temporary directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generate a temporary directed graph related to the set (1→n) by adding a directed edge with a length of 1 having a head at the coordinate point located at the right end of the first horizontal coordinate axis to the temporary directed graph related to the set (1→n−1), further including a longest directed path determination section to determine the longest directed path with the maximum number of directed edges constituting the directed path among the directed paths formed by the successive directed edges, and further including a directed graph generation section to generate a directed graph by replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the number of keys to be held by each user without increasing the worst value of the amount of calculations necessary for each user (terminal unit) to generate a decryption key at the time of decrypting distributed encrypted information.

The longest directed path determination section may determine the longest directed path in each temporary directed graph with respect to the respective temporary directed graphs not including the longest directed path among the temporary directed graphs related to the set (1→n), the set (2←n), the set (lv+1←rv) and the set (lv→rv−1). Further, the directed graph generation section may generate a directed graph by replacing the directed edge constituting each directed path with a shorter directed edge in such a way that the number of directed edges of each directed path does not exceed the number of directed edges of the longest directed path in each temporary directed graph for the respective temporary directed graphs.

The information processing unit may further include a key generation section to generate a set key for encrypting contents or a contents key based on the directed graph.

In response to input of an intermediate key t(S) for a subset S corresponding to a certain coordinate point in the directed graph, the key generation section may output the set key k(S) corresponding to the subset S corresponding to the coordinate point and intermediate keys t(S1), t(S2), . . . , t(Sk) for coordinate points S1, S2, . . . , Sk at heads of the directed edges having tails at the coordinate point S.

In response to input of a set key k(S) for a subset S corresponding to a certain coordinate point in the directed graph, the key generation section may output set keys k(S1), k(S2), . . . , k(Sk) for coordinate points S1, S2, . . . , Sk at heads of the directed edges having tails at the coordinate point S.

The information processing unit may further include an initial intermediate key setting section to set given random numbers as an intermediate key corresponding to a tail of each directed graph.

The information processing unit may further include an encryption section to encrypt contents or a contents key using the set key.

The information processing unit may further include a transmission section to transmit the contents or the contents key encrypted by the encryption section to terminal units correlated respectively with some or all of leaf nodes 1 to n (n is a natural number) constituting a given binary tree.

The directed graph acquisition section may replace the directed edges of the temporary directed graph in such a way that a shorter directed edge is placed toward an end of each directed path.

The information processing unit may further include a subset determination section to, defining a subset of the leaf nodes 1 to n as Si, determine a set (N\R) of the terminal units allowed to decrypt the contents encrypted using the set key or the contents key and determine m-number of subsets S1 to Sm satisfying the set (N\R)=S1∪S2∪ . . . ∪Sm.

The subset determination section may determine the subsets S1 to Sm so as to minimize the m.

The information processing unit may further include a transmission section to transmit information indicating the set (N\R) or information indicating the subsets S1 to Sm constituting the set (N\R) to the terminal units.

The information processing unit may further include a decryption section to decrypt contents or a content key using the set key.

The information processing unit may further include a reception section correlated with one or more leaf nodes 1 to n (n is a natural number) constituting a given binary tree, to receive contents or a contents key encrypted using the set key.

The encrypted contents or the encrypted contents key received by the reception section may be decrypted by one or more information processing units correlated with the leaf node being an element of a set S including the leaf node correlated with itself in a set Si defined as a subset of the leaf nodes 1 to n.

Further, in order to solve the above problems, according to another aspect of the present invention, there is provided a terminal unit that includes a key generation section to generate a set key for decrypting contents or a contents key based on a directed graph.

The directed graph referred to by the terminal unit is obtained by configuring a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, . . . , {i, i+1, . . . , j−1, j}} and a set (i←j) as {{j}, {j, j−1}, . . . , {j, j−1, . . . , i+1, i}} for natural numbers i and j (i≦j), setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, and placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point, generating temporary directed graphs respectively related to a set (1→n−1), the set (2←n), the set (lv+1←rv) and the set (lv→rv−1) by setting a given integer k, calculating a natural number x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, generating a temporary directed graph related to the set (1→n) by adding a directed edge with a length of 1 having a head at the coordinate point located at the right end of the first horizontal coordinate axis to the temporary directed graph related to the set (1→n−1), determining the longest directed path with the maximum number of directed edges constituting the directed path among directed paths formed by the successive directed edges, and replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the number of keys to be held by each user without increasing the worst value of the amount of calculations necessary for each user (terminal unit) to generate a decryption key at the time of decrypting distributed encrypted information.

The terminal unit may further include a decryption section to decrypt the encrypted contents or the encrypted contents key using the set key.

In response to input of an intermediate key t(S) for a subset S corresponding to a certain coordinate point in the directed graph, the key generation section may output the set key k(S) corresponding to the subset S corresponding to the coordinate point and intermediate keys t(S1), t(S2), . . . , t(Sk) for subsets S1, S2, . . . , Sk corresponding to coordinate points at heads of the directed edges having tails at the coordinate point.

In response to input of a set key k(S) for a subset S corresponding to a certain coordinate point in the directed graph, the key generation section may output set keys k(S1), k(S2), . . . , k(Sk) for coordinate points S1, S2, . . . , Sk at heads of the directed edges having tails at the coordinate point S.

The decryption section may decrypt the encrypted contents key using the set key and decrypt the encrypted contents using the decrypted contents key.

The terminal unit may further include a decision section to decide whether the terminal unit belongs to any of the subsets S1 to Sm based on the received information and decide whether decryption of the encrypted contents is allowed based on the decision result, where a subset of leaf nodes 1 to n of the tree is defined as Si, and when a set (N\R) of the terminal units allowed to decrypt the contents encrypted using the set key or the contents key is determined, m-number of subsets S1 to Sm satisfying the set (N\R)=S1∪S2∪ . . . ∪Sm are determined, and information indicating the set (N\R) or information indicating the subsets S1 to Sm constituting the set (N\R) is received.

When it is decided that the terminal unit belongs to any of the subsets S1 to Sm, the decryption section may decrypt the contents or the contents key using the set key corresponding to the subset to which the terminal unit belongs.

Further, in order to solve the above problems, according to yet another aspect of the present invention, there is provided an information processing method that includes a directed graph acquisition step to acquire a directed graph generated by, in a temporary directed graph composed of a plurality of directed edges, replacing at least one of the directed edges constituting the temporary directed graph with a shorter directed edge, and a key generation step to generate a set key for encrypting or decrypting contents or a contents key based on the directed graph acquired by the directed graph acquisition section.

Further, in order to solve the above problems, according to yet another aspect of the present invention, there is provided an information processing method, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j ($i \leq j$), it is assumed a set (i→j) is notated as $\{\{i\}, \{i, i+1\}, \ldots, \{i, i+1, \ldots, j-1, j\}\}$, and a set (i←j) is notated as $\{\{j\}, \{j, j-1\}, \ldots, \{j, j-1, \ldots, i+1, i\}\}$, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, the information processing method including a directed graph acquisition step of acquiring a directed graph generated by replacing at least one of the directed edges constituting a temporary directed graph formed by arranging a plurality of directed edges with a length of $n^{i/k}$ (i=0, 1, . . . , x−1) on the first to fourth horizontal coordinate axes according to a natural number x satisfying $n^{(x-1)/k} < (rv-lv+1) \leq n^{x/k}$ for a given integer k, with a shorter directed edge; and a key generation step of generating a set key for encrypting or decrypting contents or a contents key based on the directed graph acquired by the directed graph acquisition section.

Further, in order to solve the above problems, according to yet another aspect of the present invention, there is provided an information processing method that includes a tree structure setting step of configuring a binary tree made up of n-number of leaf nodes to which numbers 1 to n (n is a natural number) are assigned, a root node and a plurality of intermediate nodes different from the root node and the leaf nodes, and, defining a set (i→j) as $\{\{i\}, \{i, i+1\}, \ldots, \{i, i+1, \ldots, j-1, j\}\}$ and a set (i←j) as $\{\{j\}, \{j, j-1\}, \ldots, \{j, j-1, \ldots, i+1, i\}\}$ for natural numbers i and j ($i \leq j$), setting a number assigned to a leaf node located at a left end as lv and a number assigned to a leaf node located at a right end as rv in a plurality of leaf nodes located lower than a certain intermediate node v or a certain root node v; a coordinate axis setting step of setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, and placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point; a temporary directed graph generation step of generating temporary directed graphs respectively related to a set (1→n−1), the set (2←n), the set (lv+1←rv) and the set (lv→rv−1) by setting a given integer k, calculating a natural number x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generating a temporary directed graph related to the set (1→n) by adding a directed edge with a length of 1 having a head at the coordinate point located at the right end of the first horizontal coordinate axis to the temporary directed graph related to the set (1→n−1); a longest directed path determination step of determining the longest directed path with the maximum number of directed edges constituting the directed path among the directed paths formed by the successive directed edges; and a directed graph generation step of generating a directed graph by replacing the directed included in a set (lv+1←rv) and arranged on a horizontal coordinate axis with a degree of inclusion increasing from right to left, and placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point; a temporary directed graph generation step of generating temporary directed graphs respectively related to a set $(1 \rightarrow n-1)$, the set $(2 \leftarrow n)$, the set $(lv+1 \leftarrow rv)$ and the set $(lv \rightarrow rv-1)$ by setting a given integer k, calculating a natural number x satisfying $n^{(x-1)/k} < (rv-lv+1) \leq n^{x/k}$, and for each of integer $i=0$ to $x-1$, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generating a temporary directed graph related to the set $(1 \rightarrow n)$ by adding a directed edge with a length of 1 having a head at the coordinate point located at the right end of the first horizontal coordinate axis to the temporary directed graph related to the set $(1 \rightarrow n-1)$; a longest directed path determination step of determining the longest directed path with the maximum number of directed edges constituting the directed path among the directed paths formed by the successive directed edges; and a directed graph generation step of generating a directed graph by replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the number of keys to be held by each user without increasing the worst value of the amount of calculations necessary for each user (terminal unit) to generate a decryption key at the time of decrypting distributed encrypted information.

Further, in order to solve the above problems, according to yet another aspect of the present invention, there is provided a key generation method that includes a key generation step of generating a set key for decrypting contents or a contents key based on a directed graph.

The directed graph used for the key generation method is obtained by configuring a binary tree made up of n-number of leaf nodes to which numbers 1 to n (n is a natural number) are assigned, a root node and a plurality of intermediate nodes different from the root node and the leaf nodes, and, defining a set $(i \rightarrow j)$ as $\{\{i\}, \{i, i+1\}, \ldots, \{i, i+1, \ldots, j-1, j\}\}$, and a set $(i \leftarrow j)$ as $\{\{j\}, \{j, j-1\}, \ldots, \{j, j-1, \ldots, i+1, i\}\}$ for natural numbers i and j $(i \leq j)$, setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set $(1 \rightarrow n)$ and arranged on a horizontal coordinate axis with a degree of inclusion increasing from left to right, a second horizontal coordinate axis correlated with the root node and having coordinate points correlated respectively with subsets included in a set $(2 \leftarrow n)$ and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set $(lv \rightarrow rv-1)$ and arranged on a horizontal coordinate axis with a degree of inclusion increasing from left to right, and a fourth horizontal coordinate axis correlated with a certain intermediate node v and having coordinate points correlated respectively with subsets included in a set $(lv+1 \leftarrow rv)$ and arranged on a horizontal coordinate axis with a degree of inclusion increasing from right to left, placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point, generating temporary directed graphs respectively related to a set $(1 \rightarrow n-1)$, the set $(2 \leftarrow n)$, the set $(lv+1 \leftarrow rv)$ and the set $(lv \rightarrow rv-1)$ by setting a given integer k, calculating a natural number x satisfying $n^{(x-1)/k} < (rv-lv+1) \leq n^{x/k}$, and for each of integer $i=0$ to $x-1$, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, generating a temporary directed graph related to the set $(1 \rightarrow n)$ by adding a directed edge with a length of 1 having a head at the coordinate point located at the right end of the first horizontal coordinate axis to the temporary directed graph related to the set $(1 \rightarrow n-1)$, determining the longest directed path with the maximum number of directed edges constituting the directed path among directed paths formed by the successive directed edges, and replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the number of keys to be held by each user without increasing the worst value of the amount of calculations necessary for each user (terminal unit) to generate a decryption key at the time of decrypting distributed encrypted information.

Further, in order to solve the above problems, according to yet another aspect of the present invention, there is provided a program causing a computer to implement a tree structure setting function of configuring a binary tree made up of n-number of leaf nodes to which numbers 1 to n (n is a natural number) are assigned, a root node and a plurality of intermediate nodes different from the root node and the leaf nodes, and, defining a set $(i \rightarrow j)$ as $\{\{i\}, \{i, i+1\}, \ldots, \{i, i+1, \ldots, j-1, j\}\}$ and a set $(i \leftarrow j)$ as $\{\{j\}, \{j, j-1\}, \ldots, \{j, j-1, \ldots, i+1, i\}\}$ for natural numbers i and j $(i \leq j)$, setting a number assigned to a leaf node located at a left end as lv and a number assigned to a leaf node located at a right end as rv in a plurality of leaf nodes located lower than a certain intermediate node v or a certain root node v; a coordinate axis setting function of setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, and placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point; a temporary directed graph generation function of generating temporary directed graphs respectively related to a set (1→n−1), the set (2←n), the set (lv+1←rv) and the set (lv→rv−1) by setting a given integer k, calculating a natural number x satisfying $n^{(x-1)/k}<(rv-lv+1)\leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generating a temporary directed graph related to the set (1→n) by adding a directed edge with a length of 1 having a head at the coordinate point located at the right end of the first horizontal coordinate axis to the temporary directed graph related to the set (1→n−1); a longest directed path determination function of determining the longest directed path with the maximum number of directed edges constituting the directed path among the directed paths formed by the successive directed edges; and a directed graph generation function of generating a directed graph by replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the number of keys to be held by each user without increasing the worst value of the amount of calculations necessary for each user (terminal unit) to generate a decryption key at the time of decrypting distributed encrypted information.

Further, in order to solve the above problems, according to yet another aspect of the present invention, there is provided a program causing a computer to implement a key generation function of generating a set key for decrypting contents or a contents key based on a directed graph.

The directed graph according to the program is obtained by configuring a binary tree made up of n-number of leaf nodes to which numbers 1 to n (n is a natural number) are assigned, a root node and a plurality of intermediate nodes different from the root node and the leaf nodes, and, defining a set (i→j) as $\{\{i\}, \{i, i+1\}, \ldots, \{i, i+1, \ldots, j-1, j\}\}$, and a set (i←j) as $\{\{j\}, \{j, j-1\}, \ldots, \{j, j-1, \ldots, i+1, i\}\}$ for natural numbers i and j (i≦j), setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point, generating temporary directed graphs respectively related to a set (1→n−1), the set (2←n), the set (lv+1←rv) and the set (lv→rv−1) by setting a given integer k, calculating a natural number x satisfying $n^{(x-1)/k}<(rv-lv+1)\leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, generating a temporary directed graph related to the set (1→n) by adding a directed edge with a length of 1 having a head at the coordinate point located at the right end of the first horizontal coordinate axis to the temporary directed graph related to the set (1→n−1), determining the longest directed path with the maximum number of directed edges constituting the directed path among directed paths formed by the successive directed edges, and replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the number of keys to be held by each user without increasing the worst value of the amount of calculations necessary for each user (terminal unit) to generate a decryption key at the time of decrypting distributed encrypted information.

Further, in order to solve the above problems, according to an aspect of the present invention, there is provided an information processing unit that includes a directed graph acquisition section to acquire a directed graph generated by, in a temporary directed graph composed of a plurality of directed edges, leaving longer directed edges among the plurality of directed edges constituting the temporary directed graph and replacing at least one of the left directed edges with a shorter directed edge, and a key generation section to generate a set key for encrypting or decrypting contents or a contents key based on the directed graph acquired by the directed graph acquisition section.

Further, in order to solve the above problems, according to an aspect of the present invention, there is provided an information processing unit to process a temporary directed graph formed by arranging a plurality of directed edges with a length of $n^{i/k}$ (i=0, 1, ..., x−1) on first to fourth horizontal coordinate axes according to a natural number x satisfying $n^{(x-1)/k} < (rv-lv+1) \leq n^{x/k}$ for a given integer k, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≦j), it is assumed a set (i→j) is notated as {{i}, {i, i+1}, ..., {i, i+1, ..., j−1, j}}, and a set (i←j) is notated as {{j}, {j, j−1}, ..., {j, j−1, ..., i+1, i}}, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, the information processing unit including a temporary directed graph acquisition section to acquire the temporary directed graph, a directed graph generation section to generate a directed graph by leaving a longer directed edge among a plurality of directed edges constituting the temporary directed graph acquired by the temporary directed graph acquisition section, a longest directed path determination section to determine a maximum number of the successive directed edges among the plurality of directed edges constituting the directed graph, a directed edge replacement section to reconstruct the directed graph by replacing at least one directed edge constituting the directed graph with a shorter directed edge so as not to exceed the maximum number of the successive directed edges, and a key generation section to generate a set key for encrypting contents or a contents key based on the directed graph reconstructed by the directed edge replacement section.

Further, in order to solve the above problems, according to an aspect of the present invention, there is provided an information processing unit that includes a tree structure setting section to configure a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, ..., {i, i+1, ..., j−1, j}} and a set (i←j) as {{j}, {j, j−1}, ..., {j, j−1, ..., i+1, i}} for natural numbers i and j (i≦j), set a number assigned to a leaf node located at a left end as lv and a number assigned to a leaf node located at a right end as rv in a plurality of leaf nodes located lower than a certain intermediate node v or a certain root node v; a coordinate axis setting section to set a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, place two temporary coordinate points each on right of a coordinate point located at a right end of the third horizontal coordinate axis and on left of a coordinate point located at a left end of the second and fourth horizontal coordinate axes, and set a coordinate point located at a right end of the first horizontal coordinate axis as a first temporary coordinate point and place a second temporary coordinate point on right of the first temporary coordinate point; a temporary directed graph generation section to generate temporary directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generate a temporary directed graph related to the set (1→n) by adding a directed edge with a length of 1 having a head at the first temporary coordinate point on the first horizontal coordinate axis to the temporary directed graph related to the set (1→n−1); a longest directed path determination section to determine the longest directed path with the maximum number of directed edges constituting the directed path among the directed paths formed by the successive directed edges; and a directed graph generation section to generate a directed graph by replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key and reduction of the number of keys to be held by each user at the time of decrypting distributed encrypted information.

The longest directed path determination section may determine the longest directed path in each temporary directed graph with respect to the respective temporary directed graphs not including the longest directed path among the temporary directed graphs related to the set (1→n), the set (2←n), the set (lv+1←rv) and the set (lv→rv−1). Further, the directed graph generation section may generate a directed graph by replacing the directed edge constituting each directed path with a shorter directed edge in such a way that the number of directed edges of each directed path does not exceed the number of directed edges of the longest directed path in each temporary directed graph for the respective temporary directed graphs.

The information processing unit may further include a key generation section to generate a set key for encrypting contents or a contents key based on the directed graph.

In response to input of an intermediate key t(S) for a subset S corresponding to a certain coordinate point in the directed graph, the key generation section may output the set key k(S) corresponding to the subset S corresponding to the coordinate point and intermediate keys t(S1), t(S2), . . . , t(Sk) for coordinate points S1, S2, . . . , Sk at heads of the directed edges having tails at the coordinate point S.

In response to input of a set key k(S) for a subset S corresponding to a certain coordinate point in the directed graph, the key generation section may output set keys k(S1), k(S2), . . . , k(Sk) for coordinate points S1, S2, . . . , Sk at heads of the directed edges having tails at the coordinate point S.

The information processing unit may further include an encryption section to encrypt contents or a contents key using the set key.

The information processing unit may further include a transmission section to transmit the contents or the contents key encrypted by the encryption section to terminal units correlated respectively with some or all of leaf nodes 1 to n (n is a natural number) constituting a given binary tree.

The directed graph acquisition section may replace the directed edges of the temporary directed graph in such a way that a shorter directed edge is placed toward an end of each directed path.

The information processing unit may further include a subset determination section to, defining a subset of the leaf nodes 1 to n as Si, determine a set (N\R) of the terminal units allowed to decrypt the contents encrypted using the set key or the contents key and determine m-number of subsets S1 to Sm satisfying the set (N\R)=S1∪S2∪ . . . ∪Sm so as to minimize the m.

The information processing unit may further include a transmission section to transmit information indicating the set (N\R) or information indicating the subsets S1 to Sm constituting the set (N\R) to the terminal units.

The information processing unit may further include a decryption section to decrypt contents or a content key using the set key.

The information processing unit may further include a reception section correlated with one or more leaf nodes 1 to n (n is a natural number) constituting a given binary tree, to receive contents or a contents key encrypted using the set key.

The encrypted contents or the encrypted contents key received by the reception section may be decrypted by one or more information processing units correlated with the leaf node being an element of a set S including the leaf node correlated with itself in a set Si defined as a subset of the leaf nodes 1 to n.

Further, in order to solve the above problems, according to another aspect of the present invention, there is provided a terminal unit that includes a key generation section to generate a set key for decrypting contents or a contents key based on a directed graph. The directed graph is obtained by configuring a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, . . . , {i, i+1, . . . , j−1, j}} and a set (i←j) as {{j}, {j, j−1}, . . . , {j, j−1, . . . , i+1, i}} for natural numbers i and j (i≦j), setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating temporary directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, generating a temporary directed graph related to the set $(1 \to n)$ by adding a directed edge with a length of 1 having a head at the first temporary coordinate point on the first horizontal coordinate axis to the temporary directed graph related to the set $(1 \to n-1)$, determining the longest directed path with the maximum number of directed edges constituting the directed path among directed paths formed by the successive directed edges, and replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key and reduction of the number of keys to be held by each user at the time of decrypting distributed encrypted information.

In response to input of an intermediate key t(S) for a subset S corresponding to a certain coordinate point in the directed graph, the key generation section may output the set key k(S) corresponding to the subset S corresponding to the coordinate point and intermediate keys t(S1), t(S2), . . . , t(Sk) for subsets S1, S2, . . . , Sk corresponding to coordinate points at heads of the directed edges having tails at the coordinate point.

In response to input of a set key k(S) for a subset S corresponding to a certain coordinate point in the directed graph, the key generation section may output set keys k(S1), k(S2), . . . , k(Sk) for coordinate points S1, S2, . . . , Sk at heads of the directed edges having tails at the coordinate point S.

The terminal unit may further include a decryption section to decrypt the encrypted contents key using the set key and decrypt the encrypted contents using the decrypted contents key.

The terminal unit may further include a decision section to decide whether the terminal unit belongs to any of the subsets S1 to Sm based on the received information and decide whether decryption of the encrypted contents is allowed based on the decision result, where a subset of leaf nodes 1 to n of the tree is defined as Si, and when a set (N\R) of the terminal units allowed to decrypt the contents encrypted using the set key or the contents key is determined, m-number of subsets S1 to Sm satisfying the set (N\R)=S1∪S2∪ . . . ∪Sm are determined, and information indicating the set (N\R) or information indicating the subsets S1 to Sm constituting the set (N\R) is received. When it is decided that the terminal unit belongs to any of the subsets S1 to Sm, the decryption section may decrypt the contents or the contents key using the set key corresponding to the subset to which the terminal unit belongs.

Further, in order to solve the above problems, according to yet another aspect of the present invention, there is provided an information processing method that includes a directed graph acquisition step of acquiring a directed graph generated by, in a temporary directed graph composed of a plurality of directed edges, leaving longer directed edges among the plurality of directed edges constituting the temporary directed graph and replacing at least one of the left directed edges with a shorter directed edge, and a key generation step of generating a set key for encrypting or decrypting contents or a contents key based on the directed graph acquired by the directed graph acquisition section.

Further, in order to solve the above problems, according to yet another aspect of the present invention, there is provided an information processing method to process a temporary directed graph formed by arranging a plurality of directed edges with a length of $n^{i/k}$ (i=0, 1, . . . , x−1) on first to fourth horizontal coordinate axes according to a natural number x satisfying $n^{(x-1)/k} < (rv-lv+1) \leq n^{x/k}$ for a given integer k, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≦j), it is assumed a set (i→j) is notated as {{i}, {i, i+1}, . . . , {i, i+1, . . . , j−1, j}}, and a set (i←j) is notated as {{j}, {j, j−1}, . . . , {j, j−1, . . . , i+1, i}}, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, the information processing method including a temporary directed graph acquisition step of acquiring the temporary directed graph, a directed graph generation step of generating a directed graph by leaving a longer directed edge among a plurality of directed edges constituting the temporary directed graph acquired by the temporary directed graph acquisition section, a longest directed path determination step of determining a maximum number of the successive directed edges among the plurality of directed edges constituting the directed graph, a directed edge replacement step of reconstructing the directed graph by replacing at least one directed edge constituting the directed graph with a shorter directed edge so as not to exceed the maximum number of the successive directed edges, and a key generation step of generating a set key for encrypting contents or a contents key based on the directed graph reconstructed by the directed edge replacement section.

Further, in order to solve the above problems, according to yet another aspect of the present invention, there is provided an information processing method that includes a tree structure setting step of configuring a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, . . . , {i, i+1, . . . , j−1, j}} and a set (i←j) as {{j}, {j, j−1}, . . . , {j, j−1, . . . , i+1, i}} for natural numbers i and j (i≦j), setting a number assigned to a leaf node located at a left end as lv and a number assigned to a leaf node located at a right end as rv in a plurality of leaf nodes located lower than a certain intermediate node v or a certain root node v; a coordinate axis setting step of setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, and setting a coordinate point located at a right end of the first horizontal coordinate axis as a first temporary coordinate point and placing a second temporary coordinate point on right of the first temporary coordinate point; a temporary directed graph generation step of generating temporary directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generating a temporary directed graph related to the set (1→n) by adding a directed edge with a length of 1 having a head at the first temporary coordinate point on the first horizontal coordinate axis to the temporary directed graph related to the set (1→n−1); a longest directed path determination step of determining the longest directed path with the maximum number of directed edges constituting the directed path among the directed paths formed by the successive directed edges; and a directed graph generation step of generating a directed graph by replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key and reduction of the number of keys to be held by each user at the time of decrypting distributed encrypted information.

Further, in order to solve the above problems, according to yet another aspect of the present invention, there is provided a key generation method that includes a key generation step of generating a set key for decrypting contents or a contents key based on a directed graph. The directed graph is obtained by configuring a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, . . . , {i, i+1, . . . , j−1, j}}, and a set (i←j) as {{j}, {j, j−1}, . . . , {j, j−1, . . . , i+1, i}} for natural numbers i and j (i≦j), setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating temporary directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, generating a temporary directed graph related to the set (1→n) by adding a directed edge with a length of 1 having a head at the first temporary coordinate point on the first horizontal coordinate axis to the temporary directed graph related to the set (1→n−1), determining the longest directed path with the maximum number of directed edges constituting the directed path among directed paths formed by the successive directed edges, and replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key and reduction of the number of keys to be held by each user at the time of decrypting distributed encrypted information.

Further, in order to solve the above problems, according to yet another aspect of the present invention, there is provided a program causing a computer to implement a tree structure setting function of configuring a binary tree made up of n-number of leaf nodes to which numbers 1 to n (n is a natural number) are assigned, a root node and a plurality of intermediate nodes different from the root node and the leaf nodes, and, defining a set $(i \rightarrow j)$ as $\{\{i\}, \{i, i+1\}, \ldots, \{i, i+1, \ldots, j-1, j\}\}$ and a set $(i \leftarrow j)$ as $\{\{j\}, \{j, j-1\}, \ldots, \{j, j-1, \ldots, i+1, i\}\}$ for natural numbers i and j $(i \leqq j)$, setting a number assigned to a leaf node located at a left end as lv and a number assigned to a leaf node located at a right end as rv in a plurality of leaf nodes located lower than a certain intermediate node v or a certain root node v; a coordinate axis setting function of setting a first horizontal coordinate axis correlated with the root node and having coordinate points correlated respectively with subsets included in a set $(1 \rightarrow n)$ and arranged on a horizontal coordinate axis with a degree of inclusion increasing from left to right, a second horizontal coordinate axis correlated with the root node and having coordinate points correlated respectively with subsets included in a set $(2 \leftarrow n)$ and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set $(lv \rightarrow rv-1)$ and arranged on a horizontal coordinate axis with a degree of inclusion increasing from left to right, and a fourth horizontal coordinate axis correlated with a certain intermediate node v and having coordinate points correlated respectively with subsets included in a set $(lv+1 \leftarrow rv)$ and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, and setting a coordinate point located at a right end of the first horizontal coordinate axis as a first temporary coordinate point and placing a second temporary coordinate point on right of the first temporary coordinate point; a temporary directed graph generation function of generating temporary directed graphs respectively related to a set $(1 \rightarrow n-1)$, the set $(2 \leftarrow n)$, the set $(lv+1 \leftarrow rv)$ and the set $(lv \rightarrow rv-1)$ by setting a given integer k, calculating an integer x satisfying $n^{(x-1)/k} < (rv-lv+1) \leqq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, and generating a temporary directed graph related to the set $(1 \rightarrow n)$ by adding a directed edge with a length of 1 having a head at the first temporary coordinate point on the first horizontal coordinate axis to the temporary directed graph related to the set $(1 \rightarrow n-1)$; a longest directed path determination function of determining the longest directed path with the maximum number of directed edges constituting the directed path among the directed paths formed by the successive directed edges; and a directed graph generation function of generating a directed graph by replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key and reduction of the number of keys to be held by each user at the time of decrypting distributed encrypted information.

Further, in order to solve the above problems, according to yet another aspect of the present invention, there is provided a program causing a computer to implement a key generation function of generating a set key for decrypting contents or a contents key based on a directed graph. The directed graph is obtained by configuring a binary tree made up of n-number of leaf nodes to which numbers 1 to n (n is a natural number) are assigned, a root node and a plurality of intermediate nodes different from the root node and the leaf nodes, and, defining a set $(i \rightarrow j)$ as $\{\{i\}, \{i, i+1\}, \ldots, \{i, i+1, \ldots, j-1, j\}\}$, and a set $(i \leftarrow j)$ as $\{\{j\}, \{j, j-1\}, \ldots, \{j, j-1, \ldots, i+1, i\}\}$ for natural numbers i and j $(i \leqq j)$, setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set $(1 \rightarrow n)$ and arranged on a horizontal coordinate axis with a degree of inclusion increasing from left to right, a second horizontal coordinate axis correlated with the root node and having coordinate points correlated respectively with subsets included in a set $(2 \leftarrow n)$ and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set $(lv \rightarrow rv-1)$ and arranged on a horizontal coordinate axis with a degree of inclusion increasing from left to right, and a fourth horizontal coordinate axis correlated with a certain intermediate node v and having coordinate points correlated respectively with subsets included in a set $(lv+1 \leftarrow rv)$ and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating temporary directed graphs respectively related to a set (1→n−1), the set (2←n), the set (lv+1←rv) and the set (lv→rv−1) by setting a given integer k, calculating an integer x satisfying $n^{(x-1)/k} < (rv - lv + 1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes, generating a temporary directed graph related to the set (1→n) by adding a directed edge with a length of 1 having a head at the first temporary coordinate point on the first horizontal coordinate axis to the temporary directed graph related to the set (1→n−1), determining the longest directed path with the maximum number of directed edges constituting the directed path among directed paths formed by the successive directed edges, and replacing the directed edge constituting each directed path with a shorter directed edge in such a way that the number of directed edges of each directed path does not exceed the number of directed edges of the longest directed path.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key and reduction of the number of keys to be held by each user at the time of decrypting distributed encrypted information.

Therefore, by applying the technique above, it is possible to provide a novel and improved information processing unit, a terminal unit, an information processing method, a key generation method and a program capable of reducing the number of keys to be held by a terminal unit at the recipient's end and reducing the amount of calculations necessary for deriving an encryption key.

Advantages of the Invention

As described in the foregoing, according to the present invention, it is possible to reduce the number of keys to be held by a terminal unit at the receiving end.

BRIEF DESCRIPTION OF THE DRAWINGS

FIG. 18 A comparative table showing a comparison between the basic scheme and a key distribution scheme according to the embodiment.

FIG. 27 A comparative table showing a comparison between the basic scheme and a key distribution scheme according to the embodiment.

FIG. 28 An explanatory view showing one application of an encryption key distribution system according to one embodiment of the present invention.

FIG. 29 An explanatory view showing one application of an encryption key distribution system according to one embodiment of the present invention.

Description of Reference Numerals

Figure 1:
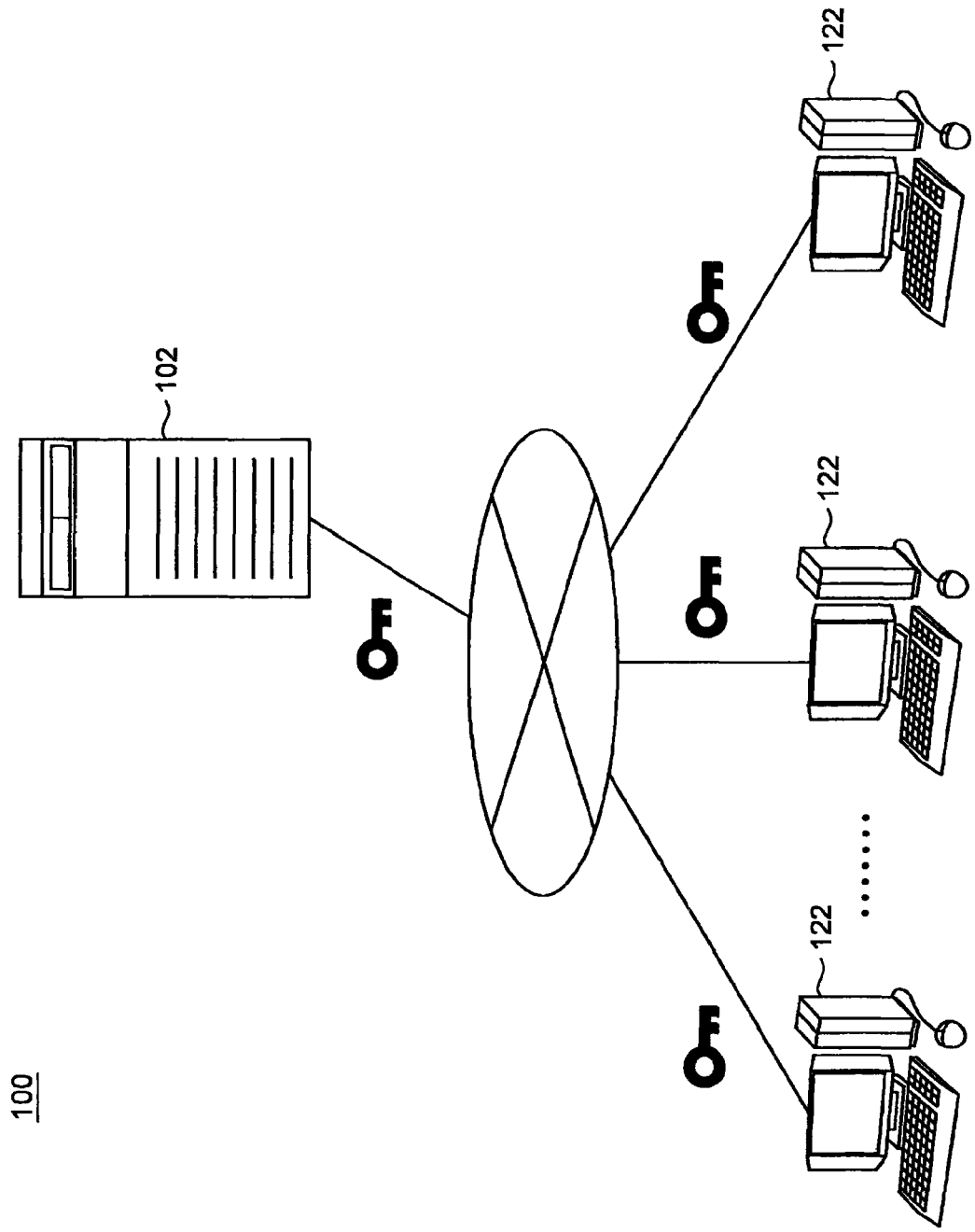
FIG. 1 An explanatory view showing an encryption key distribution system according to one embodiment of the present invention.

| | |
|---|---|
| 100 | Encryption key distribution system |
| 102 | Key distribution server |
| 104 | Tree structure setting section |
| 106 | Coordinate axis setting section |

-continued

Description of Reference Numerals

| | |
|---|---|
| 108 | Temporary directed graph generation section |
| 110 | Directed graph generation section |
| 112 | Initial intermediate key setting section |
| 114 | Key generation section |
| 116 | Encryption section |
| 118 | Transmission section |
| 120 | Subset determination section |
| 122 | Terminal unit |
| 124 | Reception section |
| 126 | Decision section |
| 128 | Key generation section |
| 130 | Decryption section |
| 202 | Controller |
| 204 | Processing unit |
| 206 | Input/output interface |
| 208 | Secure storage section |
| 210 | Main storage section |
| 212 | Network interface |
| 216 | Media interface |
| 218 | Information media |
| 152 | Key distribution server |
| 154 | Tree structure setting section |
| 156 | Coordinate axis setting section |
| 158 | Temporary directed graph generation section |
| 160 | Directed graph generation section |
| 162 | Initial intermediate key setting section |
| 164 | Key generation section |
| 166 | Encryption section |
| 168 | Transmission section |
| 170 | Subset determination section |
| 172 | Terminal unit |
| 174 | Reception section |
| 176 | Decision section |
| 178 | Key generation section |
| 180 | Decryption section |

BEST MODES FOR CARRYING OUT THE INVENTION

Hereafter, preferred embodiments of the present invention will be described in detail with reference to the appended drawings. Note that in this specification and the drawings, elements that have substantially the same functions and configurations are denoted with the same reference numerals and a repeated explanation is omitted. Although a subscript is written with a normal font in some parts for the description's sake, it represents the same thing. For example, it is noted that BTR and $BT_R$ represent the same thing.

First Embodiment

[Configuration of the Encryption Key Distribution System 100]

The configuration of an encryption key distribution system 100 according to a first embodiment of the present invention is described hereinafter. FIG. 1 is an explanatory view showing the configuration of the encryption key distribution system 100 according to the embodiment.

Referring to FIG. 1, the encryption key distribution system 100 includes a key distribution server 102 configured as an example of an information processing unit according to the embodiment, a plurality of terminal units 122 respectively owned by a plurality of users, and a network connecting the key distribution server 102 and the terminal units 122.

The above-described network is a communications network that connects the key distribution server 102 and the terminal units 122 so as to allow two-way communication or one-way communication. The network is configured by a public network such as the Internet, a telephone line network, a satellite communications network and a broadcast channel, a leased line network such as WAN (Wide Area Network), LAN (Local Area Network), IP-VPN (Internet Protocol-Virtual Private Network) and a wireless LAN or the like, for example, either wired or wireless.

The key distribution server 102 is configured by a computer unit or the like having a server function, and it can transmit various kinds of information to an external unit through the network. For example, the key distribution server 102 may generate an encryption key in the broadcast encryption scheme and distribute the encryption key to the terminal units 122. Further, the key distribution server 102 according to the embodiment is equipped with a function as a contents distribution server that provides contents distribution services such as a video distribution service and an electronic music distribution service, and it can distribute contents to the terminal units 122. The key distribution server 102 and the content distribution server may be configured as separate units as a matter of course.

The contents may be any contents data such as video contents composed of moving images or still images such as videos, television programs, video programs and charts, audio contents such as music, lectures and radio programs, game contents, document contents, software and so on, for example. The video contents may contain not only video data but also audio data.

The terminal unit 122 is a key distribution server capable of data communication with an external unit through the network, and it is owned by each user. Although the terminal unit 122 is configured by a computer unit (either a notebook type or a desktop type) such as a personal computer (which is referred to hereinafter as "PC") as shown in the figure, for example, it is not limited thereto, and it may be configured by home information appliances such as a PDA (Personal Digital Assistant), a home video game machine, a DVD/HDD recorder and a television set, a television broadcast tuner or decoder and so on, as long as it has a communication function through the network. Further, the terminal unit 122 may be a portable device that can be carried by a user, such as a portable video game player, a cellular phone, a portable video/audio player, a PDA and a PHS, for example.

The terminal unit 122 can receive various kinds of information from the key distribution server 102. For example, the terminal unit 122 can receive contents distributed from the key distribution server 102. At the time of contents distribution, the key distribution server 102 can encrypt various kinds of electronic data and distribute them. For example, the key distribution server 102 can generate a contents key for encrypting contents and distribute it. The contents key may be represented by random numbers (pseudo-random numbers) generated by a pseudo-random number generator, a given character string or sequence or the like, for example. Using the contents key, the key distribution server 102 can encrypt the contents by given encryption logic. Further, the key distribution server 102 can distribute the contents key or a decryption key corresponding to the contents key to an arbitrary terminal unit 122. On the other hand, the terminal unit 122 can decrypt the encrypted contents using the contents key or the decryption key corresponding to the contents key received from the key distribution server 102.

The pseudo-random number generator used for generating the contents key is a unit or a program capable of outputting a long-period pseudo-random number sequence by inputting a given seed value, and it is generally implemented using logic such as the linear congruential method or the Mersenne Twister method. The pseudo-random number generator applicable to the embodiment is of course not limited thereto, and pseudo-random numbers may be generated using other logic, or it may be a unit or a program capable of generating a pseudo-random number sequence containing special information or conditions.

Further, the key distribution server 102 according to the embodiment encrypts not only contents but also a contents key and distributes them. It is true that encrypting and distributing contents ensures a certain degree of security level. However, in order to flexibly deal with addition or elimination of a user who is licensed to have the authority to use contents (which is referred to hereinafter as a "licensed user") among a large number of users, a method that encrypts a contents key and distributes it is more advantageous. In such a case, in this embodiment, the key distribution server 102 first generates a plurality of set keys for encrypting and decrypting a contents key. The plurality of set keys are correlated respectively with a plurality of subsets of licensed users extracted from a large number of users, as described in detail later. Specifically, the key distribution server 102 encrypts a contents key using a set key that is set so that only a set of licensed users can decrypt the contents key and distributes the encrypted contents key to the terminal units 122 of all users. In this configuration, only the terminal unit 122 of a licensed user can decrypt the encrypted contents key and then decrypt the encrypted contents using the contents key, thereby making the contents viewable or the like. In the case where a set of licensed users is changed, the key distribution server 102 can deal with the change by changing the set key to be used for encrypting the contents key. In order to establish the above encryption key distribution logic, it is necessary to configure the key distribution server 102 or the like so as to implement algorithms related to generation and distribution of the set key.

Hereinafter, exemplary hardware configurations of the key distribution server 102 and the terminal unit 122 according to the embodiment are described firstly. Secondly, basic technology related to the encryption key distribution logic according to the embodiment is described. Thirdly, the configurations of the key distribution server 102 and the terminal unit 122 according to the embodiment are described in detail, and differences in configurations and effects from the basic technology are described specifically. Finally, applications of the encryption key distribution system according to the embodiment are described.

[Hardware Configurations of the Key Distribution Server 102 and the Terminal Unit 122]

Figure 2:
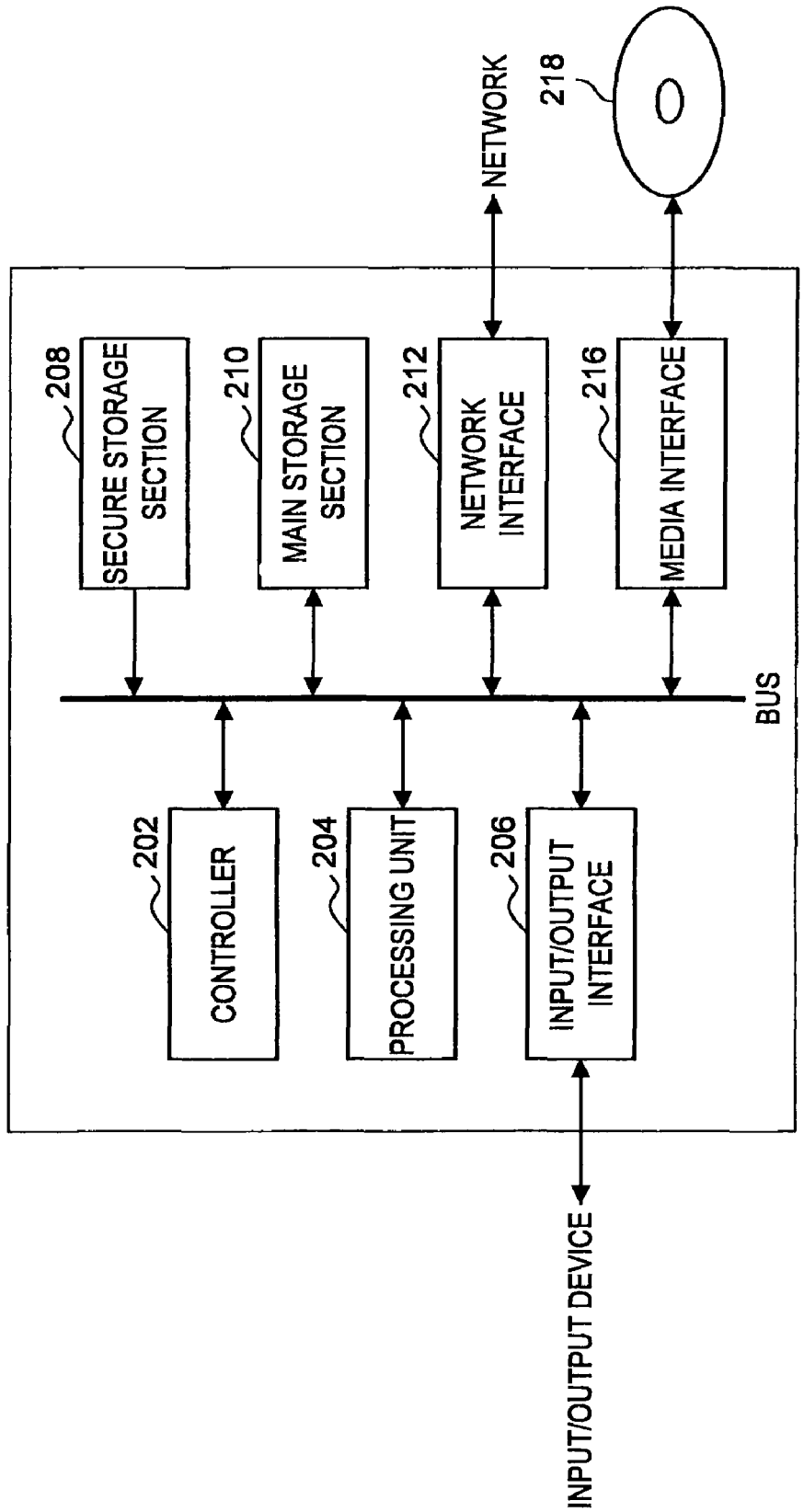
FIG. 2 A block diagram showing a configuration of a key distribution server and a receiver according to the embodiment.

Referring first to FIG. 2, exemplary hardware configurations of the key distribution server 102 and the terminal unit 122 according to the embodiment are described hereinafter. FIG. 2 shows an example of the hardware configuration capable of implementing the functions of the key distribution server 102 or the terminal unit 122 according to the embodiment.

The key distribution server 102 and the terminal unit 122 include a controller 202, a processor, an example of which is processing unit 204, an input/output interface 206, a secure storage section 208, a main storage section 210, a network interface 212 and a media interface 216, for example.

(Controller 202)

The controller 202 is connected to the other elements through a bus, and it mainly serves to control each section of the unit based on programs and data stored in the main storage section 210. The controller 202 may be configured by a processing unit such as a CPU (Central Processing Unit).

(Processing Unit 204 (Key Distribution Server 102))

The processing unit 204 included in the key distribution server 102 can execute encryption of contents, encryption of a contents key, generation of a set key and derivation of an intermediate key used for generating a set key, for example. Thus, the processing unit 204 can function as a pseudo-random number generator that generates pseudo-random numbers based on given data (a seed value etc.) and also encrypt contents or a contents key based on given algorithms. The given algorithms may be stored in the main storage section 210 as a program readable by the processing unit 204. Further, the given information may be stored in the main storage section 210 or the secure storage section 208. The processing unit 204 can record output results of executing the above processing in the main storage section 210 or the secure storage section 208. The processing unit 204 may be configured by a processing unit such as a CPU or formed integrally with the controller 202 described above.

(Processing Unit 204 (Terminal Unit 122))

On the other hand, the processing unit 204 included in the terminal unit 122 can execute decryption of contents, decryption of a contents key, generation of a set key and generation of an intermediate key used for generating a set key, for example. Thus, the processing unit 204 can function as a pseudo-random number generator that generates pseudo-random numbers based on given data (a seed value etc.) and also decrypt contents or a contents key based on given algorithms. The given algorithms may be stored in the main storage section 210 as a program readable by the processing unit 204. Further, the given information may be stored in the main storage section 210 or the secure storage section 208. The processing unit 204 can record output results of executing the above processing in the main storage section 210 or the secure storage section 208. The processing unit 204 may be configured by a processing unit such as a CPU or formed integrally with the controller 202 described above.

(Input/Output Interface 206)

The input/output interface 206 is mainly connected to an input device for a user to input information and an output device to output processing results or descriptions of contents. For example, the input device may be a keyboard, a mouse, a trackball, a touch pen, a keypad, a touch panel or the like, and it may be connected via wired or wireless to the input/output interface 206. In some cases, the input device may be portable electronic equipment such as a cellular phone or a PDA (Personal Digital Assistant) connected via wired or wireless. On the other hand, the output device may be a display unit such as a display, an audio output device such as a speaker or the like, for example, and it may be connected via wired or wireless to the input/output interface 206. The input/output device may be built in or integrated with the key distribution server 102 or the terminal unit 122.

The input/output interface 206 is connected to the other elements through the bus, and it can transfer information input via the input/output interface 206 to the main storage section 210 or the like. On the contrary, the input/output interface 206 can output information stored in the main storage section 210 or the like, information input via the network interface 212 or the like, or results obtained by processing those information in the processing unit 204 and so on to the output device.

(Secure Storage Section 208)

The secure storage section 208 mainly securely stores information necessary to be concealed, such as contents keys, set keys and intermediate keys. The secure storage section 208 may be configured by a magnetic storage unit such as a hard disk, an optical storage unit such as an optical disk, a magneto-optical storage unit, a semiconductor storage unit or the like, for example. Further, the secure storage section 208 may be configured by a tamper-resistant storage unit, for example.

(Main Storage Section 210)

The main storage section 210 may store control programs for controlling the other elements, encryption programs for encrypting contents, contents keys or the like, decryption programs for decrypting encrypted contents, contents keys or the like, key generation programs for generating set keys or intermediate keys and so on, for example. Further, the main storage section 210 may temporarily or permanently store calculation results output from the processing unit 204 or store information input from the input/output interface 206, the network interface 212, the media interface 216 or the like. The main storage section 210 may be configured by a magnetic storage unit such as a hard disk, an optical storage unit such as an optical disk, a magneto-optical storage unit, a semiconductor storage unit or the like, for example. Further, the main storage section 210 may be formed integrally with the secure storage section 208.

(Network Interface 212)

The network interface 212 is connected to another communication unit or the like on the network, for example, and it is an interface means for transmitting and receiving information such as encrypted contents or contents keys, set keys and intermediate keys, parameter information related to encryption, and information related to a set of licensed users, for example. The network interface 212 is connected to the other elements through the bus, and it can transfer information received from an external unit on the network to the other elements or transmit information held by the other elements to an external unit on the network.

(Media Interface 216)

The media interface 216 is an interface for reading and writing information by removably attaching the information media 218, and it is connected to the other elements through the bus. The media interface 216 can read information from the attached information media 218 and transfer it to the other elements or write information supplied from the other elements into the information media 218, for example. For example, the information media 218 may be portable storage media (removable storage media) such as an optical disk, a magnetic disk and a semiconductor memory, storage media of an information terminal connected via wired or wireless within a relatively short distance without through the network, or the like.

An example of the hardware configuration capable of implementing the functions of the key distribution server 102 and the terminal unit 122 according to the embodiment is described in the foregoing. Each of the above elements may be configured using a general-purpose member or may be configured by hardware specialized to the function of each element. It is thereby possible to change the hardware configuration to use as appropriate according to the technique level when implementing the embodiment. Further, the above-described hardware configuration is merely an example, and it is not limited thereto as a matter of course. For example, the controller 202 and the processing unit 204 may be configured by the same processing unit, and the secure storage section 208 and the main storage section 210 may be configured by the same storage unit. Further, depending on use, the configuration that eliminates the media interface 216, the input/output interface 206 or the like is feasible. Hereinafter, the encryption key distribution scheme that is implemented by the key distribution server 102 and the terminal unit 122 having the above-described hardware configuration is described in detail.

[Encryption Key Distribution Scheme According to the Basic Technology]

Before providing detailed explanation of the encryption key distribution scheme according to the embodiment, technological matters that form the basis for implementing the embodiment are described hereinafter. The embodiment is configured so as to obtain more significant advantages by adding improvements to the basic technology described below. Therefore, the technique related to the improvements is a feature of the embodiment. Thus, it is noted that, although the embodiment follows the fundamental concept of the technological matters described hereinafter, the essence of the embodiment is rather integrated into the improved parts, and the configuration is clearly through the network, or the like.

An example of the hardware configuration capable of implementing the functions of the key distribution server 102 and the terminal unit 122 according to the embodiment is described in the foregoing. Each of the above elements may be configured using a general-purpose member or may be configured by hardware specialized to the function of each element. It is thereby possible to change the hardware configuration to use as appropriate according to the technique level when implementing the embodiment. Further, the above-described hardware configuration is merely an example, and it is not limited thereto as a matter of course. For example, the controller 202 and the processing unit 204 may be configured by the same processing unit, and the secure storage section 208 and the main storage section 210 may be configured by the same storage unit. Further, depending on use, the configuration that eliminates the media interface 216, the input/output interface 206 or the like is feasible. Hereinafter, the encryption key distribution scheme that is implemented by the key distribution server 102 and the terminal unit 122 having the above-described hardware configuration is described in detail.

[Encryption Key Distribution Scheme According to the Basic Technology]

Before providing detailed explanation of the encryption key distribution scheme according to the embodiment, technological matters that form the basis for implementing the embodiment are described hereinafter. The embodiment is configured so as to obtain more significant advantages by adding improvements to the basic technology described below. Therefore, the technique related to the improvements is a feature of the embodiment. Thus, it is noted that, although the embodiment follows the fundamental concept of the technological matters described hereinafter, the essence of the embodiment is rather integrated into the improved parts, and the configuration is clearly different, and there is also a clear distinction in advantages from the basic technology.

The encryption key distribution scheme according to the basic technology described hereinafter is referred to as a basic scheme. The basic scheme divides a set of terminal units of users to which contents are to be distributed into a plurality of subsets and then encrypts a contents key by a set key assigned to each subset and distributes it. The basic scheme provides one means for solving the problems as to which subset is to be selected, how to generate set keys and how to distribute set keys in order to reduce the traffic for encryption key distribution, the number of decryption keys to be held by each user, the amount of calculations necessary for each user to generate an decryption key and so on. The basic scheme is described hereinafter with reference to FIGS. 3 to 7.

(Setting of a Tree Structure)

In the basic scheme, a set of terminal units (users), which are targets of contents distribution, is considered as being divided into a plurality of subsets. A way of dividing into subsets according to the basic scheme is described hereinbelow with reference to FIG. 3. Although a way of dividing into subsets is not one as a matter of course, the way of dividing into subsets with use of a binary tree is employed in the basic scheme. Schematically, the basic scheme assigns a given subset to each node forming a binary tree in consideration of the positional relationship between nodes, thereby comprehensively selecting the subsets of users in given combinations, as is described in detail later. The merits of such a selection method would be more clearly understood by a specific example of the binary tree shown in FIG. 3. A method of constructing the binary tree is described hereinafter with reference to FIG. 3.

Firstly, a set that is used in the description below is defined as follows.

A set of all terminal units (users) N={1, 2, ..., n} (n is a power of two) For natural numbers i and j (i≦j):

$$[i, j] = \{i, i+1, i+2, \ldots, j\}$$
$$(i \to i) = (i \leftarrow i) = \{\{i\}\}$$
$$(i \to j) = \{\{i\}, \{i, i+1\}, \ldots, \{i, i+1, \ldots, j\}\}$$
$$= \{[i, i], [i, i+1], [i, i+2], \ldots, [i+j]\}$$
$$(i \leftarrow j) = \{\{j\}, \{j, j-1\}, \ldots, \{j, j-1, \ldots, i\}\}$$
$$\{[j, j], [j-1, j], [j-2, j], \ldots, [i, j]\}$$

Figure 3:
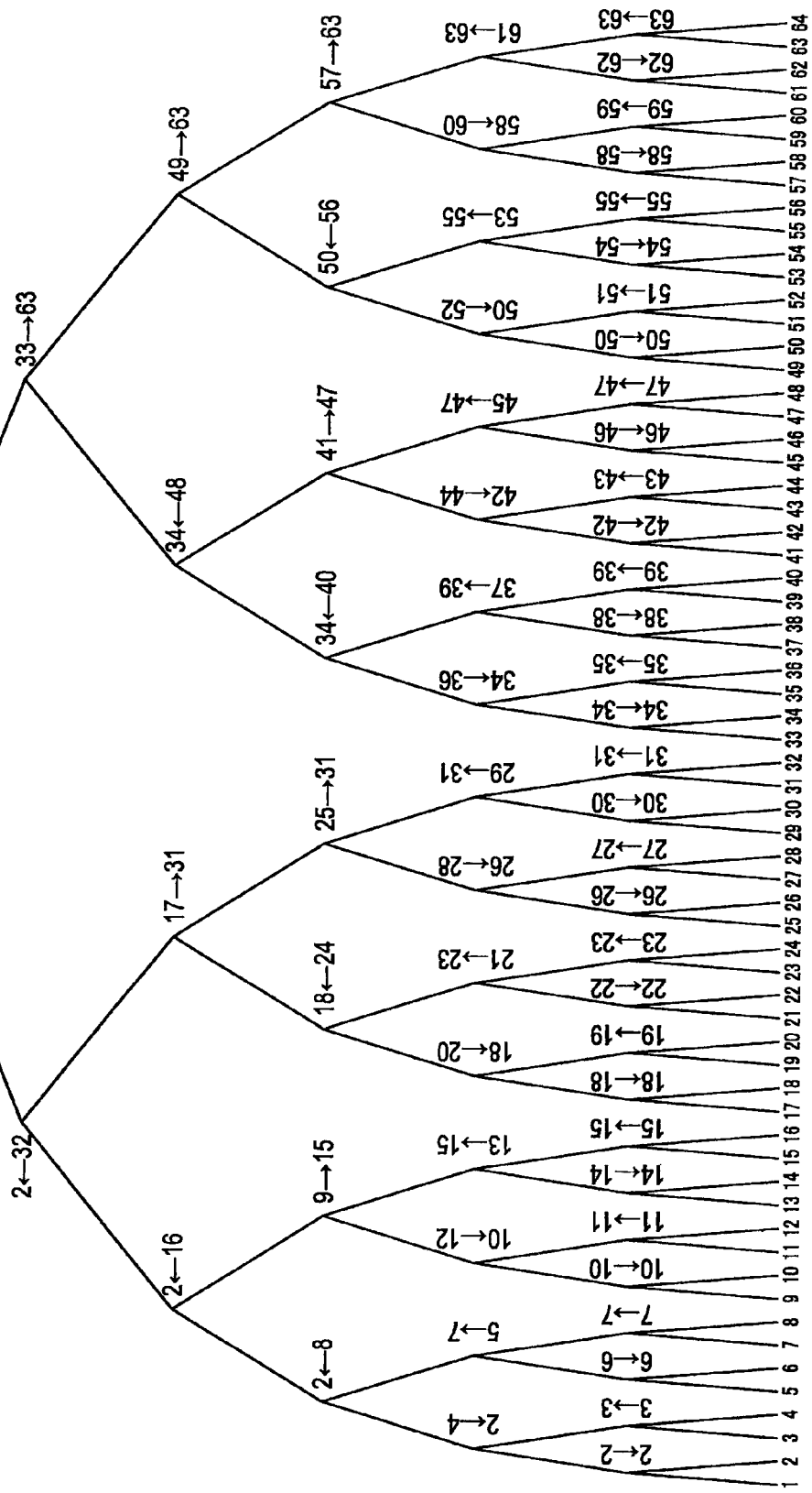
FIG. 3 An explanatory view showing a binary tree structure according to a basic scheme.

Hereinafter, nodes located at the bottom of a binary tree (BT) are referred to as leaf nodes, a node located at the top is referred to as a root node, and nodes located between the root node and the leaf nodes are referred to as intermediate nodes. The leaf nodes correspond to the respective terminal units. Further, for convenience of the description, it is assumed hereinafter that a terminal unit and a user are in one-to-one correspondence, and the "terminal unit" correlated with the leaf node is indicated by the wording "user" in some cases. FIG. 3 shows an example where the number of leaf nodes of the BT is n=64.

First, the BT is created in such a way that the number of leaf nodes is n (=64). Then, numbers 1, 2, ..., n are assigned to the respective leaf nodes from the left end toward the right.

Next, indexes lv and rv for regulating a subset to be assigned to a certain intermediate node v are defined. Among the leaf nodes located lower than a certain intermediate node v, the number assigned to the leftmost leaf node is defined as lv, and the number assigned to the rightmost leaf node is defined as rv. Note that, v may be sequential numbers assigned to the respective intermediate nodes. Thus, the intermediate node v indicates an intermediate node of the BT with an index of v.

Then, the intermediate nodes of the BT are defined by categorizing them into two sets. Among the intermediate nodes of the BT, a set of intermediates nodes located on the left of a parent node is defined as BTL, and a set of intermediates nodes located on the right of a parent node is defined as BTR. The parent-child relation referred to herein indicates the hierarchical relationship of the nodes connected on the BT, and it means a relationship in which the parent node is located at the upper level, and the child node is located at the lower level.

Further, the subsets of the user set correlated with the respective leaf nodes are correlated with the root node of the BT. First, the set (1→n) and the set (2←n) are correlated with the root node. Because all leaf nodes are connected at the lower level of the root node, the root node is represented by the set that comprehensively or selectively includes those leaf nodes. Specifically, the set (1→64) and the set (2←64) are correlated with the root node of FIG. 3. Consider, for example, the set (1→64). The set (1=64) includes subsets [1, 1], [1, 2], ..., [1, 64] as its elements. For example, to represent all users (leaf nodes), the subset [1, 64] can be used, and it is included as the element of the set (1→64). Further, to represent all users except the user with the number 16, the subsets [1, 15] and [17, 64] can be used, and they are included as the elements of the set (1→64) and the set (2←64), respectively. In this manner, the combinations of the leaf nodes (users) located at the lower level of the root node can be represented by the subsets of the correlated set.

Then, the subsets of the user set are correlated with the intermediate nodes of the BT. First, a set (lv+1←rv) is correlated with the intermediate node v belonging to the above-described set BTL. On the other hand, a set (lv→rv−1) is correlated with the intermediate node v belonging to the above-described set BTR. As a matter of course, those sets are correlated with all intermediate nodes v of the BT. Referring to FIG. 3, those sets are indicated next to the respective intermediate nodes. For example, regarding the intermediate node correlated with the set (2←4), two intermediate nodes correlated respectively with the set (2←2) and the set (3→3) exist at the lower level of the intermediate node, and the leaf nodes with the number 1 to 4 are further connected thereto. When representing a combination of those leaf nodes except the one with the number 3, it can be represented by a group of subsets {[1, 1] [2, 2], [4, 4]} or {[1, 2], [4, 4]}. While the subsets [1, 1] and [1, 2] are elements of the set (1→64) correlated with the root node, the subsets [2, 2] and [4, 4] are elements of the sets (2←2) and (2←4), respectively.

In this manner, the basic scheme defines the subsets of the user set using the binary tree BT. This method enables representation of the subsets of users in various combinations. The universal set made up of those subsets is called a set system Φ and defined as the following expression (1). Thus, the following expression (1) mathematically represents the binary tree constructed by the above method.

[Expression 1]

$$\Phi = \bigcup_{v \in BTL} (lv+1 \leftarrow rv) \cup \bigcup_{v \in BTR} (lv \to rv-1) \cup (1 \to n) \cup (2 \leftarrow n) \quad (1)$$

The method of configuring the binary tree that regulates the subsets is described in the foregoing. The basic concept of the basic scheme is to set the set keys for encrypting a contents key to the respective subsets, encrypt the contents key using the respective set keys and distribute it to all users. By defining the subsets as described above, one means for categorizing combinations of users is regulated at least. Hereinafter, an algorithm for generating set keys using those subsets is described.

(Generation of Directed Graphs)

A method of generating a directed graph that represents an algorithm for generating a set key is described hereinafter with reference to FIG. 4. Prior to this, however, the relationship between a set key for encrypting a contents key and an intermediate key for generating the set key is described hereinbelow.

As briefly mentioned above, the basic scheme uses a particular pseudo-random number generator PRSG (Pseudo-Random Sequence Generator) for generating set keys. When an intermediate key t(S0) which corresponds to a certain subset S0 is input, the PRSG outputs a set key k(S0) which corresponds to the subset S0 and intermediate keys t(S1), t(S2), ..., t(Sk) which correspond to the subsets S1, S2, ..., Sk relevant to the subset S0. The sets S0 and S1, S2, ..., Sk are, of course, any of the subsets constituting the set system Φ. Thus, the PRSG is a key generation unit. A feature of the basic scheme is the logic that regulates the relationship between inputs and outputs of the PRSG. The directed graph that regulates the relationship between the set S0 and the sets S1, S2, ..., Sk is described hereinafter.

The symbols used for the following description are defined as follows:

| | |
|---|---|
| Intermediate key corresponding to a subset Si | t(Si) |
| Set key corresponding to a subset Si | k(Si) |
| Contents key | mek |
| Pseudo-random number generator (Note that an input of t(S0) is expressed as PRSG(t(S0). On the other hand, an output from the PRSG is expressed as t(S1)||...||t(Sk)||k(S0)←PRSG(t(S0))) | PRSG |
| Directed graph (Note that a directed graph corresponding to the set (i←j) is expressed as H(i←j)) | H |
| Directed edge | E |
| Directed path | P |

First, a parameter k (k is a natural number) is determined. For simplification, it is assumed to be k|log(n) (hereinafter, the base of log is two) in this example. Because the parameter k eventually affects the number of intermediate keys to be held by the terminal unit 122 and the amount of calculations necessary for generating the set key, it should be set appropriately according to the situation. In FIG. 4, k=6 is set, for example.

Next, a specific way of drawing the directed graph is described hereinbelow. Firstly, the directed graph H(lv→rv−1) which corresponds to the intermediate node v belonging to BTR is described by way of illustration.

(Step 1) Set a horizontal coordinate axis for constructing the directed graph H(lv→rv−1). On the horizontal coordinate axis, the subsets Si forming the elements of the set (lv→rv−1) are assigned as coordinate points. The subsets Si forming the coordinate points are arranged in such a way that the degree of inclusion becomes larger from left to right. For instance, to take the directed graph H(5→7)=H({[5, 5], [5, 6], [5, 7]}) as an example, the coordinate axis has three coordinate points to which the subsets [5, 5], [5, 6], [5, 7] are assigned sequentially from the left.

If a vertical line at which a start point of the rightward directed graph H on first and third horizontal coordinate axes is located is x, an intersection point of the directed graph H and a vertical line y represents [x, y], and if a vertical line at which a start point of the leftward directed graph H on second and fourth horizontal coordinate axes is located is z, an intersection point of the directed graph H and the vertical line y represents [y, z].

After that, a temporary coordinate point to serve as a start point is placed on the left of the coordinate point located leftmost on the coordinate axis, and a temporary coordinate point to serve as an end point is placed on the right of the coordinate point located rightmost on the coordinate axis. In the coordinate axis set in this manner, a length Lv from the temporary coordinate point at the left end (start point) to the temporary coordinate point at the right end (end point) is Lv=rv−lv+1.

(Step 2) Set a directed edge constituting the directed graph H(lv→rv−1).

(S2-1) Calculate an integer x satisfying $n^{(x-1)/k} < Lv \leq n^{x/k}$. The integer x satisfies $1 \leq x \leq k$.

(S2-2) Perform the following operations by changing a counter i from 0 to x−1. Starting from the start point at the left end of the horizontal coordinate axis, repeat setting of a rightward directed edge extending to a coordinate point that is $n^{i/k}$ apart from the coordinate point (jump to a coordinate point that is $n^{i/k}$ apart from the coordinate point) until the head of the directed edge reaches the end point at the right end of the horizontal coordinate axis or the head of the directed edge to be set next exceeds the end point.

(Step 3) Delete all directed edges whose tails or heads are at the temporary coordinate points.

(Step 4) If there are a plurality of directed edges reaching a certain coordinate point, leave the longest directed edge only and delete all the directed edges other than the longest directed edge.

After the above steps (Step 1) to (Step 4) are executed, the directed graph H(lv→rv−1) is completed. For example, referring to the directed graph H(33→63) located on the right side at the third level from the top of FIG. 4 as an example, the substance of the directed graph H(33→63) is a group of lines composed of directed edges being arched curved lines and straight lines connected to one end of the arched curved lines and extending in the horizontal direction. Further, the curved lines and the straight lines constituting the directed graph H(33→63) are directed edges. An intersection point between the end of the directed edge and the vertical line is a coordinate point. Although the horizontal coordinate axis is not clearly shown in FIG. 4, the horizontal coordinate axis is composed of a group of intersection points between the vertical lines and the ends of the directed edges. Further, an outline arrow is depicted above the directed graph H(33→63), and it indicates the direction of the directed edge. Specifically, it indicates that all of the directed edges constituting the directed graph H(33→63) are rightward.

In the same manner as the directed graph H(lv→rv−1), the directed graph H(lv+1←rv) correlated with the intermediate node v belonging to BTL and the directed graphs H(1→n) and H(2←n) correlated with the root node are set. It is noted that when setting the coordinate axis of the directed graph H(lv+1←rv) and H(2←n), the subsets Si are arranged on the horizontal coordinate axis in such a way that the degree of inclusion becomes larger from right to left, and the direction of the directed edges is leftward. Further, the directed graph H(1→n) is generated by adding the directed edge E([1, n−1], [1, n]) to the directed graph H(1→n−1). On the other hand, the directed graph H(2+n) is set by the same method as the directed graph H(lv+1←rv).

Additional explanation is provided hereinafter, taking the directed graph H(1→64) of FIG. 4 as an example. First, in the horizontal coordinate axis of the directed graph H(1→64), the leftmost coordinate point (the intersection point with the vertical line 1) is [1, 1]={1}, the coordinate point adjacent on the right (the intersection point with the vertical line 2) is [1, 2]={1, 2}, and the coordinate point further adjacent on the right is [1, 3]={1, 2, 3}. Further, the arrow immediately above or below each directed graph indicates the direction of all the directed edges constituting the directed graph H. For example, the directed graph H(1→64) has a directed edge from the coordinate point [1, 1] to [1, 2] and two directed edges extending from the coordinate point [1, 2] to [1, 3] and [1, 4]. Further, the black circles depicted at the bottom of FIG. 4 indicate the directed graph H(2→2), H(3→3), ..., H(63→63), respectively, from the left.

A method of configuring the directed graph H is described in the foregoing. FIG. 4 shows a result of drawing the directed graphs H corresponding to the intermediate nodes and the root node of BT by the above-described method. This example is the case where n=64 and k=6. The logic that generates set keys using the directed graphs H is described hereinbelow.

(Generation of Set Keys)

As described earlier, the basic scheme encrypts the contents key mek using the set key k(Si) assigned to each subset Si constituting the above set system Φ and distributes it. Thus, each coordinate point of the directed graph H described above corresponds to the subset Si composed of one or more users, and the set key k(Si) is assigned thereto. Further, the intermediate key t(Si) is also assigned to each subset Si described above and used for generating the set key k(Si).

Incidentally, because the number of repetitions in the above-described processing of (2-2) is x where $1 \leq x \leq k$, the maximum k-number of directed edges originate from each coordinate point of the directed graph H. The subsets of coordinate points as the destination of one or more than one directed edges originating from a certain coordinate point (subset S0) are S1, S2, ..., Sk in order of closeness to the certain coordinate point (in order of shortness of the directed edge). Note that, if the number of directed edges originating from the coordinate point (subset S0) is q (q<k), Sq+1, Sq+2, ..., Sk are treated as dummy and not actually used.

The basic scheme uses the above-described PRSG that outputs (k+1)λ-bit output in response to λ-bit input in order to generate the set key k(Si). If the intermediate key t(S0) corresponding to a certain coordinate point (subset S0) is input, the PRSG outputs the intermediate keys t(S1), t(S2), ..., t(Sk) corresponding to the respective coordinate points (subsets S1, S2, ..., Sk) at the heads of the directed edges whose tails are at the certain coordinate point and the set key k(S0) for the subset S0. Thus, $t(S1)\| \ldots \|t(Sk)\|k(S0) \leftarrow PRSG(t(S0))$. By delimiting the output of the PRSG into λ bits each from the left, the intermediate keys t(S1), t(S2), ..., t(Sk) and the set key k(S0) are obtained.

Figure 4:
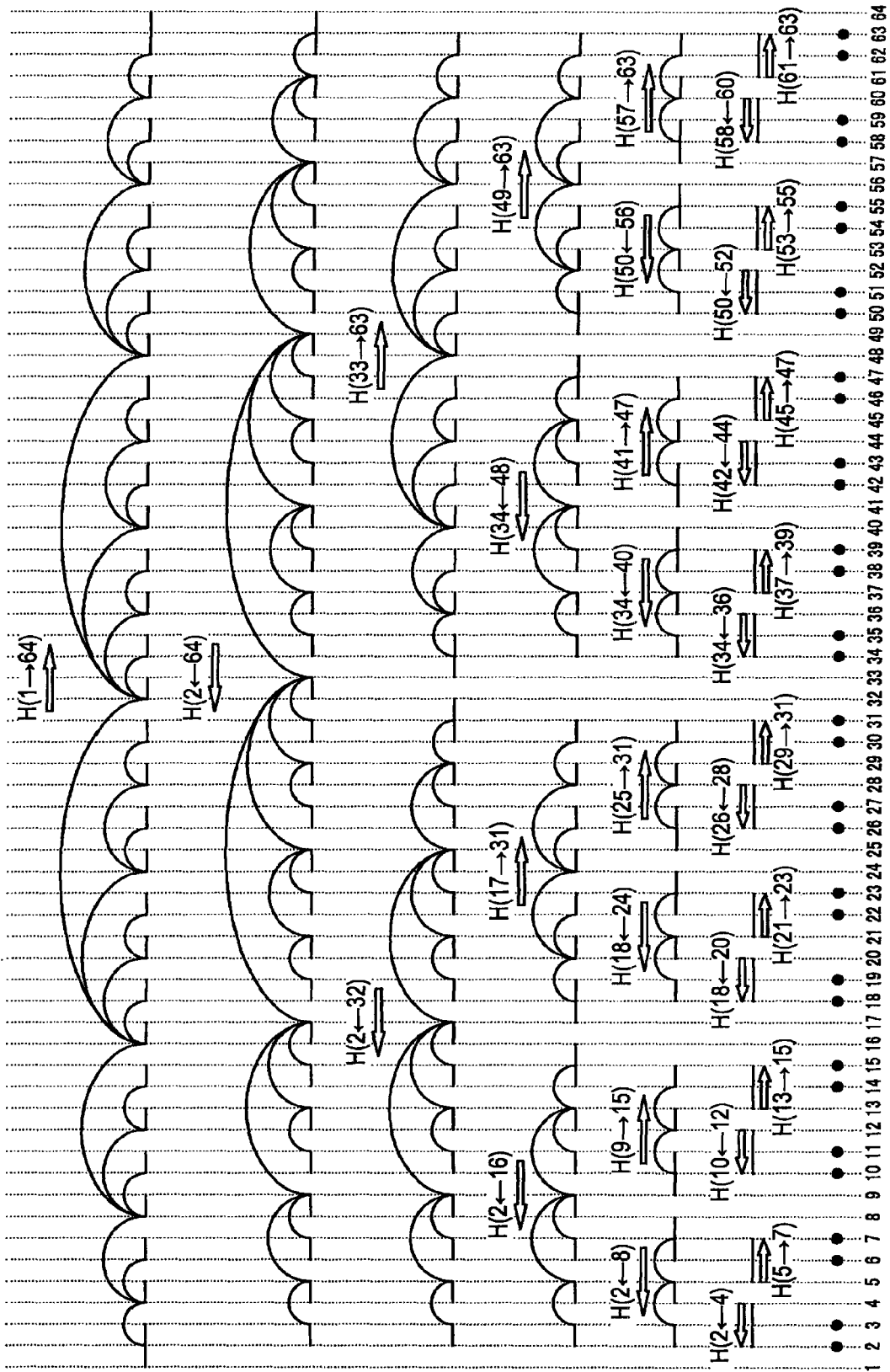
FIG. 4 An explanatory view showing a directed graph according to the basic scheme.

For example, referring to the directed graph H(1→64) of FIG. 4 and focusing attention on the coordinate point (subset S0)=[1, 8] (the eighth coordinate point from the left end), four directed edges originate from the coordinate point S0, with their heads at S1=[1, 9], S2=[1, 10], S3=[1, 12] and S4=[1, 16]. Therefore, if the intermediate key t(S0) is input to the PRSG, k(S0), t(S1), t(S2), t(S3) and t(S4) can be obtained. Further, if the obtained t(S4) is input to the PRSG, k(S4) and t(S11), t(S12), t(S13), t(S14) and t(S15) corresponding to S11=[1, 17], S12=[1, 18], S13=[1, 20], S14=[1, 24] and S15=[1, 32] can be obtained. In this manner, it is possible to calculate a plurality of set keys k(Si) by repeatedly using the PRSG.

The intermediate key is used for the purpose of enhancing security. In the case where there is a need to reduce the amount of processing for set key generation while there is no particular need to focus on the security, it is feasible to calculate another set key directly from a certain set key without using the intermediate key. For example, in the above example, the output when inputting the set key k(S0) for the subset S0 to the PRSG may be k(S1), k(S2), k(S3) and k(S4), which serve as the set keys for the respective subsets S1 to S4.

As is easily inferred from the above example, with a certain intermediate key, it is possible to derive the intermediate keys corresponding to the coordinate points reachable by the chain of the directed edges extending from the coordinate point corresponding to the certain intermediate key and the set key by the repeated use of the PRSG. Accordingly, each user only needs to hold the minimum number of intermediate keys which can derive all the intermediate keys corresponding to the subset in which the user is included. On the other hand, if a key distribution server that generates a set key for encrypting a contents key holds at least the intermediate key corresponding to the initial coordinate point of each directed graph H, it can derive the set keys corresponding to the other coordinate points of the directed graph by repeatedly performing the processing using the PRSG.

Thus, an administrator of a key distribution system sets λ-bit random numbers, for example, as the intermediate key for the initial coordinate point (root) of each directed graph H in a key distribution server, upon setup of the key distribution system. The initial coordinate point (root) of the directed graph H is a coordinate point where a directed edge originates but no directed edge reaches. For example, the initial coordinate point of the directed graph H(1→64) in FIG. 4 is the coordinate point [1, 1] at the left end of the horizontal coordinate axis.

A method of generating the set keys is described above. The above-described set key generation method is used not only in the key generation server at the transmitting end of the contents key but also in the terminal unit at the receiving end.

(Distribution of Intermediate Keys)

Distribution of intermediate keys from the key distribution server to the terminal unit of each user is described hereinafter. As briefly mentioned earlier, it is necessary to provide the terminal unit of each user with a plurality of intermediate keys that enable derivation of set keys corresponding to all subsets in which the terminal unit of the user is included. It should be, of course, avoided to provide an intermediate key that enables derivation of a set key corresponding to a subset where the terminal unit of the user is not included, and it is preferred that the number of provided intermediate keys is minimum in terms of the efficiency of memory capacity.

In light of this, a distributor of intermediate keys extracts all the directed graphs H having the subset to which the terminal unit of a user u belongs (which is also referred to hereinafter as the "subset to which a user u belongs" or "subset in which a user u is included") as an element. Then, if the user u is included in the subset corresponding to the initial coordinate point (root) of the directed graph H, the distributor provides the terminal unit of the user u with only the intermediate key corresponding to the initial coordinate point. On the other hand, if the user u belongs to any of the subsets corresponding to the coordinate points different from the initial coordinate point of the directed graph H, the distributor finds the subset S0 such that the user u is included in the subset S0 but is not included in the subset parent (S0) which is the parent of the subset S0 and provides the terminal unit of the user u with the intermediate key t(S0) for the subset S0. In other words, if a plurality of coordinate points different from the initial coordinate point and corresponding to the subset to which the user u is included exist in the directed graph H, the distributor extracts the coordinate point S0 such that the user u is not included in the subset parent (S0) corresponding to the tail of the directed edge reaching the coordinate point corresponding to the subset S0 from those coordinate points, and provides the terminal unit of the user u with the intermediate key t(S0) for the coordinate point (S0). If there are a plurality of such coordinate points S0, the intermediate keys t(S0) for the respective coordinate points are provided. The parent-child relation of the coordinate points is determined by the directed edge, and the coordinate point at the tail of the directed edge serves as the parent of the coordinate point at the head, and the coordinate point at the head of the directed edge serves as the child of the coordinate point at the tail.

Hereinafter, the coordinate point parent(S0) at the tail of the directed edge reaching a certain coordinate point S0 is referred to as the parent coordinate point. If a certain coordinate point S0 is the start point of the directed graph H, no parent coordinate point exists, and if it is not the start point of the directed graph H, only one parent coordinate point exists. In one directed graph H, there may be a plurality of coordinate points such that the user u is included in the subset corresponding thereto but the user u is not included in the subset corresponding to its parent coordinate point in some cases.

The distribution method of the intermediate key is described hereinafter specifically with reference to the example of FIG. 4.

Example 1

Consider the intermediate key that is distributed to a user 1. First, as a result of searching for the directed graph H having the subset to which the user 1 belongs as the element, only the directed graph H(1→64) is found. The user 1 belongs to the subset [1, 1] which is the initial coordinate point of the directed graph H(1→64). Thus, the user 1 is provided with the intermediate key t([1, 1]) only.

Example 2

Consider the intermediate key that is distributed to a user 3. First, as a result of searching for the directed graph H having the subset to which the user 3 belongs as the element, the directed graphs H(1→64), H(2←64), H(2←32), H(2←16), H(2←8), H(2←4) and H(3→3) are found. Looking into the directed graph H(1→64), the user 3 does not belong to the subset [1, 1] at the initial coordinate point but belongs to the subsets [1, 3], [1, 4], . . . , [1, 64] at the third and subsequent coordinate points. Among those coordinate points, the coordinate points whose parent coordinate points do not include the user 3 are [1, 3] and [1, 4] only. Specifically, the user 3 is not included in the coordinate point [1, 2], which is the parent coordinate point parent ([1, 3]) and parent ([1, 4]) of the coordinate points [1, 3] and [1, 4] including the user 3. Therefore, t([1, 3]) and t([1, 4]) are provided to the user 3 as the intermediate keys corresponding to the directed graph H(1→64). In the same manner, the corresponding intermediate keys are selected for the other directed graphs H(2←64), H(2←32), H(2←16), H(2←8), H(2←4) and H(3→3) and provided to the user 3. Consequently, the user 3 is provided with the total eight intermediate keys.

Figure 5:
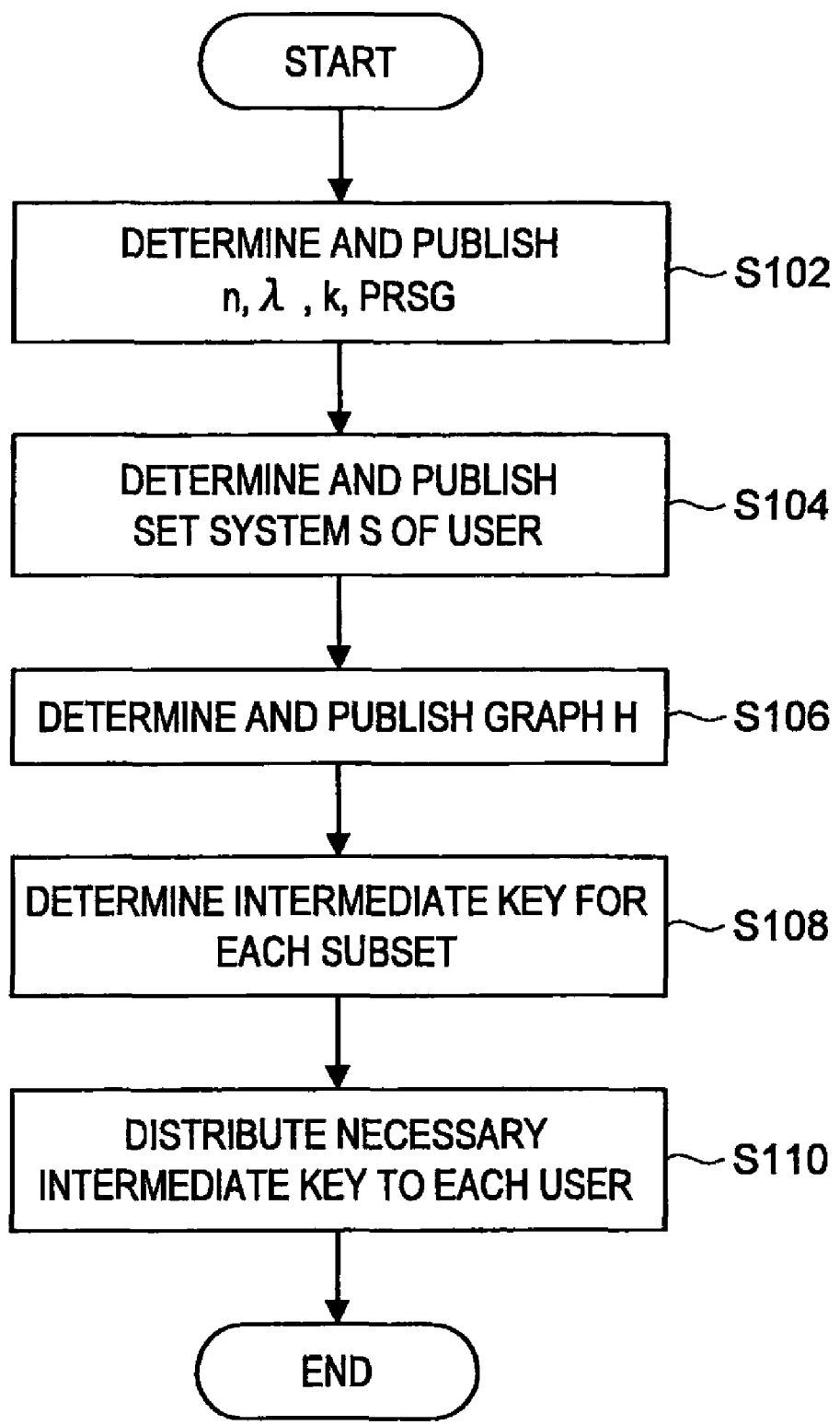
FIG. 5 A flowchart showing a directed graph calculation method according to the basic scheme.

The processing until distributing the intermediate keys to the terminal unit of each user is briefly summarized with reference to FIG. 5. FIG. 5 is a flowchart showing the process flow for the intermediate key distribution in the key distribution server upon system setup.

As shown in FIG. 5, the key distribution server of the key distribution system first sets parameters and so on. For example, the key distribution server determines the number n of users, the number λ of bits of the set key and the intermediate key, a given parameter k, a pseudo-random number generation algorithm by PRSG and so on and publishes them to the terminal units of all users (S102). Next, the key distribution server divides a set of users into given subsets and then determines and publishes the set system Φ (cf. the above expression (1)) represented by the union (S104). Then, it determines and publishes the directed graphs H and the directed edges T forming the respective directed graphs H (S106). Further, it determines the intermediate keys corresponding to the respective subsets constituting the set system Φ (S108). After that, it distributes the necessary intermediate keys to the terminal unit 122 of each user, so that each user can derive the set key corresponding to the subset that includes the user (S110).

The distribution method of the intermediate keys is described in the foregoing. If the above distribution method is used, the minimum number of intermediate keys necessary for the terminal unit of each licensed user to generate the set keys is distributed, thereby enabling reduction of the traffic between the key distribution server and the terminal unit and the memory capacity for the intermediate keys in the terminal unit of each user.

(Distribution of Contents Keys)

A method of distributing the encrypted contents key mek by the key distribution server is described hereinafter. First, the key distribution server encrypts the contents key mek using the set key that can be generated by the terminal unit 122 of a licensed user only. Specifically, the key distribution server determines a set R of the terminal units of users to be excluded (hereinafter referred to as excluded users) and then determines a set N\R of the terminal units of licensed users (hereinafter referred to as the "set (N\R) of licensed users") by excluding the set R of the terminal units of excluded users (hereinafter referred to as the "set (R) of excluded users") from the set N of the terminal units 1 to n of all users. Then, the set of licensed users (N\R)=S1∪S2∪ . . . ∪Sm is represented by the union of the subsets Si (i=1, 2, . . . , m) selected from the subsets constituting the set system Φ. Although there are a large number of combinations of the subsets Si, the subset Si with the minimum value of m is selected. After selecting the subset Si in this manner, the key distribution server encrypts the contents key mek using the set key k(Si) corresponding to each subset Si. Specifically, the contents key mek is encrypted by the set key k(S1), k(S2), . . . , k(Sm) and becomes the m-number of encrypted contents keys mek. Then, the m-number of encrypted contents keys mek are distributed to the terminal units 1 to n of all users. At this time, the information indicating the set N\R of licensed users or the information indicating the m-number of subsets Si are also distributed to the terminal units 1 to n of all users.

Figure 6:
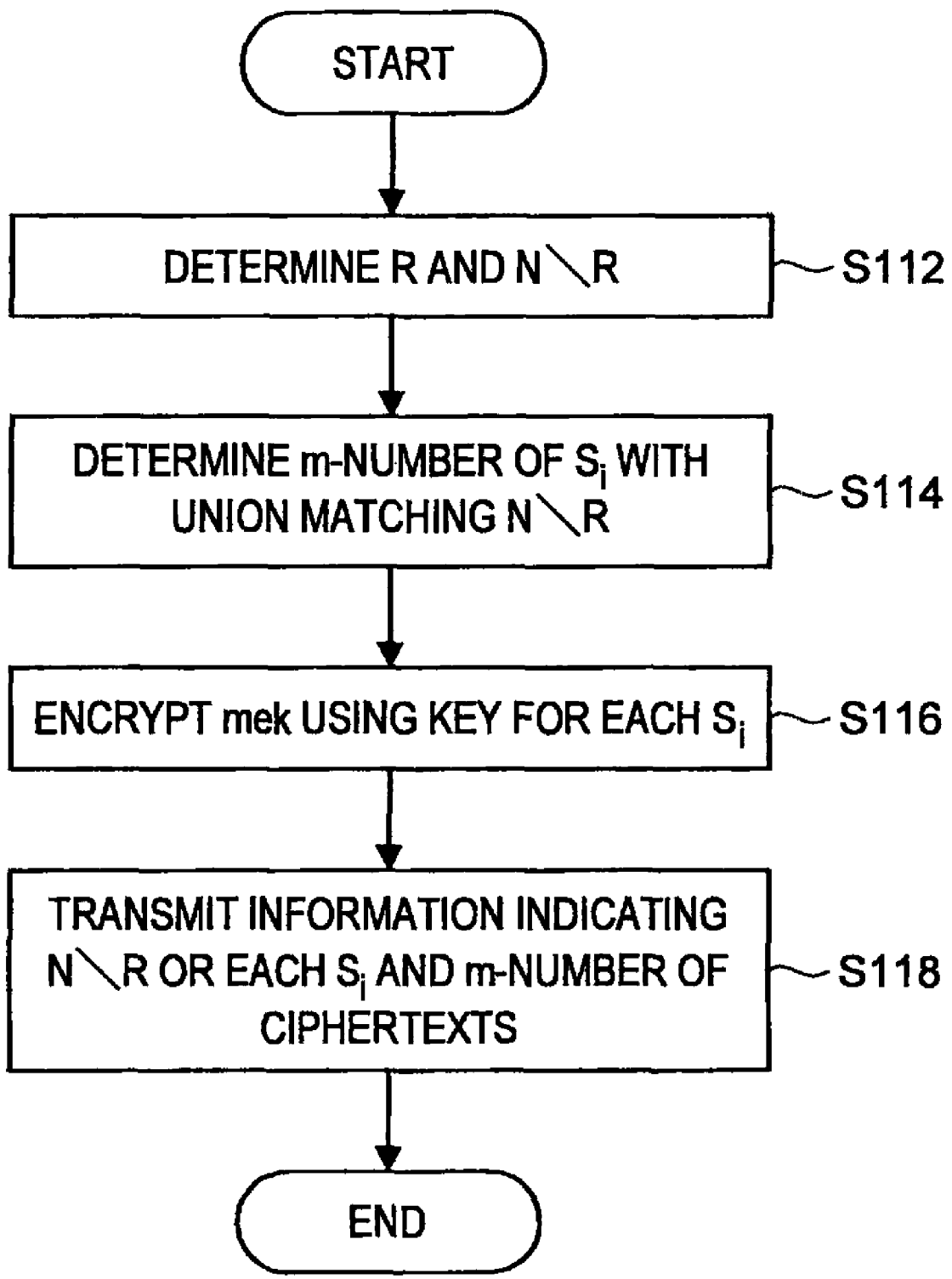
FIG. 6 A flowchart showing an intermediate key distribution method according to the basic scheme.

The process flow for the distribution of the encrypted contents key mek is briefly summarized with reference to FIG. 6. FIG. 6 is a flowchart showing the process flow for the distribution of the contents key.

As shown in FIG. 6, the key distribution server first determines the set R of excluded users and obtains the set N\R of licensed users (S112). Next, it selects the m-number of subsets Si (i=1, 2, . . . , m) having the union of N\R from the subsets constituting the set system Φ in such a way that the value of m is minimum (S114). Then, it encrypts the contents key mek using the set keys k(Si) corresponding respectively to the selected subsets Si (S116). Further, it distributes the information indicating the set N\R of licensed users or the respective subsets Si and the m-number of encrypted contents keys mek to the terminal units 1 to n of all users (S118).

The encryption method and the distribution method of the contents key mek are described in the foregoing. If the above encryption method is used, the subsets Si are selected efficiently in such a way that the number of set keys is the minimum necessary. Because the contents key mek is thereby encrypted using the minimum necessary number of set keys, it is possible to save the amount of calculations necessary for encryption and also reduce the number of encrypted contents keys mek to be distributed, thereby reducing the traffic.

(Decryption of Contents Keys)

Decryption processing of the encrypted contents key in the terminal unit of each user is described hereinafter. The decryption processing is such that the terminal unit obtains the contents key mek based on the information indicating the set N\R of licensed users or the m-number of subsets Si and the m-number of ciphertexts received from the key distribution server described above.

The terminal unit receives the encrypted contents key and the information indicating the set N\R of licensed users or the information indicating the m-number of subsets Si from the key distribution server described above. Further, the terminal unit analyzes the information and decides whether it belongs to any of the m-number of subsets Si. If the terminal unit does not belong to any of the subsets, it ends the decryption processing because it is the terminal unit of an excluded user. On the other hand, if the terminal unit finds the subset Si to which it belongs, it derives the set key k(Si) corresponding to the subset Si using the above-described PRSG. The configuration of the PRSG is as described earlier.

In this step, if the terminal unit is provided with the intermediate key t(Si) corresponding to the above subset Si from the key distribution server in advance upon system setup and holds it beforehand, it can derive the set key k(Si) corresponding to the above subset Si by inputting the intermediate key t(Si) to the PRSG. On the other hand, if the terminal unit does not hold the relevant intermediate key t(Si), the terminal unit can derive a desired set key k(Si) by repeatedly inputting the held intermediate key to the PRSG. Further, the terminal unit decrypts the encrypted contents key mek using the set key k(Si) derived in this manner.

Derivation of the above-described set key k(Si) in the terminal unit is specifically described with reference to the example of FIG. 4. In the terminal unit of the user 3, it is assumed that "1, 8" is selected as the subset to which it belongs. The terminal unit of the user 3 holds the intermediate key for the subset [1, 4] as described above. Referring to the directed graph H(1→64) of FIG. 4, the directed edge extending from the coordinate point [1, 4] to the coordinate point [1, 8] is set, and this directed edge has the third shortest length (jump distance) among the directed edges whose tails are at the coordinate point [1, 4]. Thus, among the outputs when inputting the intermediate key t([1, 4]) for the subset [1, 4] to the PRSG, the third $\lambda$-bit portion from the top is the intermediate key t([1, 8]) for the subset [1, 8]. The terminal unit extracts the intermediate key t([1, 8]) from the output of the PRSG, inputs it again to the PRSG and extracts the final $\lambda$-bit portion, thereby obtaining the desired set key k([1, 8]).

Likewise, in the terminal unit of the user 1, it is assumed that [1, 8] is selected as the subset to which it belongs. The terminal unit of the user 1 holds the intermediate key for the subset [1, 1]. In such a case, the terminal unit 122 can obtain a desired set key k([1, 8]) by extracting the first $\lambda$-bit portion from the top (which corresponds to the intermediate key t([1, 2]) from the outputs when inputting the intermediate key t([1, 1]) for [1, 1] to the PRSG, then extracting the second $\lambda$-bit portion from the top (which corresponds to the intermediate key t([1, 4]) from the outputs when inputting the intermediate key t([1, 2]) to the PRSG, further extracting the third $\lambda$-bit portion from the top (which corresponds to the intermediate key t([1, 8]) from the outputs when inputting the intermediate key t([1, 4]) to the PRSG, and finally extracting the final portion (which corresponds to the set key k([1, 8]) from the outputs when inputting the intermediate key t([1, 8]) to the PRSG.

Figure 7:
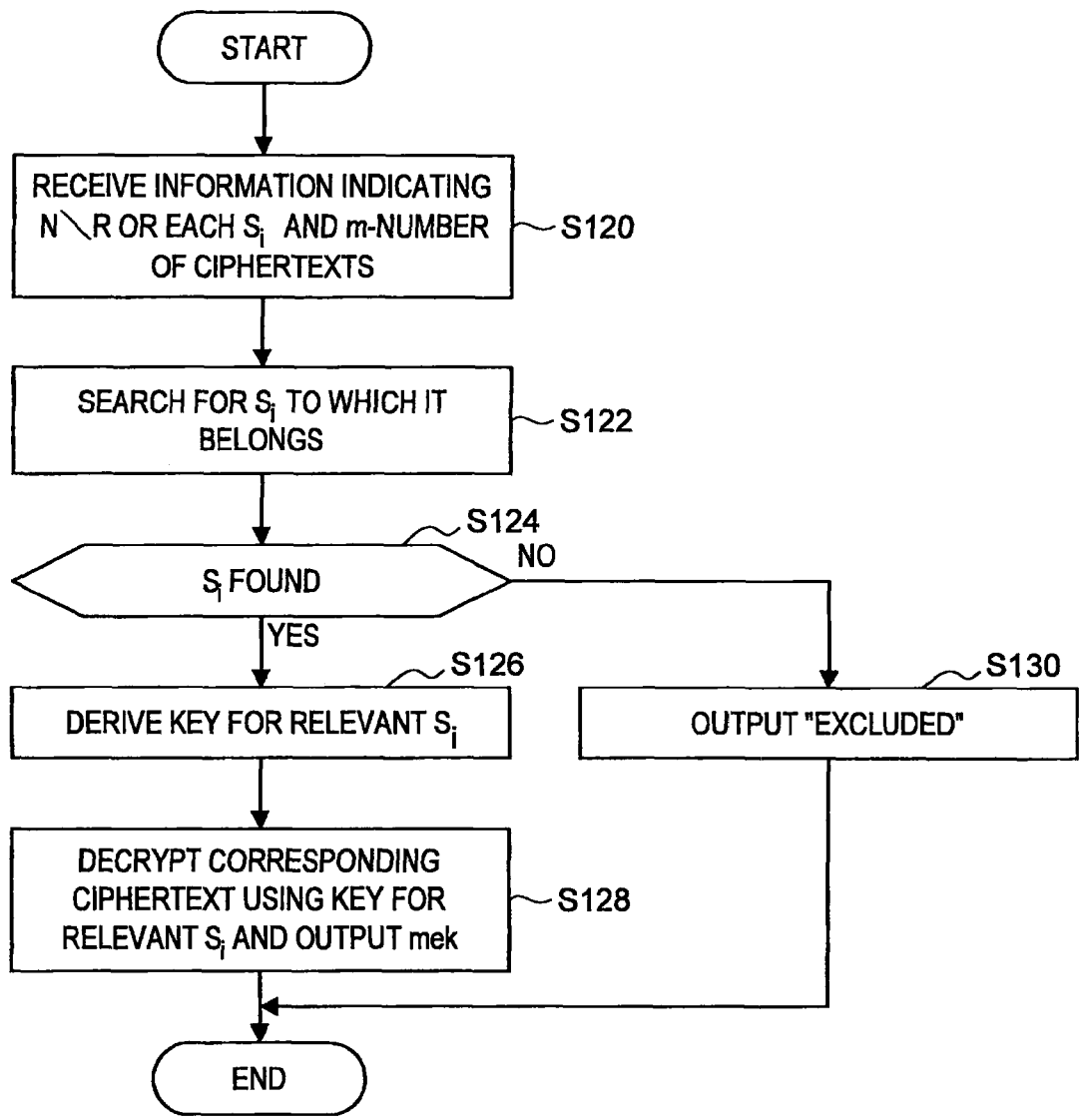
FIG. 7 A flowchart showing a set key generation method according to the basic scheme.

The process flow for decrypting the encrypted contents key mek in the terminal unit of each user is summarized with reference to FIG. 7. FIG. 7 is a flow chart showing the process flow for the decryption of the contents key in the terminal unit of each user.

As shown in FIG. 7, the terminal unit of each user first receives the m-number of encrypted contents keys mek and the information indicating the set N\R of licensed users or the information indicating the m-number of subsets Si (i=1, 2, . . . , m) from the key distribution server (S120). Next, the terminal unit searches for the subset Si to which it belongs based on the information (S122) and decides whether it belongs to any of the m-number of subsets Si (Step S124).

As a result, if the terminal unit finds the subset Si to which it belongs, it derives the set key k(Si) corresponding to the subset Si using the above PRSG (S126). The configuration of the PRSG is as described earlier. If the terminal unit is provided with the intermediate key t(Si) corresponding to the subset Si by the key distribution server upon setup and holds it beforehand, it can derive the set key k(Si) by using the PRSG once. On the other hand, if the terminal unit does not hold the relevant intermediate key t(Si), it can derive the desired set key k(Si) by using the PRSG repeatedly. After that, the terminal unit decrypts the encrypted contents key mek using the set key k(Si) derived in this way (S128).

On the other hand, if the terminal unit decides in the step S124 that it does not belong to any of the subsets Si, the terminal unit displays and outputs that it is excluded from the terminal unit allowed to access the contents (i.e. it is an excluded user) (S130) and ends the decryption processing of the contents key.

The decryption method of the contents key in the terminal unit is described in the foregoing. The above decryption scheme is executed based on the information about the directed graph H with use of the PRSG for generating the intermediate key and the set key. Thus, the information about the directed graph and the PRSG are necessary in the terminal unit of each user as well. However, the method of using the PRSG enables minimization of the number of intermediate keys to be held by the terminal unit of each user.

Figure 13:
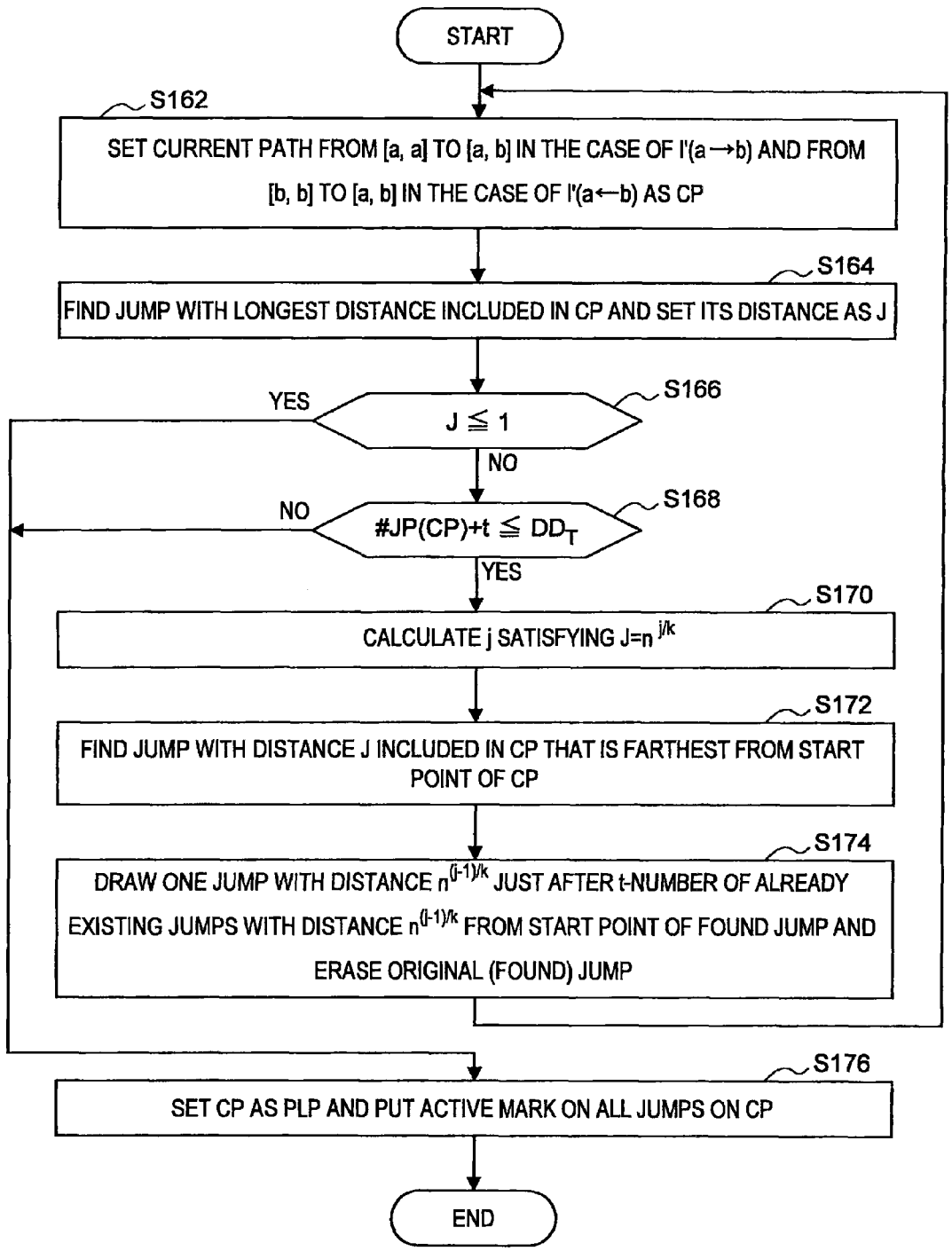
FIG. 13 A flowchart showing a directed graph generation method (PLP determination) according to the embodiment.

The encryption key distribution scheme according to the basic technology of the embodiment is described in the foregoing. With the use of the basic scheme, the number of intermediate keys to be held by the terminal unit of each user is $O(k*\log(n))$, and the amount of calculations (the number of times of operations of the PRSG) necessary for generation of the set key does not exceed $(2k-1)*(n^{1/k}-1)$. However, the encryption key distribution scheme according to the basic technology has a problem that the number of intermediate keys to be held by the terminal unit of each user is still large as shown in FIG. 13 described later.

Further, the dominant of the amount of calculations necessary for the terminal unit when decrypting the encrypted contents key mek depends on the number of times to execute the PRSG for deriving a desired intermediate key. The worst value is represented by the number of directed edges (i.e. the number of jumps) from the initial coordinate point (root) to the farthest final coordinate point (the leaf from which no directed edge originates) in the directed graph H. In the example shown in FIG. 4, in order to reach the final coordinate point [1, 64] from the initial coordinate point [1, 1] of the directed graph H(1→64), it is necessary to go through eleven directed edges (execute eleven times of jumps), which means to execute the PRSG as many as eleven times. Thus, the encryption key distribution scheme according to the basic technology has another problem that the number of execution times of the PRSG is large and thus the amount of calculations for deriving the intermediate key is large.

The inventors of the present invention have conducted extensive studies for solving the above problems and developed an encryption key distribution scheme according to a first embodiment of the present invention as described hereinbelow. The encryption key distribution scheme according to the embodiment reconstructs the directed graph by replacing a directed edge constituting a directed graph with a shorter directed edge, thereby achieving reduction of the number of intermediate keys to be held by the terminal unit 122. Hereinafter, the functional configurations of the key distribution server 102 and the terminal unit 122 that implement the encryption key distribution scheme according to the embodiment, and features and advantages of the encryption key distribution scheme are described in detail.

[Configuration of the Key Distribution Server 102]

Figure 8:
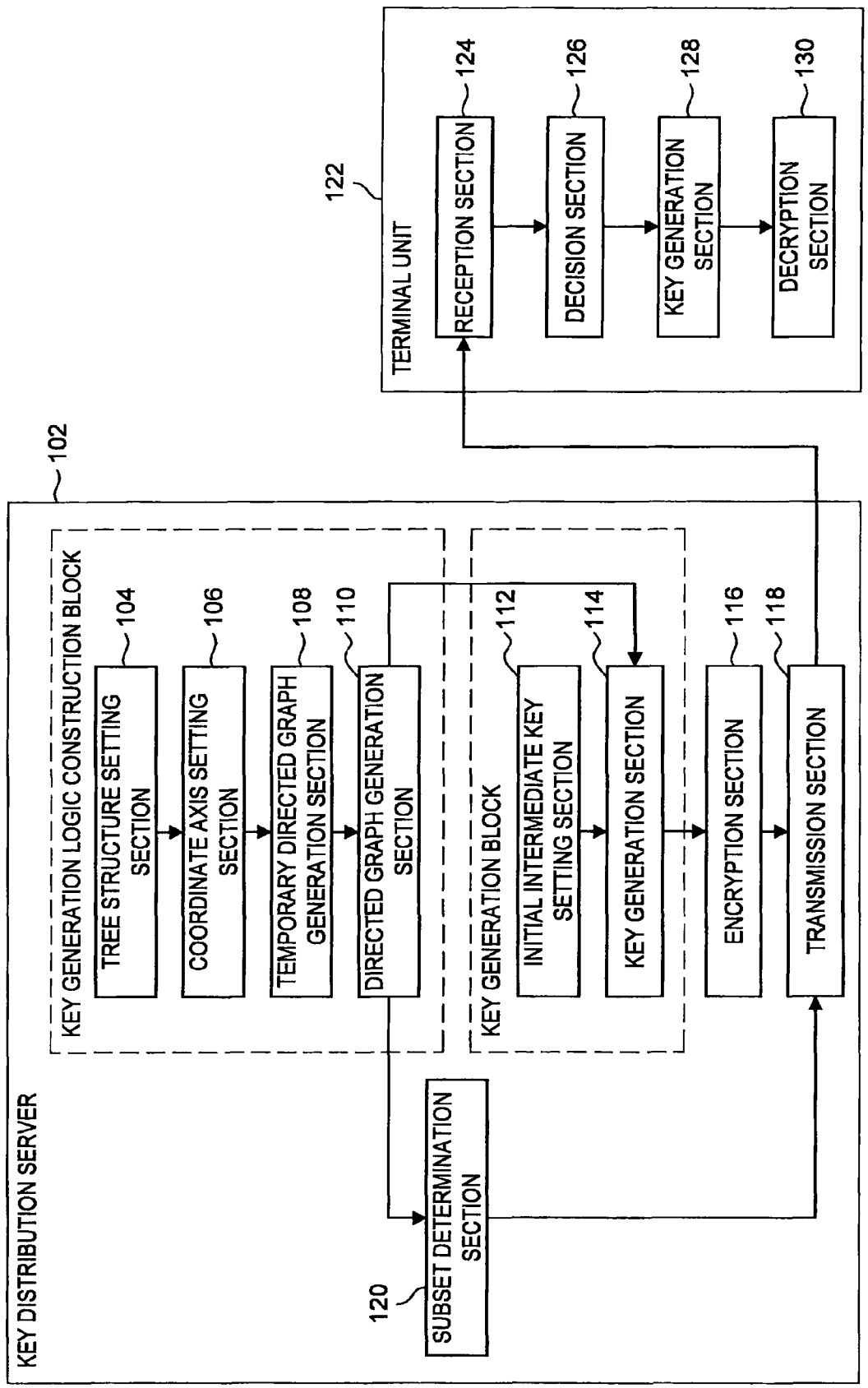
FIG. 8 A block diagram showing configurations of a key distribution server and a terminal unit according to a first embodiment of the present invention.

The configuration of the key distribution server 102 according to the embodiment is described hereinafter in detail with reference to FIG. 8. FIG. 8 is a block diagram showing the configurations of the key distribution server 102 and the terminal unit 122 according to the embodiment.

As shown in FIG. 8, the key distribution server 102 is composed of a tree structure setting section 104, a coordinate axis setting section 106, a temporary directed graph generation section 108, a directed graph generation section 110, an initial intermediate key setting section 112, a key generation section 114, an encryption section 116, a transmission section 118, and a subset determination section 120. Particularly, the tree structure setting section 104, the coordinate axis setting section 106, the temporary directed graph generation section 108 and the directed graph generation section 110 are collectively referred to as a key generation logic construction block. Likewise, the initial intermediate key setting section 112 and the key generation section 114 are collectively referred to as a key generation block.

The elements constituting the key generation logic construction block are described hereinafter. The key generation logic construction block performs processing corresponding to (Setting of a tree structure) and (Generation of directed graphs) in [Description of the basic technology] described above.

(Tree Structure Setting Section 104)

The tree structure setting section 104 configures a binary tree composed of n-number of leaf nodes to which numbers 1 to n (n is a natural number) are assigned, a root node, and a plurality of intermediate nodes other than the root node and the leaf nodes, and sets the number of the leaf node located at the left end to lv, and the number of the leaf node located at the right end to rv, among a plurality of leaf nodes located at the lower level of a certain intermediate node v or root node v. Further, the tree structure setting section 104 assigns a set (1→n) and a set (2←n) to the root node, and if a certain intermediate node v is located on the left of its parent node, it assigns a set (lv+1←rv) to the intermediate node, and if an intermediate node v is located on the right of its parent node, it assigns a set (lv→rv−1) to the intermediate node.

As described above, the tree structure setting section 104 has a configuration capable of constructing a m-level tree structure, and assuming the case of m=2 (binary tree), for example, it can construct a tree structure identical to the binary tree structure according to the basic scheme (FIG. 3). Thus, the meaning of each node of the tree structure constructed by the tree structure setting section 104 is substantially the same as the meaning of each node of the binary tree structure constructed according to the basic scheme described earlier. Although only the binary tree structure is described hereinafter for convenience of description, it is not limited thereto.

(Coordinate Axis Setting Section 106)

The coordinate axis setting section 106 sets a first horizontal coordinate axis corresponding to the root node on which the coordinate points correlated with the respective subsets included in the set (1→n) are arranged in such a way that the degree of inclusion becomes larger from left to right on the horizontal coordinate axis. Next, the coordinate axis setting section 106 sets a second horizontal coordinate axis corresponding to the root node on which the coordinate points correlated with the respective subsets included in the set (2←n) are arranged in such a way that the degree of inclusion becomes larger from right to left on the horizontal coordinate axis. Then, the coordinate axis setting section 106 sets a third horizontal coordinate axis corresponding to a certain intermediate node v on which the coordinate points correlated with the respective subsets included in the set (lv→rv−1) are arranged in such a way that the degree of inclusion becomes larger from left to right on the horizontal coordinate axis, for each of the intermediate nodes, and a fourth horizontal coordinate axis corresponding to a certain intermediate node v on which the coordinate points correlated with the respective subsets included in the set (lv+1←rv) are arranged in such a way that the degree of inclusion becomes larger from right to left on the horizontal coordinate axis. Further, the coordinate axis setting section 106 places one temporary coordinate point each on the left of the coordinate point located at the left end of the first to fourth horizontal coordinate axes and on the right of the coordinate point located at the right end of the second to fourth horizontal coordinate axes, and sets the coordinate point located at the right end of the first horizontal coordinate axis as a temporary coordinate point.

As described above, the coordinate axis setting section 106 sets the coordinate axes for constructing the directed graphs corresponding to the respective nodes of the tree structure configured by the tree structure setting section 104. The first horizontal coordinate axis indicates a coordinate axis corresponding to the set (1→n), the second horizontal coordinate axis indicates a coordinate axis corresponding to the set (2←n), the third horizontal coordinate axis indicates a coordinate axis corresponding to the set (lv→rv−1), and the fourth horizontal coordinate axis indicates a coordinate axis corresponding to the set (lv+1←rv). Because the third horizontal coordinate axis and the fourth horizontal coordinate axis are set for each intermediate node v, a plurality of coordinate axes are set respectively. Specifically, the same number of the third horizontal coordinate axes and the fourth horizontal coordinate axes as the number of intermediate nodes are set.

(Temporary Directed Graph Generation Section 108)

The temporary directed graph generation section 108 sets a given integer k and calculates a natural number x that satisfies $n^{(x-1)/k} < (rv-lv+) \leq n^{x/k}$. Next, the temporary directed graph generation section 108 forms a directed path whose start point is at the leftmost coordinate point on the first and third horizontal coordinate axes by coupling one or a plurality of rightward directed edges having a length of $n^{i/k}$, and further forms a directed path whose start point is at the rightmost coordinate point on the second and fourth horizontal coordinate axes by coupling one or a plurality of leftward directed edges having a length of $n^{i/k}$, for each of the integer i=0 to x−1. Then, the temporary directed graph generation section 108 excludes all directed edges whose tails or heads are at each temporary coordinate point, for each of the first to fourth horizontal coordinate axes. Further, the temporary directed graph generation section 108 excludes directed edges other than the longest directed edge from directed edges reaching each coordinate point on the first to fourth horizontal coordinate axes, thereby generating temporary directed graphs I'(1→n−1), I'(2←n), I'(lv+1←rv) and I'(lv→rv−1) related to the set (1→n−1), the set (2←n), the set (lv+1←rv) and the set (lv→rv−1), respectively. After that, the temporary directed graph generation section 108 adds a directed edge having a length of 1 whose head is at the coordinate point located at the right end of the first horizontal coordinate axis to the temporary directed graph I'(1→n−1) related to the set (1→n−1), thereby generating a temporary directed graph I'(1→n) related to the set (1→n).

As described above, the temporary directed graph generation section 108 generates the temporary directed graph I' as preprocessing of generating a desired directed graph I. The temporary directed graph I' corresponds to the directed graph H in the basic scheme.

(Directed Graph Generation Section 110)

The directed graph generation section 110 determines the longest directed path with the maximum number of directed edges forming the directed path among the directed paths formed by successive directed edges. Processing of determining the longest directed path may be executed by a longest directed path determination section which is included in the directed graph generation section 110, for example. Further, the directed graph generation section 110 replaces the directed edge forming each directed path with a shorter directed edge in such a way that the number of directed edges of each directed path does not exceed the number of directed edges of the longest directed path, thereby generating the directed graph.

As described above, the directed graph generation section 110 replaces the directed edge constituting the temporary directed graph I' with a shorter directed edge to thereby reconstruct the temporary directed graph I' and generate a desired directed graph I. The technical idea and the process flow related to the reconstruction of the temporary directed graph I' that is executed by the directed graph generation section 110 are described hereinafter in detail.

Figure 9:
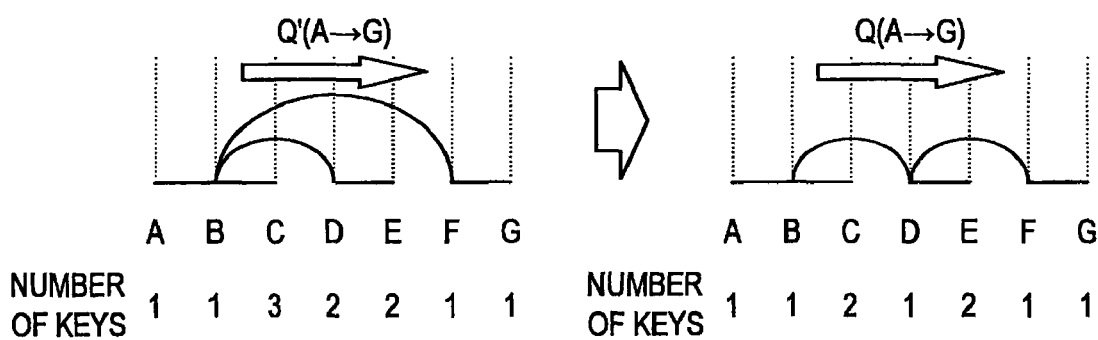
FIG. 9 An explanatory view showing the basic concept of a directed graph generation method according to the embodiment.

First, the basic concept related to the processing of the directed graph generation section 110 is described with reference to FIG. 9. FIG. 9 is an explanatory view schematically showing the process of the directed graph generation section 110.

Referring to FIG. 9, two directed graphs Q'(A→G) and Q(A→G), which are created for explanation, are plotted. The directed graph Q'(A→G) corresponds to the basic scheme, and the directed graph Q(A→G) corresponds to the embodiment. Further, a plurality of vertical lines are plotted in addition to each directed graph, and any of the marks A to G is assigned to each vertical line. The marks A to G respectively indicate the terminal units of users. In the above description of the basic scheme, explanation is given by assigning the marks 1 to n to users, and they correspond thereto. Therefore, subsets [A,A], [A, B], . . . , [A, G] are assigned from the left to the coordinate points of each coordinate axis. Further, the number of intermediate keys to be held by the user corresponding to each vertical line is described below each coordinate point.

As a review of the matters mentioned in the description of the basic scheme, the directed graph Q'(A→G) is briefly described firstly. The directed graph Q'(A→G) is composed of four directed edges (A⇒B, B⇒C, D⇒E, F⇒G) with a length of 1, one directed edge (B⇒D) with a length of 2, and one directed edge (B⇒F) with a length of 4. Considering a directed path P([A, A], [A, G]) from the coordinate point [A, A] to the coordinate point [A, G], the directed path P([A, A], [A, G]) is represented by a chain of directed edges made up of the directed edge (A⇒B) with a length of 1, the directed edge (B⇒F) with a length of 4 and the directed edge (F⇒G) with a length of 1.

Therefore, the user A who has the intermediate key t([A, A]) can derive (1) the intermediate key t([A, B]) by inputting the intermediate key t([A, A]) to the PRSG, (2) the intermediate keys t([A, C]), t([A, D]) and t([A, F]) by inputting the intermediate key t([A, B]) to the PRSG, and (3) the intermediate key t([A, G]) by inputting the intermediate key t([A, F]) to the PRSG. Thus, it is necessary for the user A to execute the PRSG the same number of times (three times) as the number of directed edges forming the directed path P([A, A], [A, G]) in order to derive the intermediate key t([A, G]) corresponding to the end point of the directed path P([A, A], [A, G]). It is the number of times that determines the amount of calculations of the user. In the case of the directed graph Q'(A→G), because the directed path P([A, A], [A, G]) and the directed path P([A, A], [A, E]) have the maximum number of directed edges, the length of those directed paths corresponds to the worst value of the amount of calculations of the user.

On the other hand, each user should be able to generate all intermediate keys corresponding to the subsets to which the user belongs. For this reason, the intermediately key to be held by a user in advance should be such that a plurality of intermediate keys to be generated by repeatedly using the PRSG include all intermediate keys corresponding to the subsets to which it belongs. Further, the intermediately key to be held by each user should be selected so as to minimize its number. Thus, a user selects a coordinate point such that a subset corresponding to the tail of a directed edge reaching the coordinate point does not include the user from the coordinate points corresponding to the subsets to which the user belongs by referring to the directed graph and holds the intermediate key corresponding to the coordinate point.

Consider, for example, the intermediately key to be held by the user C by referring to the directed graph Q'(A→G). The subsets to which the user C belongs are [A, C], [A, D], . . . , [A, G]. Focusing attention on the directed graph Q'(A→G), the tails of the directed edges that reach the subsets [A, C], [A, D], [A, F] are all the coordinate point [A, B], which does not include the user C. Thus, the user C needs to hold the intermediate keys t([A, C]), t([A, D]) and t([A, F]). Actually, the number of intermediate keys to be held by each user is represented by the number of intersections between the vertical line corresponding to each user and the directed graph. For example, the user D needs to hold two intermediate keys because the number of intersections is two. By the above method, the number of intermediate keys to be held by each user is calculated and described below each directed graph.

The above explanation only describes the meaning of the directed graph briefly. Based on the above explanation, the basic concept of the present embodiment is described hereinafter. As already mentioned, the embodiment aims at reducing the number of keys without increasing the amount of calculations. In view of this, an approach to be taken to reduce the number of keys is described hereinbelow.

Refer now back to FIG. 9. If the key distribution scheme based on the directed graph Q'(A→G) is employed, the user C having three keys at maximum exists. Further, the number of keys held by all users is eleven. Then, the directed graph Q'(A→G) is changed to the directed graph Q(A→G). Specifically, the directed edge E([A, B], [A, F]) extending from the coordinate point [A, B] to [A, F] is replaced with the directed edge E([A, D], [A, F]) extending from the coordinate point [A, D] to [A, F]. If such a change is made, the maximum value of the number of keys to be held by each user is two, which corresponds to the user C and the user E. Further, the number of keys held by all users is nine. Thus, the number of keys decreases before and after the change. In this example of change, however, the amount of calculations is not taken into consideration. Therefore, the directed graph Q(A→G) includes four directed edges in the directed path P([A, A], [A, G]) from the coordinate point [A, A] to [A, G], and the worst value of the amount of calculations slightly increases compared to the directed graph Q'(A→G).

In light of this, the embodiment provides the configuration of the directed graph generation section 110 that enables reduction of the number of keys based on the basic concept shown in FIG. 9 under the condition that the change of the directed graph which causes exceeding of the worst value of the amount of calculations is not made. A method of generating the directed graph I by the directed graph generation section 110 is described specifically hereinafter with reference to FIGS. 10 to 14.

Figure 10:
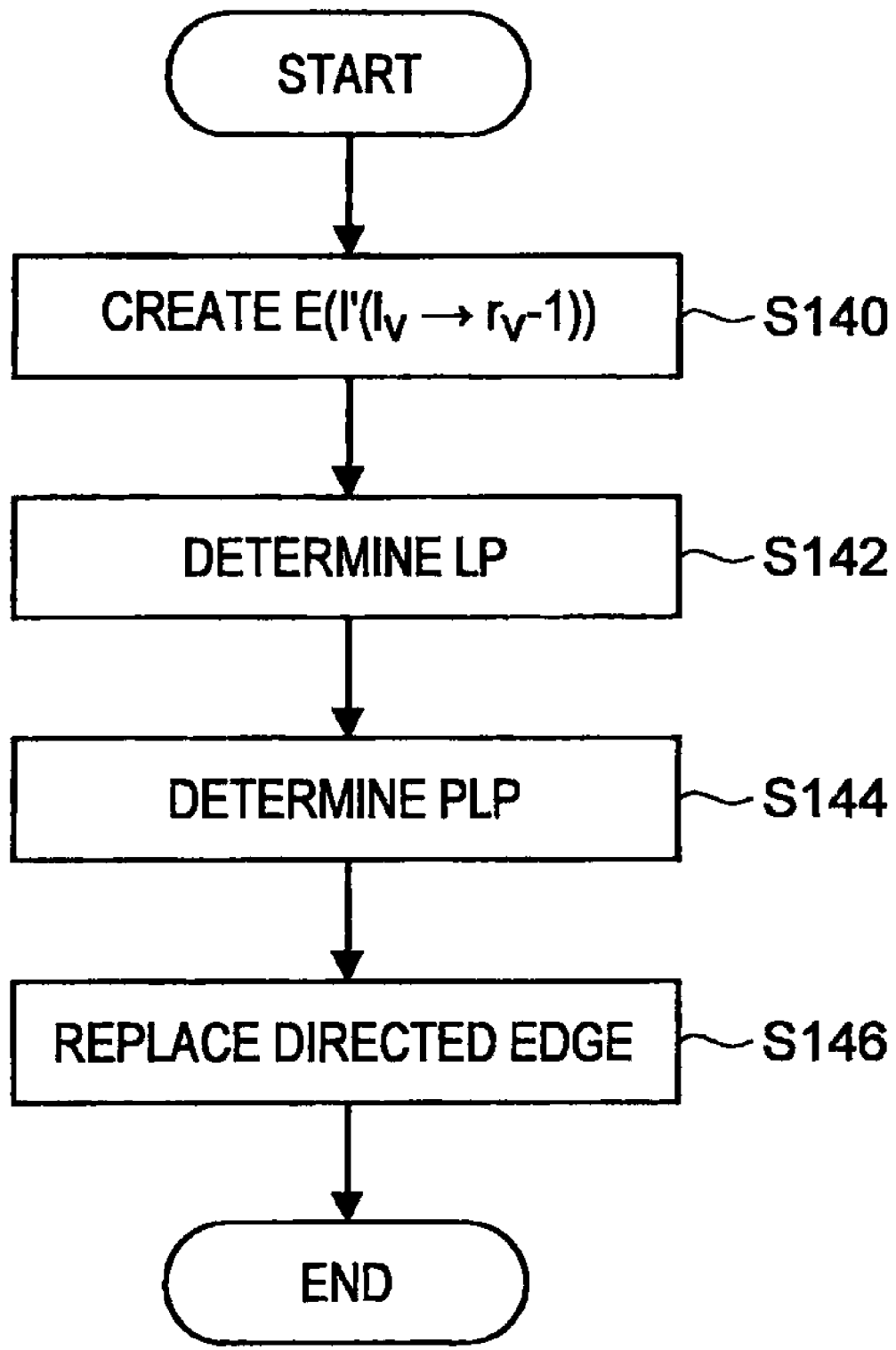
FIG. 10 A flowchart showing a directed graph generation method according to the embodiment.

Referring first to FIG. 10, the outline of the directed graph generation method by the directed graph generation section 110 is described briefly. FIG. 10 is a flowchart showing an example of the process flow to generate a directed graph.

First, the directed graph generation section 110 uses the temporary directed graph I' which is generated by the temporary directed graph generation section 108 in order to generate a desired directed graph I. As described earlier, the temporary directed graph I' is generated in the same way as the directed graph H by the basic scheme. Generation of the temporary directed graph I' by the temporary directed graph generation section 108 is performed as the first step (S140).

Then, the directed graph generation section 110 extracts the longest directed path LP (Longest Path) from the directed paths constituting all of the generated temporary directed graphs I' (S142). The step of extracting the directed path LP may be executed by a longest directed path generation section, which is included in the directed graph generation section 110, for example. Further, it extracts the longest directed path PLP (Partially Longest Path) from each of all the generated temporary directed graphs I' that do not include the longest directed path LP (S144). Thus, the directed path PLP is extracted from each temporary directed graph I'. After that, a given directed edge is selected from the directed edges constituting the temporary directed graphs I' and replaced with a shorter directed edge (S146). At this time, the directed graph generation section 110 executes the replacement of the directed edges based on the length of the extracted directed path LP and the directed path PLP under the above-described condition that the worst value of the amount of calculations does not increase. Further, the above-described directed edge replacement step may be executed by a directed edge replacement section, which is included in the directed graph generation section 110, for example.

The outline of the directed graph generation step by the directed graph generation section 110 is described in the foregoing. As described above, the directed graph generation section 110 extracts the directed path LP and the directed path PLP from the temporary directed graphs I' generated by the temporary directed graph generation section 108 and then selects and replaces a given directed edge based on the length of those directed paths, thereby generating a desired directed graph. More detailed explanation corresponding to each step described above is given hereinbelow.

Figure 11:
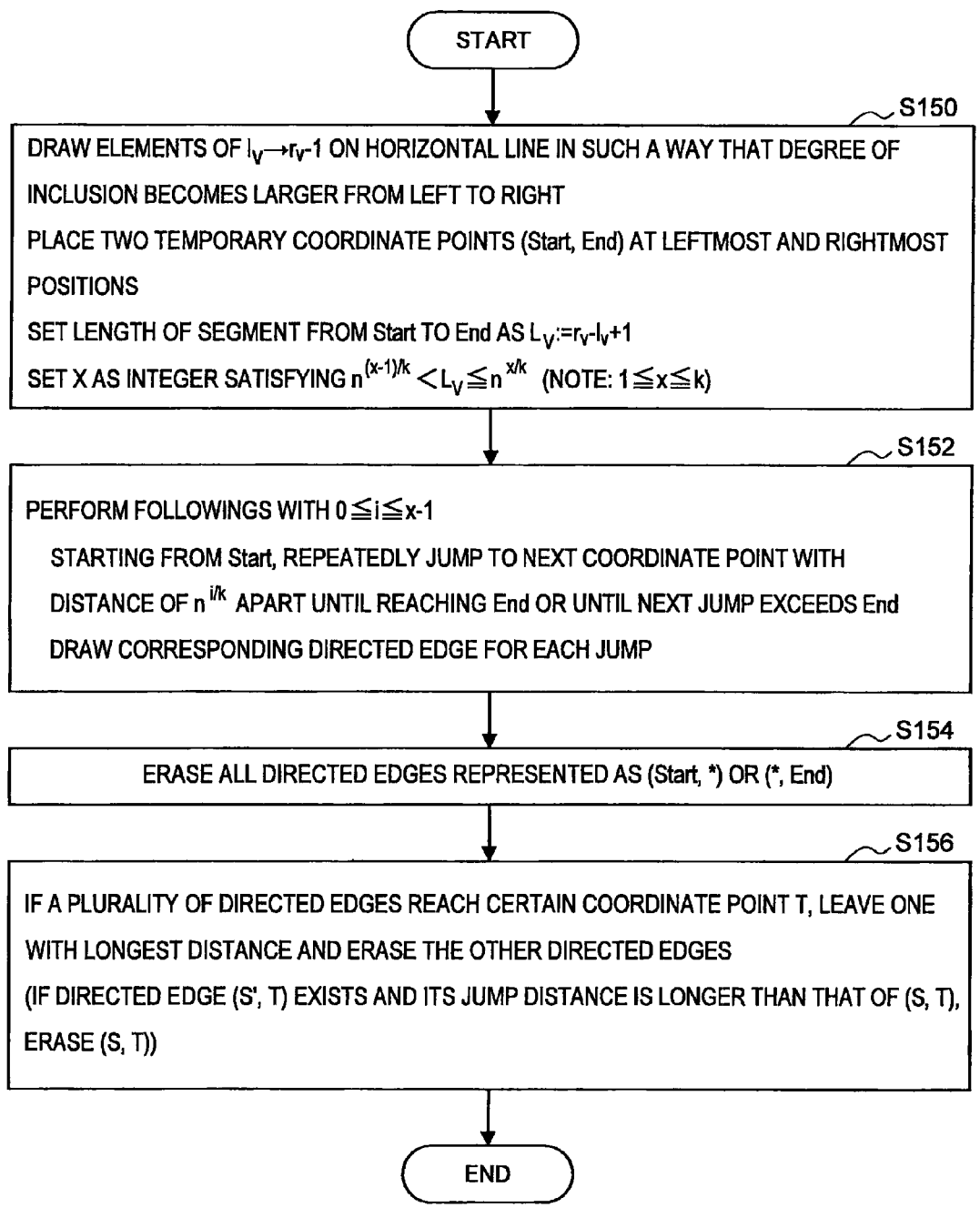
FIG. 11 A flowchart showing a (temporary) directed graph generation method according to the embodiment.

Referring first to FIG. 11, the generation step of the temporary directed graphs I' is described. It is noted that only the directed graph I' (lv→rv−1) corresponding to the intermediate node v, among the temporary directed graphs I', is described in the followings. First, the temporary directed graph generation section 108 sets a given integer k, defines Lv=rv−lv+1 and calculates an integer x that satisfies $n^{(x-1)/k} < Lv \leq n^{x/k}$ (S150). The temporary directed graph generation section 108 performs the following operations by changing the counter i from 0 to x−1. Starting from the start point at the left end of the horizontal coordinate axis, it repeats setting of a rightward directed edge extending to a coordinate point that is $n^{i/k}$ apart from the coordinate point (jump to a coordinate point that is $n^{i/k}$ apart from the coordinate point) until the head of the directed edge reaches the end point at the right end of the horizontal coordinate axis or the head of the directed edge to be set next exceeds the end point (S152). Then, the temporary directed graph generation section 108 eliminates all the directed edges whose tails or heads are at the temporary coordinate point (S154). Further, the temporary directed graph generation section 108 eliminates the directed edges other than the longest directed edge among the directed edges reaching the respective coordinate points on the coordinate axis (S156).

Figure 12:
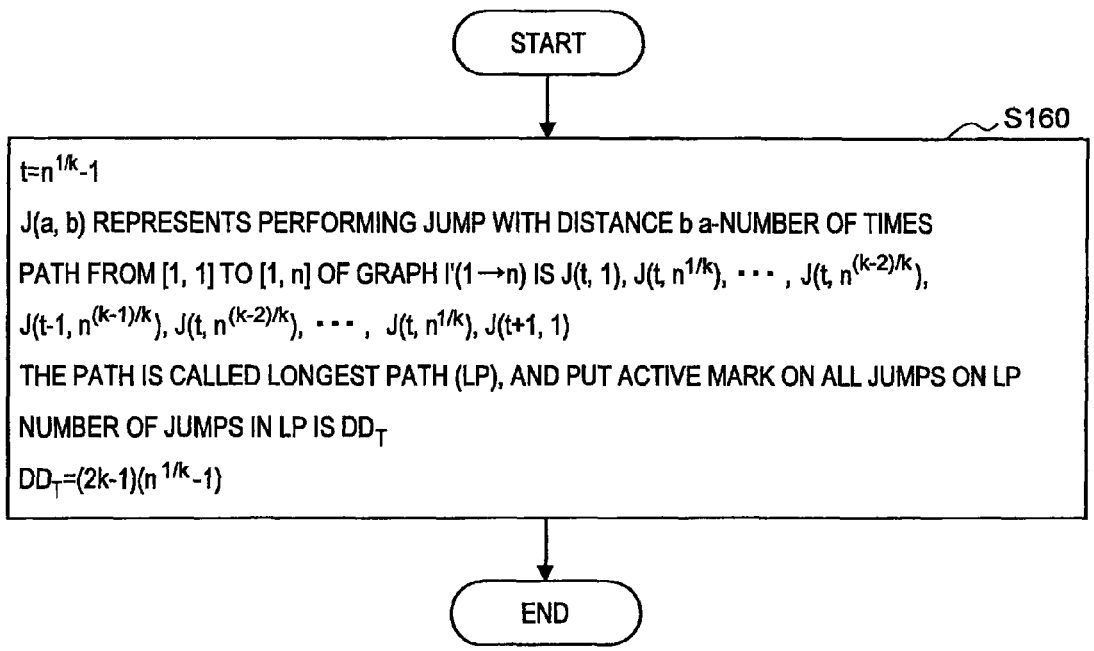
FIG. 12 A flowchart showing a directed graph generation method (LP determination) according to the embodiment.

Referring next to FIG. 12, the step of extracting the longest directed path LP (S160) is described hereinafter. Prior to description of the longest directed path LP, two expressions are defined as follows.

DDT: indicating the length of the longest directed path LP.

J(a, b): indicating that a-number of successive directed edges having a length of b exist in a certain directed path.

(For example, taking the directed graph Q'(A→G) shown in FIG. 9 as an example, because the directed path P([A, A], [A, G]) is made up of one directed edge with a length of 1, one directed edge with a length of 4 and one directed edge with a length of 1, it is represented as J(1, 1), J(1, 4), J(1, 1)).

The directed graph generation section 110 can calculate J(a, b) for each of the directed paths constituting the temporary directed graph I'. For example, considering the directed path P([1, 1], [1, n]) from the coordinate point [1, 1] to [1, n] of the temporary directed graph I'(1→n), the directed path P([1, 1], [1, n]) is represented as $J(n^{1/k}-1, 1)$, $J(n^{1/k}-1, n^{1/k})$, ..., $J(n^{1/k}-1, n^{(k-2)/k})$, $J(n^{1/k}-2, n^{(k-1)/k})$, $J(n^{1/k}-1, n^{(k-2)/k})$, ..., $J(n^{1/k}-1, n^{1/k})$, $J(n^{1/k}, 1)$. In the case of the temporary directed graph I' generated by the temporary directed graph generation section 108 described above, the longest directed path LP is the directed path P([1, 1], [1, n]) constituting the temporary directed graph I'(1→n). The directed graph generation section 110 may extract the longest directed path LP or uniquely extract the directed path P([1, 1], [1, n]) constituting the temporary directed graph I'(1→n), and, in some cases, the directed graph generation section 110 may calculate the length of all the directed paths constituting the temporary directed graph I' and select the longest directed path LP from them. At this time, the length DDT of the longest directed path LP is represented as DDT= $(2k-1)*(n^{1/k}-1)$. After that, the directed graph generation section 110 sets an active mark indicating that it is valid to all the directed edges forming the longest directed path LP.

Next, the step of calculating the longest directed path PLP for each of the temporary directed graphs I' corresponding to the root node and the respective intermediate nodes (excluding the graph including the longest directed path LP) is described with reference to FIG. 13. FIG. 13 is a flowchart showing the calculation step of the directed path PLP.

Prior to description of the step of extracting the longest directed path PLP for each directed graph, the following two expressions are defined.

CP (Current Path): Directed path under consideration (which is called the current path)

JP(CP): The number of directed edges included in the directed path.

The directed graph generation section 110 extracts the directed path PLP based on the algorithm described below.

(Step 1) The directed graph generation section 110 determines the current path CP from the start point to the end point of the directed graph I'. If the directed graph under consideration is the directed graph I'(a→b), the directed path P([a, a],

[a, b]) is set as the current path CP, and if it is the directed graph I'(a←b), the directed path P([b, b], [a, b]) is set as the current path CP (S162).

(Step 2) The directed graph generation section 110 extracts the longest directed edge among the directed edges forming the current path CP and sets its length as J (S164).

(Step 3) The directed graph generation section 110 decides whether $J \leq 1$ or not (S166), and if $J \leq 1$, it determines the current path CP as the directed path PLP and sets the active mark to all the directed edges forming the directed path PLP (S176).

(Step 4) If J>1, the directed graph generation section 110 decides whether $\#JP(CP)+n^{1/k}-1 \leq DDT$ or not (S168), and if not $\#JP(CP)+n^{1/k}-1 \leq DDT$, it determines the current path CP as the directed path PLP and sets the active mark to all the directed edges forming the directed path PLP (S176).

(Step 5) If $\#JP(CP)+n^{1/k}-1 \leq DDT$, the directed graph generation section 110 calculates a natural number j satisfying $J=n^{j/k}$ (S170).

(Step 6) The directed graph generation section 110 extracts the directed edge that is farthest from the start point of the current path CP among the directed edges with a length of J forming the current path CP (S172).

(Step 7) The directed graph generation section 110 adds one directed edge with a length of $n^{(j-1)/k}$ just after the $n^{1/k}-1$ number of directed edges with a length of $n^{(j-1)/k}$ extending from the tail of the directed edge extracted in (Step 6), and removes the directed edge extracted in (Step 6) (S174). After that, it proceeds to (Step 1) and repeats the above-described steps.

The loop of the processing occurring in the above-described (Step 1) to (Step 6) ends when the directed path from the start point to the end point of the directed graph I' is made up of the directed edges all having a length of 1 or when the number of directed edges forming the directed path exceeds DDT if further replacement of the directed edges is performed. By the above processing, the longest directed path PLP for each directed graph can be set.

Figure 14:
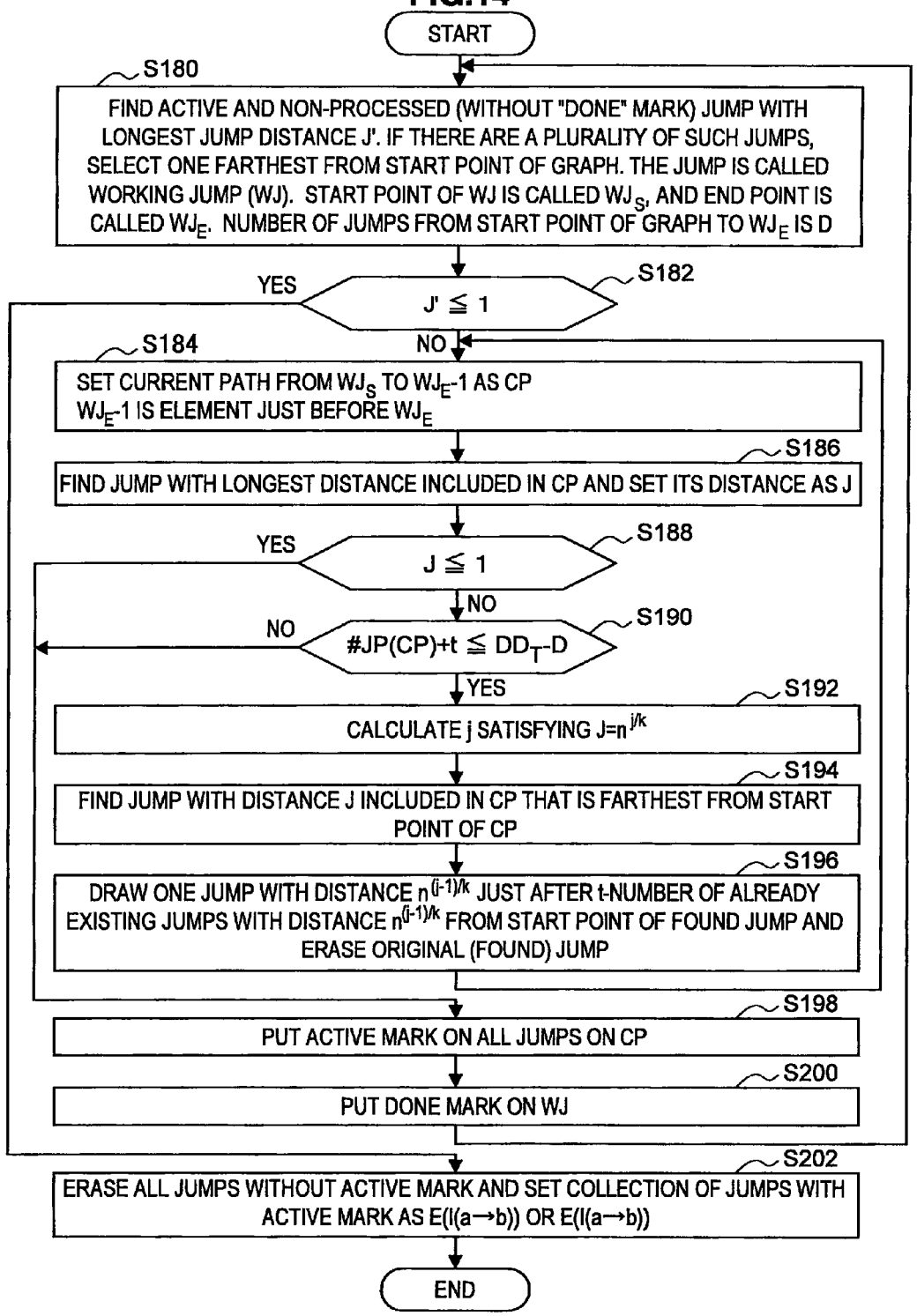
FIG. 14 A flowchart showing a directed graph generation method according to the embodiment.

Referring then to FIG. 14, the step of replacing a given directed edge is described hereinafter. In this step, an algorithm of processing to replace a given directed edge with a shorter directed edge is constructed for each directed graph under the condition that the number of directed edges forming the directed path does not exceed DDT.

The directed graph generation section 110 replaces a directed edge based on the following algorithm.

(Step 1) The directed graph generation section 110 extracts the directed edge which is set to active, is not yet processed (done is not set) and is the longest, among the directed edges constituting the directed graph I'. Further, the directed graph generation section 110 sets the length of the extracted directed edge as J'. If there are a plurality of directed edges with a length of J', the directed graph generation section 110 selects the directed edge that is farthest from the start point of the directed graph I' (S180). The selected directed edge is called WJ (Working Jump), the start point of the directed edge WJ is called WJS, and the end point is called WJE. Further, the number of directed edges forming the directed path that reaches WJS from the start point of the directed graph I' is denoted as D.

(Step 2) The directed graph generation section 110 decides whether the length J' of the directed edge WJ is $J' \leq 1$ (S182), and if $J' \leq 1$, it sets the directed graph that is made up only of the directed edges set to active as a desired directed graph I (S202). If J'>1, it proceeds to (Step 3).

(Step 3) If the length J' of the directed edge WJ is J'>1, the directed graph generation section 110 sets the directed path that reaches (WJE-1) is from WJS as the current path CP (S184). (WJE-1) is a coordinate point just before WJE.

(Step 4) The directed graph generation section 110 extracts the longest directed edge among the directed edges forming the current path CP and sets its length as J (S186).

(Step 5) The directed graph generation section 110 decides whether the length J of the extracted directed edge is $J \leq 1$ (S188), and if $J \leq 1$, it sets active to all the directed edges forming the current path CP (S198) and sets done to the directed edge WJ (S200). After that, it starts again from the processing of (Step 1). If J>1, it proceeds to (Step 6).

(Step 6) If J>1, the directed graph generation section 110 decides whether $\#JP(CP)+n^{1/k}-1 \leq DDT-D$ or not (S190), and if $\#JP(CP)+n^{1/k}-1 > DDT-D$, it sets active to all the directed edges forming the current path CP (S198) and sets done to the directed edge WJ (S200). After that, it starts again from the processing of (Step 1). If $\#JP(CP)+n^{1/k}-1 \leq DDT-D$, it proceeds to (Step 7).

(Step 7) If $\#JP(CP)+n^{1/k}-1 \leq DDT-D$, the directed graph generation section 110 calculates a natural number j satisfying $J=n^{j/k}$ (S192).

(Step 8) The directed graph generation section 110 extracts the directed edge that is farthest from the start point of the current path CP among the directed edges with a length of J forming the current path CP (S194).

(Step 9) The directed graph generation section 110 adds one directed edge with a length of $n^{(j-1)/k}$ just after the $n^{1/k}-1$ number of directed edges with a length of $n^{(j-1)/k}$ extending from the tail of the directed edge extracted in (Step 8), and removes the directed edge extracted in (Step 8) (S196). After that, it proceeds to (Step 3) and repeats the above-described steps.

The loop of the processing occurring in the above-described (Step 3) to (Step 9) ends when the directed path from WJS to WJE-1 is made up of the directed edges all having a length of 1 or when the number of directed edges forming the directed path from WJS to WJE-1 exceeds DDT if further replacement of the directed edges is performed. On the other hand, the loop of the processing occurring in the above-described (Step 1) to (Step 5) or (Step 6) ends when done is not set to any of the directed edges constituting the directed graph I' and there is no more directed edges with a length of 2 or longer. By the above processing, a desired directed graph I can be generated.

Figure 15:
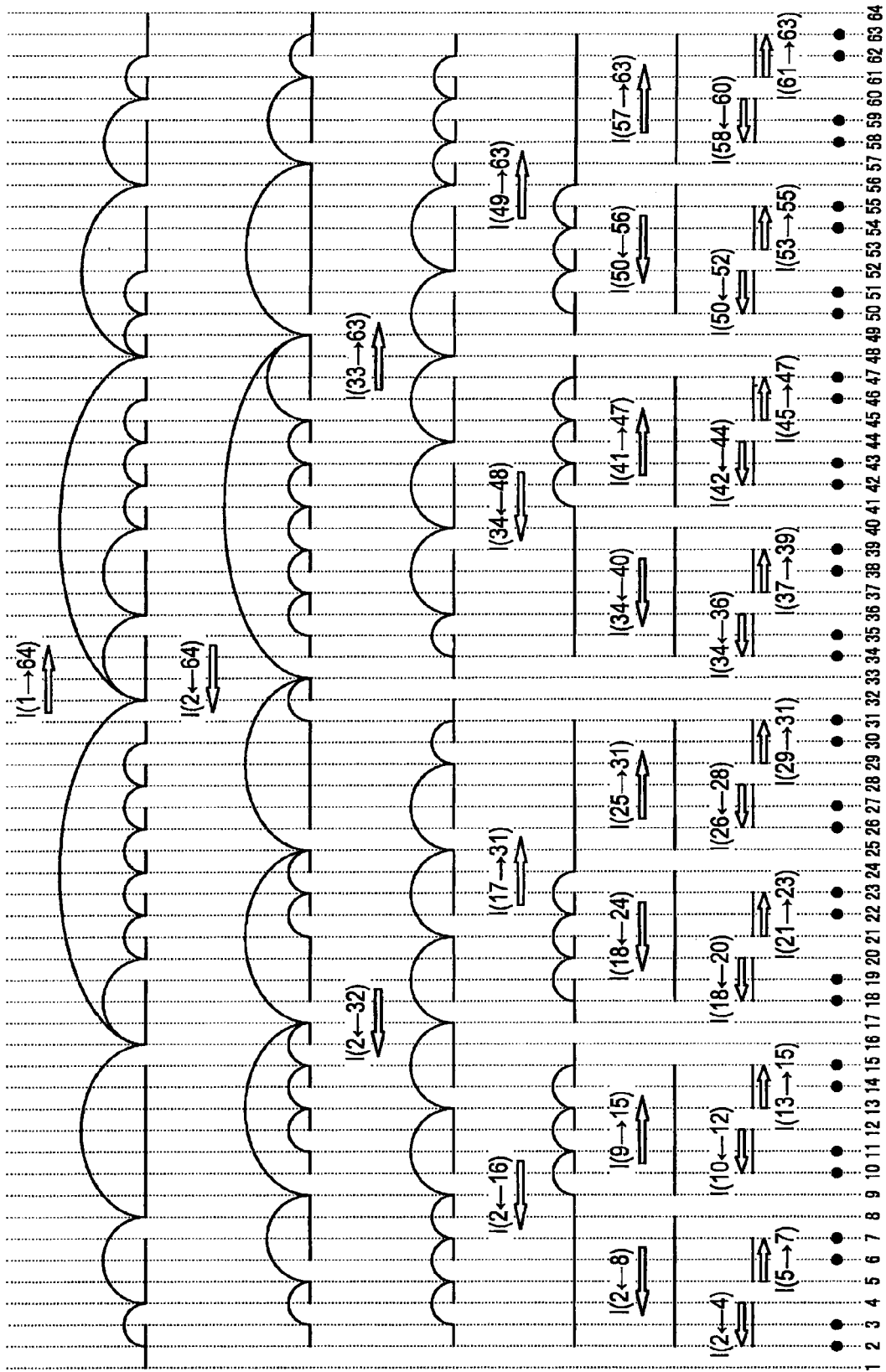
FIG. 15 An explanatory view showing one example of a directed graph (k=6) according to the embodiment.

Finally, an example of the directed graph I generated using the directed graph generation method described above is shown. FIG. 15 shows the directed graph I in the case of setting the parameter k=6 based on the complete binary tree with the number of leaf nodes n=64 shown in FIG. 3.

First, comparing the directed graph H (FIG. 4) generated based on the basic scheme and the directed graph I (FIG. 15) according to the embodiment, the following two points are obvious. (1) In the directed graph I, the number of directed edges with a length of 2 or longer decreases and the number of directed edges extending from one coordinate point decreases compared to the directed graph H. (2) Any of the directed paths constituting the directed graph I does not exceed the length of the longest directed path LP (P([1, 1], [1, 64]) of the directed graph H. Thus, it is confirmed that the directed graph I that enables reduction of the number of intermediate keys to be held by a user without increasing the worst value of the amount of calculations necessary for generating a set key is generated.

Figure 16:
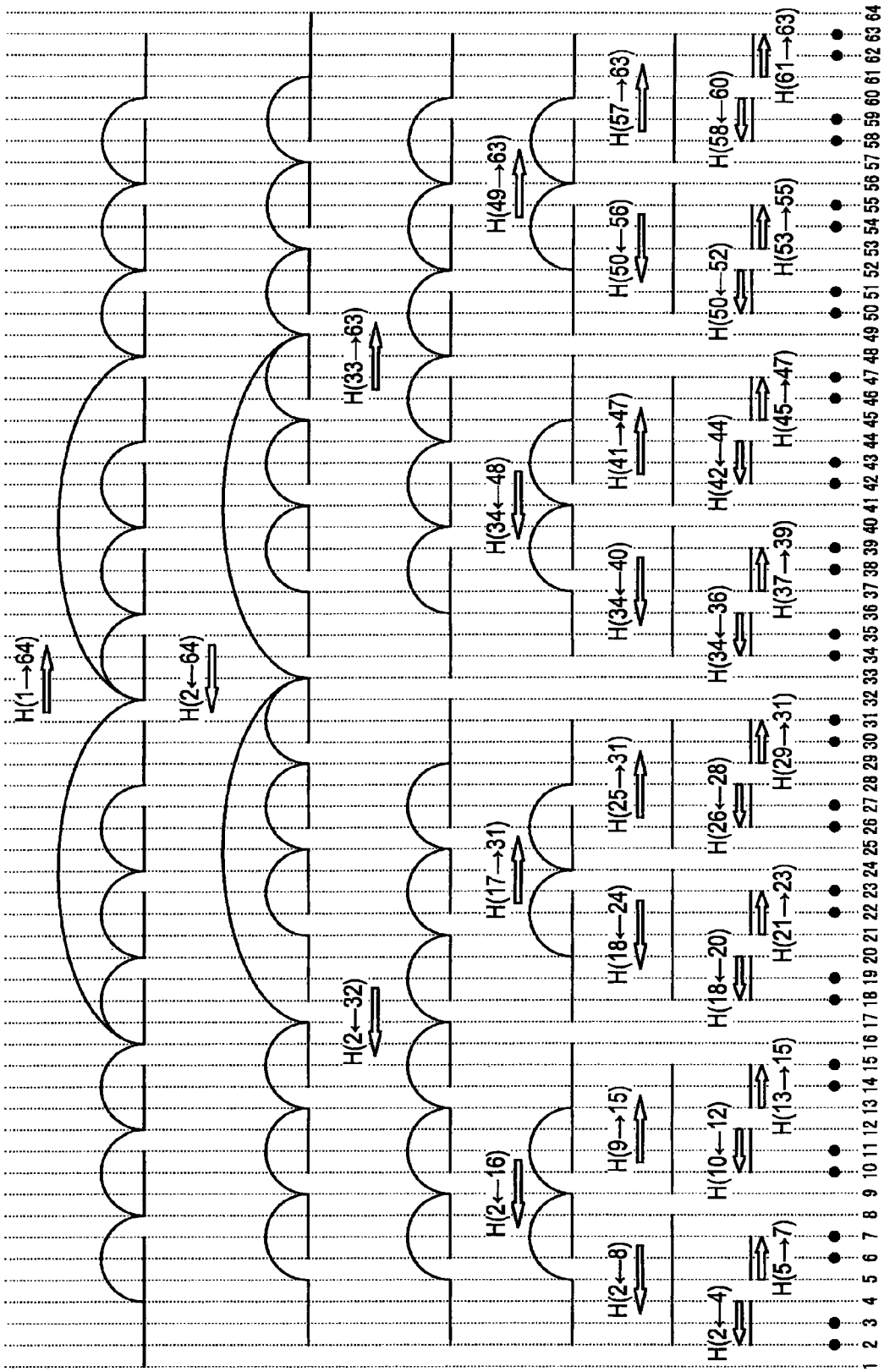
FIG. 16 An explanatory view showing one example of a directed graph (k=3) according to the basic scheme.
Figure 17:
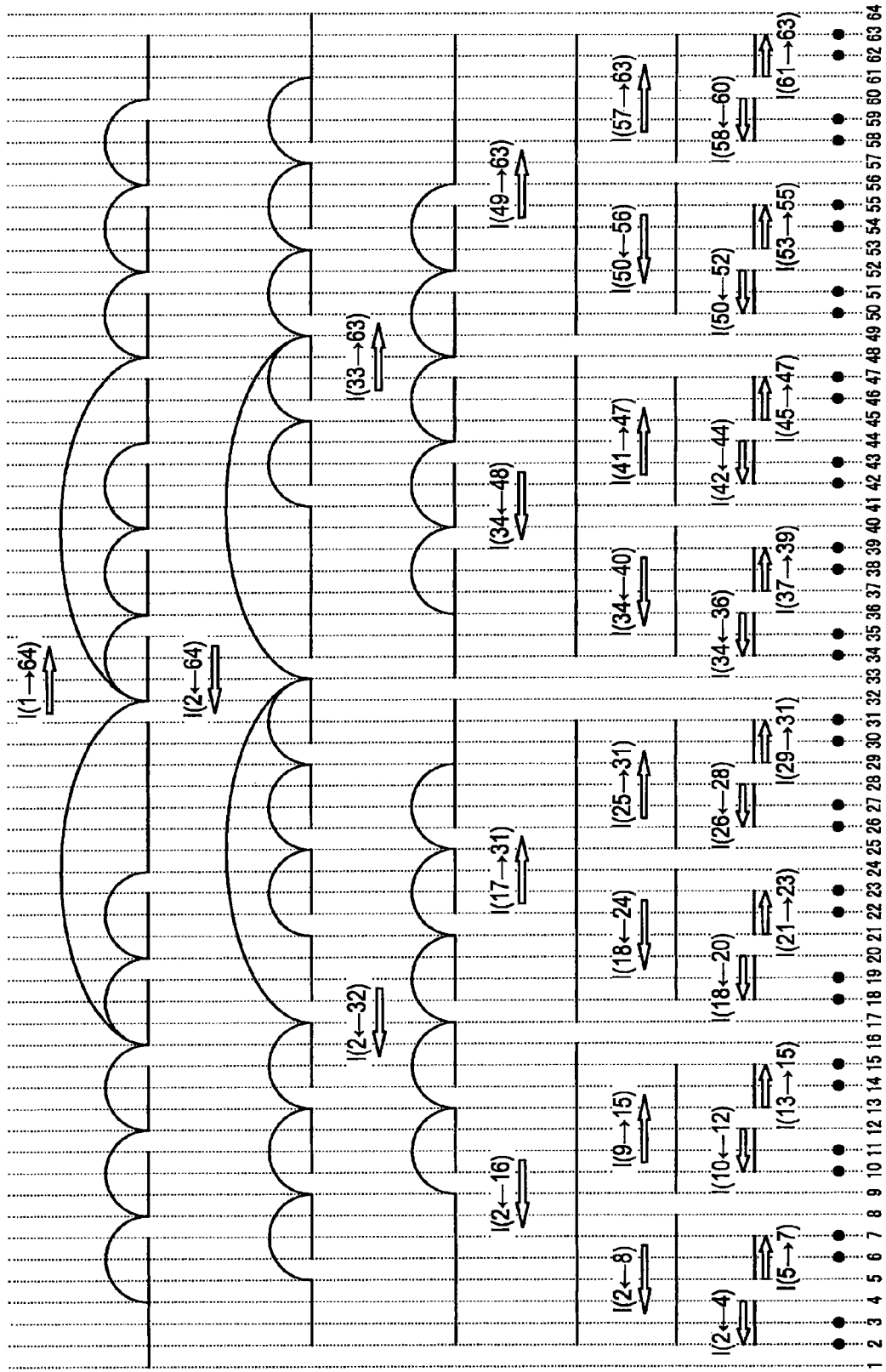
FIG. 17 An explanatory view showing one example of a directed graph (k=3) according to the embodiment.

Likewise, a comparison is made about the case of setting the parameter k=3. In the key distribution scheme based on the basic scheme, the number of intermediate keys to be distributed to each user is $O(k*\log(n))$, and the number of keys to be held by each user decreases as the parameter k decreases. However, there is a problem that the amount of calculations increases by the decrease in the parameter k. In light of this, a study is made specifically about the effect when the parameter k decreases. FIG. 16 shows the directed graph H generated based on the basic scheme, and FIG. 17 shows the directed graph I according to the embodiment.

Comparing the directed graph H (FIG. 4: k=6, FIG. 16: k=3) generated using the same basic scheme, the number of directed edges with a length of 2 or longer decreases and the number of directed edges extending from one coordinate point decreases in the directed graph H with k=3. However, in the case of k=3, the number of directed edges forming the longest directed path LP([1, 1], [1, 64]) of the directed graph H is 15, which is larger than that in the case of k=6 (the number of directed edges=11). Then, comparing the directed graph H (FIG. 16) according to the basic scheme and the directed graph I (FIG. 17) according to the embodiment about the same case of k=3, although the number of directed edges forming the longest directed path LP is 15, which is the same, the number of directed edges with a length of 2 or longer is smaller in the directed graph I. Thus, it is confirmed that the effect of the embodiment can be obtained regardless of the parameter k.

In order to understand the effect of reducing the number of keys according to the embodiment more quantitatively, a comparison result between the basic scheme (denoted as the related scheme) and the embodiment is shown in table format in FIG. 18. Referring to FIG. 18, in the case of k=6, the number of keys to be held is reduced for all users. This is of course the same for the total number of keys and the average number of keys. Further, comparing the basic scheme (k=3) and the scheme of the embodiment (k=6), the number of keys to be held by each user is nearly equal. The comparison shows the effect that it is possible to reduce the amount of calculations while maintaining the nearly equal number of keys by applying the embodiment. Although the absolute value of the number of keys to be reduced is seemingly not so large because the above result is obtained in the implementation where the number n of users is as small as n=64, the effect of reduction is significantly noticeable in the implementation environment because the number of users is larger in order of magnitude.

The generation logic of the directed graph that enables reduction of the number of intermediate keys to be held by a user without increasing the worst value of the amount of calculations necessary for generating a set key is described in the foregoing. Construction of the key generation logic (directed graph) described above is executed mainly by the key generation logic construction block which constitutes the key distribution server 102. However, in order to execute the encryption key distribution based on the above key generation logic, other elements are necessary. Thus, the other elements are described hereinafter with reference back to FIG. 8.

Referring back to FIG. 8, the key distribution server 102 includes the initial intermediate key setting section 112, the key generation section 114, the encryption section 116, the transmission section 118 and the subset determination section 120, in addition to the key generation logic construction block described above.

(Initial Intermediate Key Setting Section 112)

The initial intermediate key setting section 112 generates an intermediate key corresponding to the initial coordinate point of the directed graph I, for each directed graph I corresponding to each intermediate node of the tree. For example, the initial intermediate key setting section 112 may generate random numbers using the pseudo-random number generator and set the random numbers as each intermediate key corresponding to the above initial coordinate point (root) or may set given numerical values as each intermediate key.

(Key Generation Section 114)

For a certain directed edge constituting the directed graph I, when a given intermediate key assigned to the coordinate point indicated by the tail of the directed edge is input, the key generation section 114 outputs a set key corresponding to the coordinate point indicated by the tail of the directed edge and intermediate keys corresponding to the heads of all directed edges extending from the tail of the directed edge. Thus, the key generation section 114 corresponds to the PRSG of the basic scheme. However, the key generation section 114 is different from the PRSG of the basic scheme in that it outputs intermediate keys based on the directed graph I generated by the directed graph generation section 110. If the key generation section 114 is represented as being the same PRSG, when the intermediate key t(S0) corresponding to a certain coordinate point S0 of the directed graph I is input, it outputs the intermediate keys t(S1), t(S2), . . . , t(Sm) corresponding to the heads of the directed edges whose tails are at the coordinate point (corresponding to the subset S0) and the set key k(S0). Note that, m indicates the number of directed edges whose tails are at a certain coordinate point S0.

(Transmission Section 118)

The transmission section 118 transmits the contents keys encrypted by the encryption section 116, which is described later, to all users corresponding to the leaf nodes. The transmission section 118 distributes the intermediate key to each user by referring to the above-described directed graph I. At this time, the transmission section 118 may distribute the minimum necessary number of intermediate keys in such a way that each user can derive all the intermediate keys corresponding to the subsets to which it belongs. Specifically, the transmission section 118 may extract the subset to which a distribution destination user of the intermediate key belongs from the subsets constituting the set system Φ (cf. the above expression (1)), select a coordinate point such that the distribution destination user is not included in the subset corresponding to the tail of the directed edge reaching the coordinate point from the coordinate points of the directed graph I corresponding to the extracted subset, and distribute only the intermediate key corresponding to the selected coordinate point to the distribution destination user. If, however, the subset to which the distribution destination user of the intermediate key belongs corresponds to the initial coordinate point of the directed graph I, the transmission section 118 may distribute only the intermediate key corresponding to the initial coordinate point to the distribution destination user. Further, the transmission section 118 may function as a directed graph information distribution section that distributes information of the directed graph I to each user. Specifically, the transmission section 118 may distribute information related to a key generation algorithm (e.g. a key generation program) of the PRSG that outputs given intermediate key and set key based on the directed graph I upon input of each intermediate key.

Distribution of the intermediate key may be performed prior to distribution of contents, using a communication channel different from the one used for distribution of the contents. For example, the intermediate key for each terminal may be output from the key distribution server 102 and recorded on a recording medium, and the intermediate key for each terminal unit that is read from the recording medium may be stored into the corresponding terminal unit at the time of manufacturing the terminal in a manufacturing plant of the terminal unit.

(Encryption Section 116)

The encryption section 116 encrypts the contents key using the set key. Although the number of the contents key is one, there are the same number of set keys as the number of subsets constituting the set system Φ. The encryption section 116 encrypts the contents key using each set key corresponding to the subset selected by the subset determination section 120, which is described later, among all the subsets constituting the set system Φ. Thus, the encryption key 116 generates the encrypted contents keys corresponding to the respective set keys. Accordingly, if the number of selected subsets is m, the m-number of encrypted contents keys are generated. Alternatively, the encryption section 116 may encrypt contents. For example, the encryption section 116 may encrypt contents using the contents key or may encrypt contents using the respective set keys described above. The configuration that encrypts contents using the set key, however, is an alternative example of the embodiment.

(Subset Determination Section 120)

The subset determination section 120 determines a set (R) of excluded users for which decryption of the contents or the contents key should be disabled, and defines a set (N\R) of licensed users by eliminating the set (R) of excluded users from a set (N) of all users using a union of given subsets selected from the subsets corresponding to the coordinate points of the directed graph I, and then determines a group of subsets constituting the set (N\R) of licensed users in such a way that the number of subsets constituting the set (N\R) of licensed users is minimum. The subset determination section 120 may be composed of a licensed user set determination section for determining the set (N\R) of licensed users and a licensed user subset determination section for determining a group of subsets constituting the set (N\R) of licensed users.

After the subsets (S1, S2, ..., Sm) that constitute the set of licensed users (N\R=S1∪S2∪ ... ∪Sm; m is a natural number) are determined by the subset determination section 120 in the above way, the transmission section 118 distributes information indicating the set (N\R) of licensed users or the subsets (S1, S2, ..., Sm) constituting the set (N\R) of licensed users to each user. Further, the encryption section 116 encrypts the contents or the contents key using the set keys corresponding to the subsets (S1, S2, ..., Sm) determined by the subset determination section 120, and the transmission section 118 distributes the encrypted contents or contents keys to each user.

The configuration of the key distribution server 102 according to a preferred embodiment of the present invention is described in the foregoing. As described above, a feature of the embodiment is mainly the configuration of the key generation logic construction block. Particularly, the embodiment has a feature in the configuration of the directed graph generation section 110 for generating the directed graph that determines the key generation logic. The directed graph generation section 110 according to the embodiment can generate the key generation logic (directed graph) that enables reduction of the number of intermediate keys to be held by each user without increasing the amount of calculations necessary for each user to generate a set key. Consequently, it is possible to save the memory capacity necessary for the terminal unit of each user to hold the intermediate keys and also reduce the distribution cost for distributing the intermediate keys to the terminal unit of each user.

[Configuration of the Terminal Unit 122]

The configuration of the terminal unit 122 according to the embodiment is described hereinafter with reference to FIG. 8.

Referring to FIG. 8, the terminal unit 122 includes a reception section 124, a decision section 126, a key generation section 128 and a decryption section 130.

(Reception Section 124)

The reception section 124 receives information transmitted from the transmission section 118 included in the key distribution server 102. For example, the reception section 124 receives distributed contents, an encrypted contents key, a given intermediate key, information related to the directed graph I, information related to licensed users and so on from the key distribution server 102. Further, the reception section 124 may collect information from a plurality of information sources, not only receiving information from a single information source. For example, the reception section 124 may acquire information from a plurality of information sources (e.g. the key distribution server 102) connected through a wired or wireless network or information sources (e.g. information media such as an optical disk unit, a magnetic disk unit and a portable terminal unit) connected directly or indirectly without through a network. Because the reception section 124 can receive information from another terminal unit 122 as a matter of course, it may be configured so as to share the information of the directed graph I with the other terminal unit 122 belonging to the same distribution destination group, for example. In such a case, the same distribution destination group means a group authorized as viewer users of contents distributed from the same or a plurality of key distribution servers 102, which corresponds to a set of users corresponding to the leaf nodes of the above-described tree structure. Further, the above-described intermediate key may be supplied to the terminal unit in advance and stored in the terminal unit.

(Decision Section 126)

The decision section 126 decides whether it is included as an element in any of the subsets corresponding to the set keys used for encryption. Because the terminal unit 122 holds only the intermediate key for generating the set key corresponding to the subset to which it belongs, it is necessary to decide in advance whether the subset to which it belongs is included in the subsets corresponding to the set keys based on the information about the set keys used by the key distribution server 102 to encrypt the contents or the contents key. Such decision is made by the decision section 126. The information about the set keys used for encryption is distributed from the key distribution server 102 at the same timing as or different timing from the contents key and received by the reception section 124. If it is decided that the set key corresponding to the subset to which it belongs is not included in the set keys used for encryption, the terminal unit 122 ends the decryption processing of the contents key without executing the processing to generate the set key using the intermediate key held by itself. On the contrary, if the set key corresponding to the subset to which it belongs is found, the terminal unit 122 generates the set key using the intermediate key held by itself with use of the PRSG.

(Key Generation Section 128)

For a certain directed edge constituting the directed graph I, when a given intermediate key assigned to the coordinate point indicated by the tail of the directed edge is input, the key generation section 128 outputs a set key corresponding to the coordinate point indicated by the tail of the directed edge and intermediate keys corresponding to the heads of all directed edges extending from the tail of the directed edge. Thus, the key generation section 128 corresponds to the key generation section 114 included in the key distribution server 102. If the key generation section 128 is represented as being the PRSG, if an intermediate key t(S0) corresponding to a certain coordinate point S0 of the directed graph I is input, it outputs the intermediate keys t(S1), t(S2), . . . , t(Sm) corresponding to the heads of the directed edges whose tails are at the coordinate point S0 and the set key k(S0). Note that, m indicates the number of directed edges whose tails are at a certain coordinate point S0. The information of the directed edge I may be acquired from the key distribution server 102 or stored in a storage section (not shown) included in the terminal unit 122.

(Decryption Section 130)

The decryption section 130 decrypts the contents key using the set key. Specifically, the decryption section 130 extracts the subset in which it is included as an element from the subsets corresponding to the set keys and decrypts the contents or the contents key using the set key corresponding to the subset.

The configuration of the terminal unit 122 according to the embodiment is described in the foregoing. As described above, the terminal unit 122 can generate a desired set key based on the special key generation logic (directed graph I) generated by the directed graph generation section 110 included in the key distribution server 102 described above. Consequently, it is possible for the terminal unit 122 to reduce the number of intermediate keys to be held necessary for generating the set key to be used to decrypt the contents key.

Second Embodiment

Next, an encryption key distribution scheme according to a second embodiment of the present invention is described. The encryption key distribution scheme according to the embodiment enables reduction of the amount of calculations necessary for the terminal unit 122 to generate the set key while reducing the number of intermediate keys to be held by the terminal unit 122 by generating a temporary directed graph composed of longer directed edges and then replacing the directed edge constituting the temporary directed graph with a shorter directed edge to thereby reconstruct the directed graph. Hereinafter, the functional configuration of a key distribution server 152 that implements the encryption key distribution scheme according to the embodiment, and features and advantages of the encryption key distribution scheme are described in detail. The main difference from the above-described first embodiment is the functional configuration of the key distribution server 152. Thus, substantially the same components as those in the above-described first embodiment are denoted by the same symbols, and redundant explanation is omitted.

[Configuration of the Key Distribution Server 152]

Figure 19:
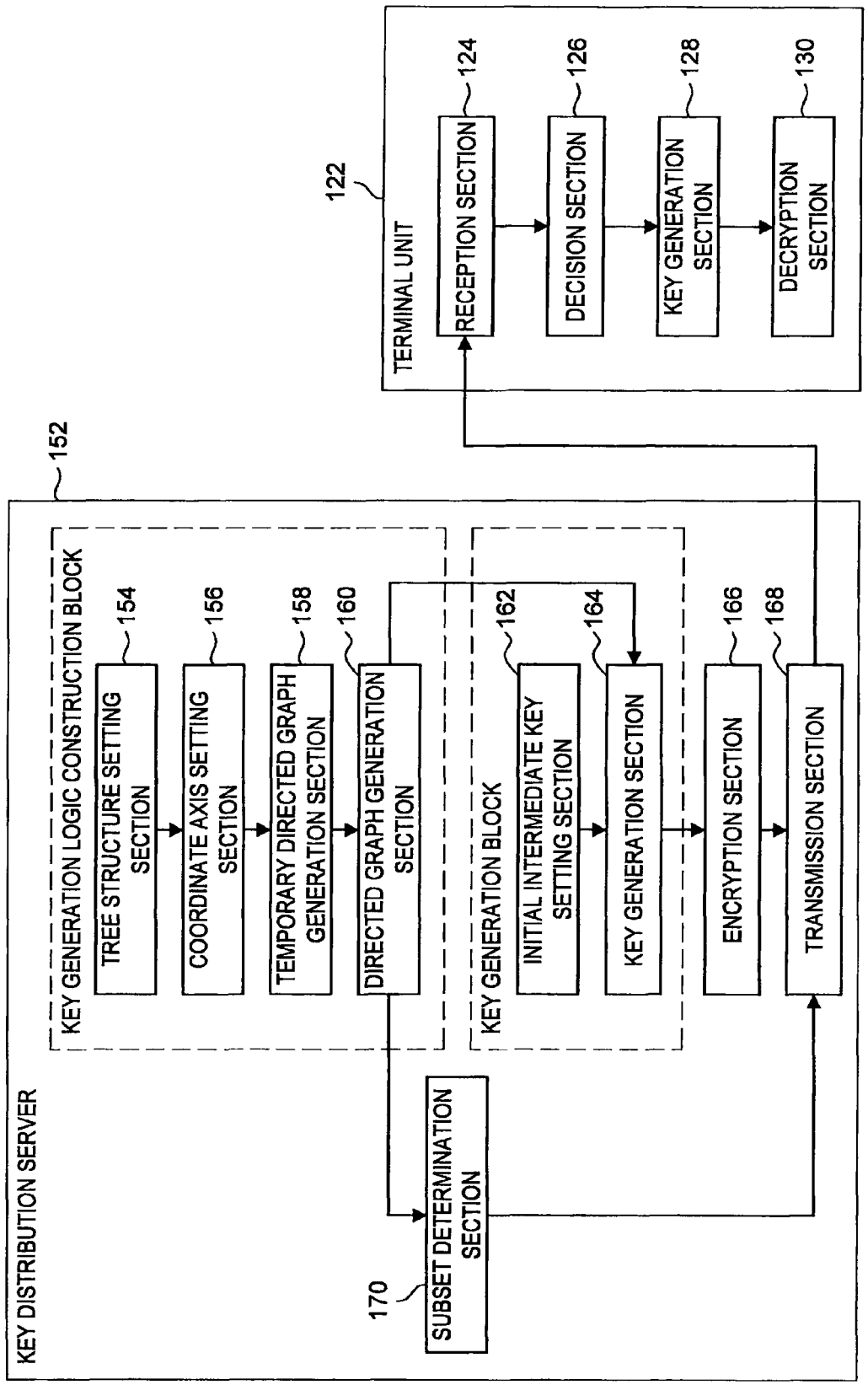
FIG. 19 A block diagram showing configurations of an information processing unit and a terminal unit according to a second embodiment of the present invention.

The configuration of the key distribution server 152 according to the embodiment is described hereinafter in detail with reference to FIG. 19. FIG. 19 is a block diagram showing the configurations of the key distribution server 152 and the terminal unit 122 according to the embodiment.

As shown in FIG. 19, the key distribution server 152 is composed of a tree structure setting section 154, a coordinate axis setting section 156, a temporary directed graph generation section 158, a directed graph generation section 160, an initial intermediate key setting section 162, a key generation section 164, an encryption section 166, a transmission section 168, and a subset determination section 170. Particularly, the tree structure setting section 154, the coordinate axis setting section 156, the temporary directed graph generation section 158 and the directed graph generation section 160 are collectively referred to as a key generation logic construction block. Likewise, the initial intermediate key setting section 162 and the key generation section 164 are collectively referred to as a key generation block.

The elements constituting the key generation logic construction block are described hereinafter. The key generation logic construction block performs processing corresponding to (Setting of a tree structure) and (Generation of directed graphs) in [Description of the basic technology] described above.

(Tree Structure Setting Section 154)

The tree structure setting section 154 configures a binary tree composed of n-number of leaf nodes to which numbers 1 to n (n is a natural number) are assigned, a root node, and a plurality of intermediate nodes other than the root node and the leaf nodes, and sets the number of the leaf node located at the left end to lv, and the number of the leaf node located at the right end to rv, among a plurality of leaf nodes located at the lower level of a certain intermediate node v or root node v. Further, the tree structure setting section 154 assigns a set (1→n) and a set (2←n) to the root node, and if a certain intermediate node v is located on the left of its parent node, it assigns a set (lv+1←rv) to the intermediate node, and if an intermediate node v is located on the right of its parent node, it assigns a set (lv→rv−1) to the intermediate node.

As described above, the tree structure setting section 154 has a configuration capable of constructing a m-level tree structure, and assuming the case of m=2 (binary tree), for example, it can construct a tree structure identical to the binary tree structure according to the basic scheme (FIG. 3). Thus, the meaning of each node of the tree structure constructed by the tree structure setting section 154 is substantially the same as the meaning of each node of the binary tree structure constructed according to the basic scheme described earlier. Although only the binary tree structure is described hereinafter for convenience of description, it is not limited thereto.

(Coordinate Axis Setting Section 156)

The coordinate axis setting section 156 sets a first horizontal coordinate axis on which the coordinate points correlated with the respective subsets included in the set (1→n) are arranged in such a way that the degree of inclusion becomes larger to the right. Next, the coordinate axis setting section 156 sets a second horizontal coordinate axis on which the coordinate points correlated with the respective subsets included in the set (2←n) are arranged in such a way that the degree of inclusion becomes larger to the left. Then, the coordinate axis setting section 156 sets a third horizontal coordinate axis on which the coordinate points correlated with the respective subsets included in the set (lv→rv−1) are arranged in such a way that the degree of inclusion becomes larger to the right, for each intermediate node v. Further, the coordinate axis setting section 156 sets a fourth horizontal coordinate axis on which the coordinate points correlated with the respective subsets included in the set (lv+1←rv) are arranged in such a way that the degree of inclusion becomes larger to the left, for each intermediate node v. After that, the coordinate axis setting section 156 places two temporary coordinate points each on the right of the coordinate point located at the right end of the third horizontal coordinate axis and on the left of the coordinate point located at the left end of the second and fourth horizontal coordinate axes. Further, the coordinate axis setting section 156 sets the coordinate point located at the right end of the first horizontal coordinate axis as a first temporary coordinate point, and places a second temporary coordinate point on the right of the first temporary coordinate point.

As described above, the coordinate axis setting section 156 sets the coordinate axes for constructing the directed graphs corresponding to the respective nodes of the tree structure configured by the tree structure setting section 154. The first horizontal coordinate axis indicates a coordinate axis corresponding to the set (1→n), the second horizontal coordinate axis indicates a coordinate axis corresponding to the set (2←n), the third horizontal coordinate axis indicates a coordinate axis corresponding to the set (lv→rv−1), and the fourth horizontal coordinate axis indicates a coordinate axis corresponding to the set (lv+1←rv). Because the third horizontal coordinate axis and the fourth horizontal coordinate axis are set for each intermediate node v, a plurality of coordinate axes are set respectively. Specifically, the same number of the third horizontal coordinate axes and the fourth horizontal coordinate axes as the number of intermediate nodes are set.

(Temporary Directed Graph Generation Section 158)

The temporary directed graph generation section 158 sets a given integer k and calculates an integer x that satisfies $n^{(x-1)/k} < (rv-lv+1) \leq n^{x/k}$. Next, the temporary directed graph generation section 158 forms a directed path with the tail at the leftmost coordinate point on the first and third horizontal coordinate axes by coupling one or a plurality of rightward directed edges having a length of $n^{i/k}$, and further forms a directed path with the tail at the rightmost coordinate point on the second and fourth horizontal coordinate axes by coupling one or a plurality of leftward directed edges having a length of $n^{i/k}$, for each of the integer i=0 to x−1. Then, the temporary directed graph generation section 158 excludes all directed edges whose tails or heads are at the temporary coordinate point, for each of the first to fourth horizontal coordinate axes. Further, the temporary directed graph generation section 158 excludes directed edges other than the longest directed edge from directed edges reaching each coordinate point on the first to fourth horizontal coordinate axes, thereby generating the temporary directed graphs related to the set (1→n−1), the set (2←n), the set (lv+1←rv) and the set (lv→rv−1), respectively. After that, the temporary directed graph generation section 158 adds a directed edge (rightward) having a length of 1 whose head is at the first temporary coordinate point on the first horizontal coordinate axis to the temporary directed graph related to the set (1→n−1), thereby generating the temporary directed graph related to the set (1→n).

Figure 20:
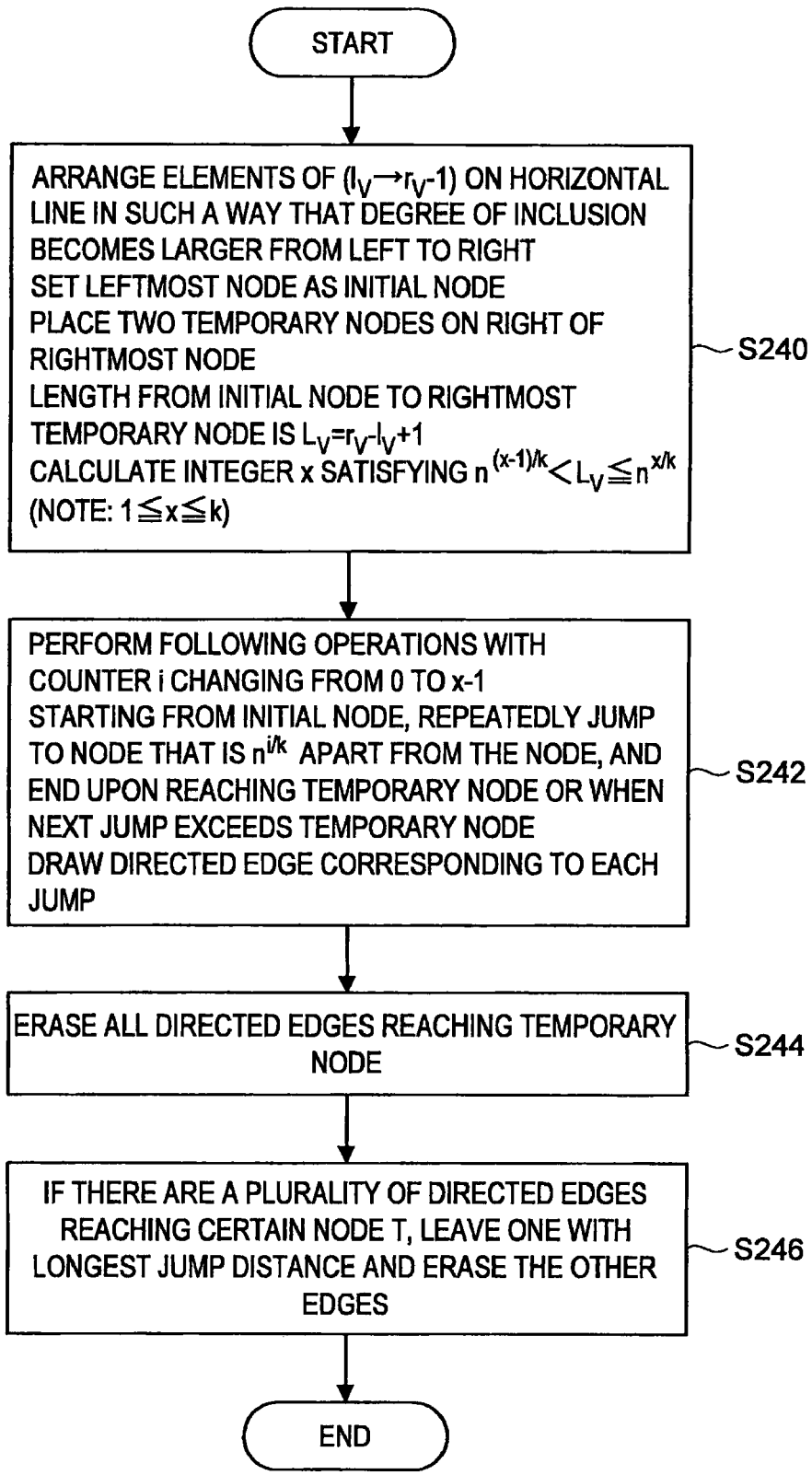
FIG. 20 A flowchart showing a temporary directed graph generation method according to the embodiment.

As described above, the temporary directed graph generation section 158 generates the directed graph by the method similar to the basic scheme. Compared to the directed graph of the basic scheme, however, the temporary directed graph generation section 158 can generate the directed graph composed of longer directed edges. This reduces the amount of calculations necessary for each user to derive the set key, as described later. The process flow of the processing executed by the temporary directed graph generation section 158 is described hereinafter in detail with reference to FIG. 20. FIG. 20 is a flowchart showing the process flow for the directed graph generation by the temporary directed graph generation section 158.

Referring to FIG. 20, the temporary directed graph generation section 158 generates the directed graph by the steps described below. A method of generating the temporary directed graph I'(lv→rv−1) corresponding to the set (lv→rv−1) is described hereinafter by way of illustration.

(Step 1; S240) The temporary directed graph generation section 158 places the respective subsets included in the set (lv→rv−1) on the horizontal straight line (horizontal coordinate axis) by arranging them in such a way that the degree of inclusion becomes larger from left to right. To be accurate, the temporary directed graph generation section 158 assigns the subsets as the elements of the set (lv→rv−1) to the respective coordinate points on the horizontal coordinate axis and places the coordinate points in such a way that the degree of inclusion of the assigned subsets becomes larger to the right. Then, the temporary directed graph generation section 158 places two temporary coordinate points on the right of the coordinate point located rightmost on the horizontal coordinate axis. A distance Lv from the leftmost coordinate point to the rightmost coordinate point on the coordinate axis is Lv=rv−lv+1. At this time, the temporary directed graph generation section 158 calculates an integer x ($1 \leq x \leq k$) that satisfies $n^{(x-1)/k} < Lv \leq n^{x/k}$.

(Step 2; S242) The temporary directed graph generation section 158 sets an integer value i as a counter and performs the following operation with the counter i changing from 0 to x−1. Starting from the start point at the left end of the horizontal coordinate axis, the temporary directed graph generation section 158 repeats setting of a rightward directed edge extending to a coordinate point that is $n^{i/k}$ apart from the coordinate point (jump to a coordinate point that is $n^{i/k}$ apart from the coordinate point) until the head of the directed edge reaches the temporary coordinate point at the right end or on the left of it on the horizontal coordinate axis or until the head of the directed edge to be set next exceeds any of the temporary coordinate points.

(Step 3; S244) The temporary directed graph generation section 158 deletes all the directed edges reaching the temporary coordinate points from the directed edges created in (Step 2).

(Step 4; S246) If there are a plurality of directed edges reaching a certain coordinate point, the temporary directed graph generation section 158 deletes all the directed edges other than the longest directed edge.

By the above process, the temporary directed graph generation section 158 can generate the directed graph made up of longer directed edges compared to the basic scheme. Further, the temporary directed graph generation section 158 generates the directed graphs by the same method as the above temporary directed graph I'(lv→rv−1) for all the intermediate nodes and the root nodes constituting the tree structure. For example, the temporary directed graph generation section 158 generates the temporary directed graph I'(lv+1←rv) corresponding to a certain intermediate node v, and further generates the temporary directed graph I'(1→n) and I(2←n) corresponding to the root node. The temporary directed graph I'(lv+1←rv) and I(2←n) are formed on the horizontal coordinate axes on which the coordinate points are arranged in such a way that the degree of inclusion of the subsets included in each graph becomes larger in the "left direction". Thus, the coordinate point arrangement rule on the horizontal coordinate axis set by the above (Step 1) is reversed. Further, two temporary coordinate points for constituting the temporary directed graph I'(lv+1←rv) and I(2←n) are placed on the left of the coordinate point located leftmost on the horizontal coordinate axis. The directed graph I(1→n) is generated by adding the directed edge E([1, n−1], [1, n]) to the directed graph I(1→n−1).

Figure 21:
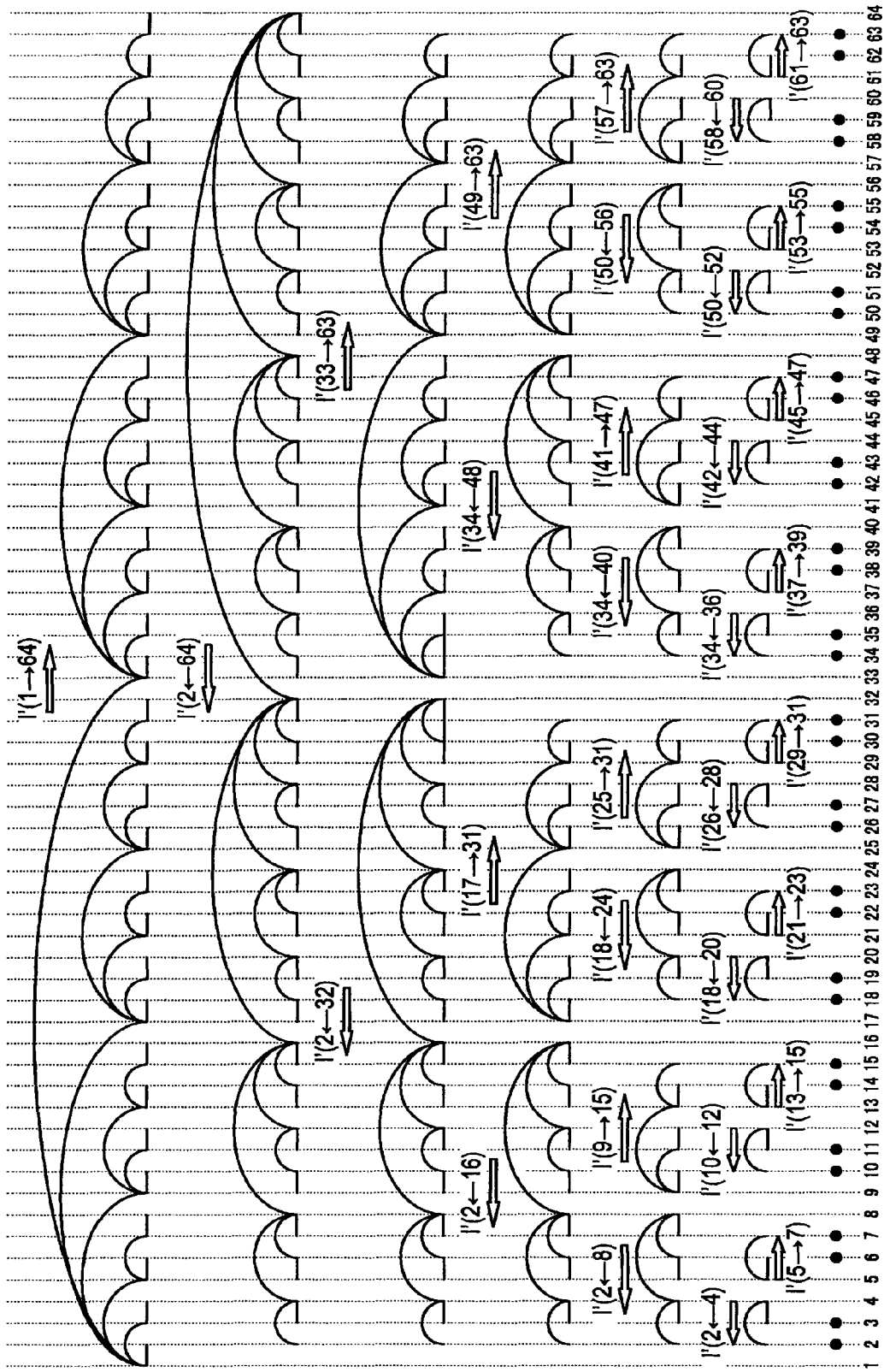
FIG. 21 An explanatory view showing one example of a temporary directed graph (k=6) according to the embodiment.

With use of the directed graph generation method described above, the temporary directed graph I' shown in FIG. 21 is generated. FIG. 21 shows the temporary directed graph I' formed when setting the parameter k=6 based on the complete binary tree with the number of leaf nodes n=64 shown in FIG. 3.

(Directed Graph Generation Section 160)

The directed graph generation section 160 determines the longest directed path with the maximum number of directed edges forming the directed path among the directed paths composed of a plurality of coupled directed edges. Then, the directed graph generation section 160 reconstructs each directed path by replacing the directed edges forming each directed path with a set of shorter directed edges so as not to exceed the number of directed edges forming the longest directed path and generates the directed graph composed of the reconstructed directed path.

As described above, the directed graph generation section 160 generates a desired directed graph I based on the temporary directed graph I' constructed by the temporary directed graph generation section 158. Specifically, although the basic scheme can only generate the directed graph H which is substantially the same as the temporary directed graph I', the key distribution server 152 according to the embodiment can generate the directed graph I indicating the more efficient set key generation logic because it includes the directed graph generation section 160. The process flow of the processing executed by the directed graph generation section 160 is described in detail hereinafter.

Figure 22:
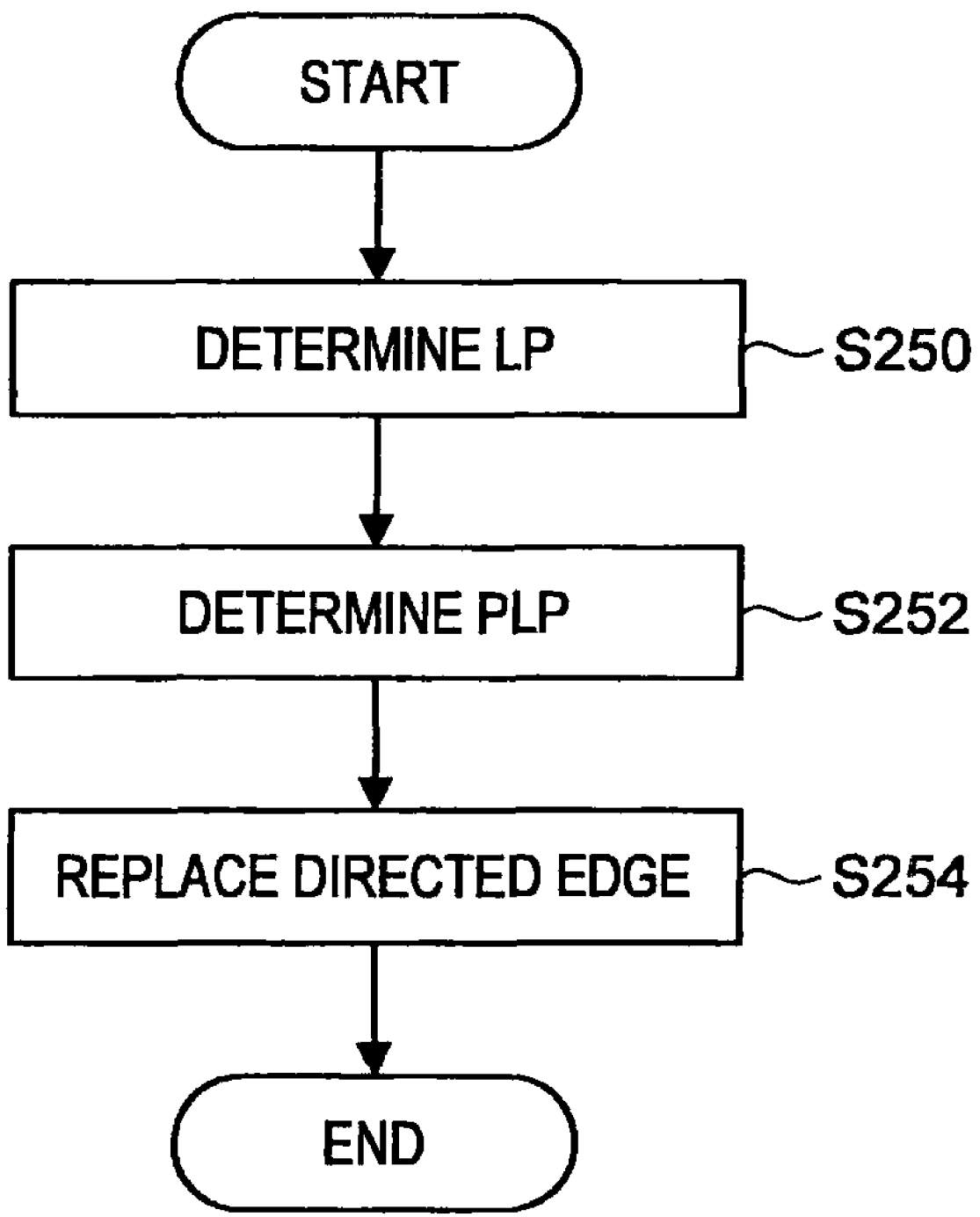
FIG. 22 A flowchart showing an outline of a directed graph generation method according to the embodiment.

Referring first to FIG. 22, the outline of the directed graph generation method by the directed graph generation section 160 is described briefly. FIG. 22 is a flowchart showing an example of the process flow to generate a directed graph.

First, the directed graph generation section 160 uses the temporary directed graph I' which is generated by the temporary directed graph generation section 158 in order to generate a desired directed graph I.

Then, the directed graph generation section 160 extracts the longest directed path LP (Longest Path) from the directed paths forming all of the generated temporary directed graphs I' (S250). The step of extracting the directed path LP may be executed by a longest directed path generation section, which is included in the directed graph generation section 160, for example. Further, it extracts the longest directed path PLP (Partially Longest Path) from each of all the generated temporary directed graphs I' that do not include the longest directed path LP (S252). Thus, the directed path PLP is extracted from each temporary directed graph I'. After that, a given directed edge is selected from the directed edges constituting the temporary directed graphs I' and replaced with a shorter directed edge (S254). At this time, the directed graph generation section 160 executes the replacement of the directed edges based on the length of the extracted directed path LP and the directed path PLP under the above-described condition that the worst value of the amount of calculations does not increase. The above-described given directed edge selection step may be executed by a replaced directed edge selection section, which is included in the directed graph generation section 160, for example. Further, the above-described directed edge replacement step may be executed by a directed edge replacement section, which is included in the directed graph generation section 160, for example.

The outline of the directed graph generation step by the directed graph generation section 160 is described in the foregoing. As described above, the directed graph generation section 160 extracts the directed path LP and the directed path PLP from the temporary directed graphs I' generated by the temporary directed graph generation section 158 and then selects and replaces a given directed edge based on the length of those directed paths, thereby generating a desired directed graph. More detailed explanation corresponding to each step described above is given hereinbelow.

Figure 23:
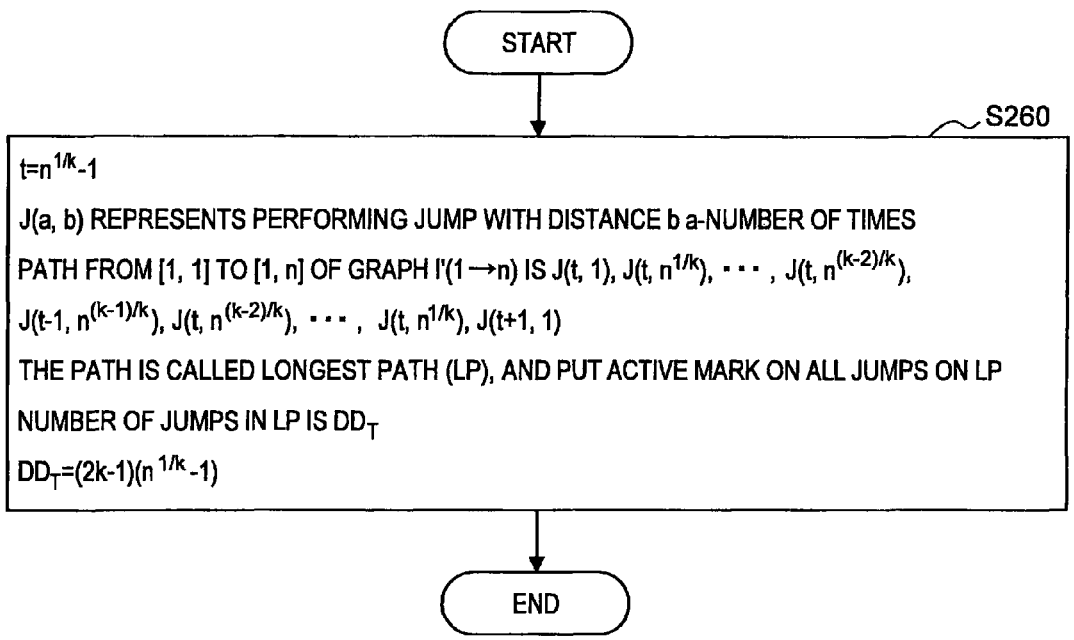
FIG. 23 A flowchart showing a directed graph generation method (LP determination) according to the embodiment.

Referring first to FIG. 23, the step of extracting the longest directed path LP (S260) is described hereinafter. Prior to description of the longest directed path LP, two expressions are defined as follows.

DDT: indicating the length of the longest directed path LP.

J(a, b): indicating that a-number of successive directed edges having a length of b exist in a certain directed path.

The directed graph generation section 160 can calculate J(a, b) for each of the directed paths constituting the temporary directed graph I'. For example, considering the directed path P([1, 1], [1, n]) from the coordinate point [1, 1] to [1, n] of the temporary directed graph I'(1→n), the directed path P([1, 1], [1, n]) is represented as $J(n^{1/k}-1, n^{(k-1)/k}), J(n^{1/k}-1, n^{(k-2)/k}), \ldots, J(n^{1/k}, 1)$. In the case of the temporary directed graph I' generated by the temporary directed graph generation section 158 described above, the directed path LP is the directed path P([1, 1], [1, n]) constituting the temporary directed graph I'(1→n). The directed graph generation section 160 may extract the longest directed path LP or uniquely extracts the directed path P([1, 1], [1, n]) constituting the temporary directed graph I'(1→n), and, in some cases, the directed graph generation section 160 may calculate the length of all the directed paths constituting the temporary directed graph I' and select the longest directed path LP from them. At this time, the length DDT of the longest directed path LP is represented as $DDT=k*(n^{1/k}-1)$. After that, the directed graph generation section 160 sets the active mark indicating that it is valid to all the directed edges forming the longest directed path LP.

Figure 24:
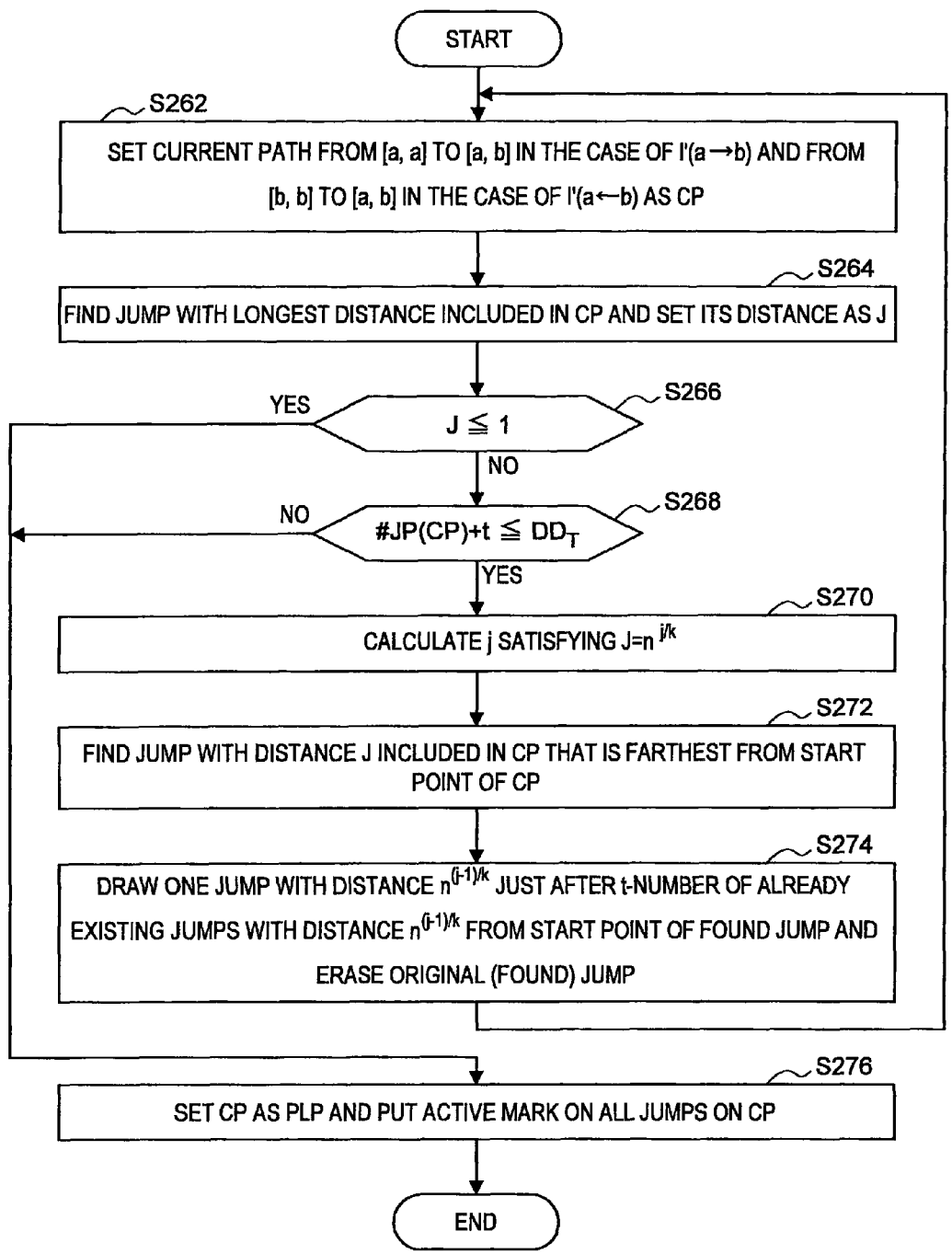
FIG. 24 A flowchart showing a directed graph generation method (PLP determination) according to the embodiment.

Next, the step of calculating the longest directed path PLP for each of the temporary directed graphs I' corresponding to the root node and the respective intermediate nodes (excluding the graph including the longest directed path LP) is described with reference to FIG. 24. FIG. 24 is a flowchart showing the calculation step of the directed path PLP.

Prior to description of the step of extracting the longest directed path PLP for each directed graph, the following two expressions are defined.

CP (Current Path): Directed path under consideration (which is called the current path)

JP(CP): The number of directed edges included in the directed path.

The directed graph generation section 160 extracts the directed path PLP based on the algorithm described below.

(Step 1) The directed graph generation section 160 determines the current path CP from the start point to the end point of the directed graph I'. If the directed graph under consideration is the directed graph I'(a→b), the directed path P([a, a], [a, b]) is set as the current path CP, and if it is the directed graph I'(a←b), the directed path P([b, b], [a, b]) is set as the current path CP (S262).

(Step 2) The directed graph generation section 160 extracts the longest directed edge among the directed edges forming the current path CP and sets its length as J (S264).

(Step 3) The directed graph generation section 160 decides whether J≦1 or not (S266), and if J≦1, it determines the current path CP as the directed path PLP and sets the active mark to all the directed edges forming the directed path PLP (S276).

(Step 4) If J>1, the directed graph generation section 160 decides whether $\#JP(CP)+n^{1/k}-1 \leqq DDT$ or not (S268), and if not $\#JP(CP)+n^{1/k}-1 \leqq DDT$, it determines the current path CP as the directed path PLP and sets the active mark to all the directed edges forming the directed path PLP (S276).

(Step 5) If $\#JP(CP)+n^{1/k}-1 \leqq DDT$, the directed graph generation section 160 calculates a natural number j satisfying $J=n^{j/k}$ (S270).

(Step 6) The directed graph generation section 160 extracts the directed edge that is farthest from the start point of the current path CP among the directed edges with a length of J forming the current path CP (S272).

(Step 7) The directed graph generation section 160 adds one directed edge with a length of $n^{(j-1)/k}$ just after the $n^{1/k}-1$ number of directed edges with a length of $n^{(j-1)/k}$ extending from the tail of the directed edge extracted in (Step 6), and removes the directed edge extracted in (Step 6) (S274). After that, it proceeds to (Step 1) and repeats the above-described steps.

The loop of the processing occurring in the above-described (Step 1) to (Step 6) ends when the directed path from the start point to the end point of the directed graph I' is made up of the directed edges all having a length of 1 or when the number of directed edges forming the directed path exceeds DDT if further replacement of the directed edges is performed. By the above processing, the longest directed path PLP for each directed graph can be set.

Figure 25:
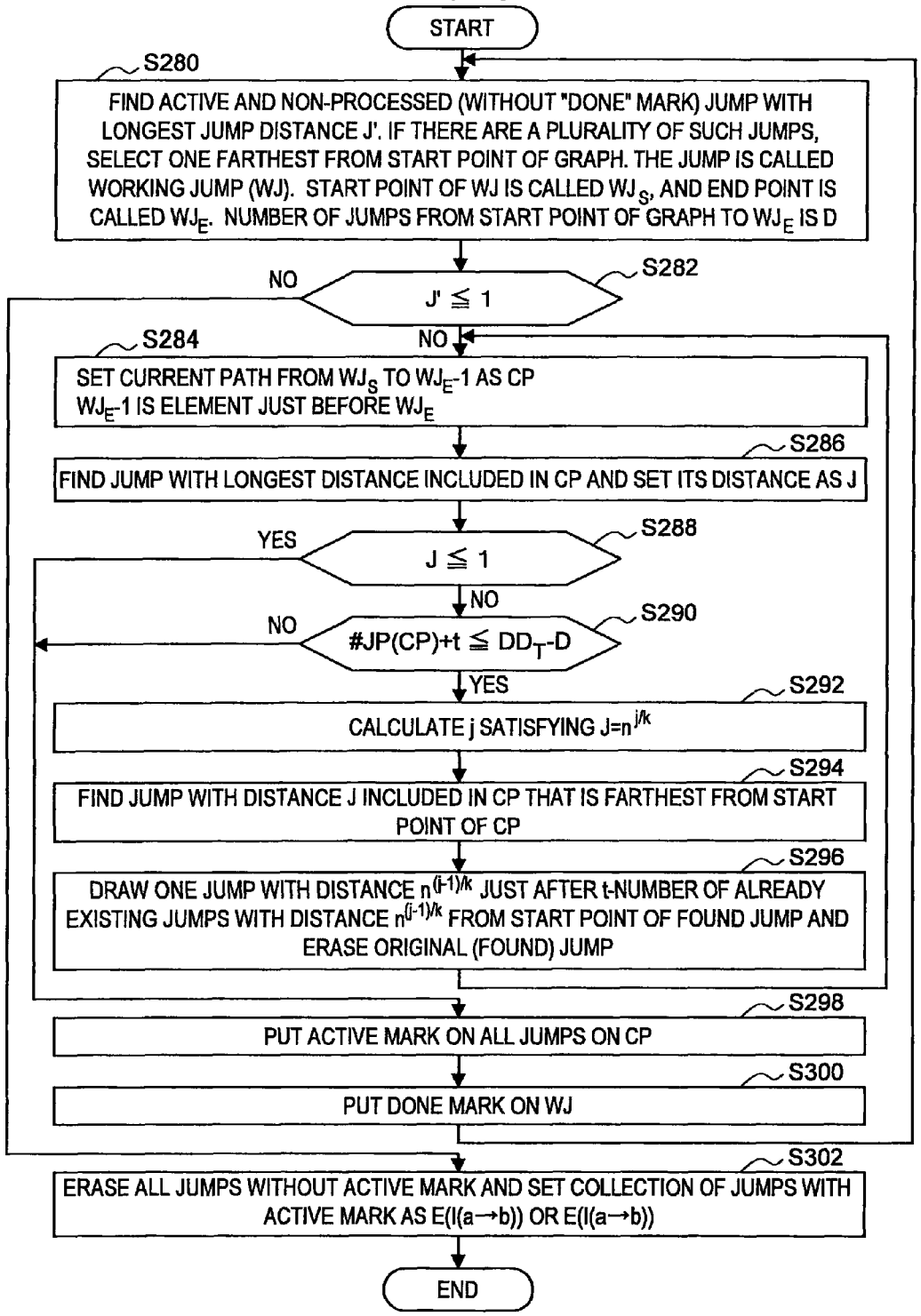
FIG. 25 A flowchart showing a directed graph generation method according to the embodiment.

Referring then to FIG. 25, the step of replacing a given directed edge is described hereinafter. In this step, an algorithm of processing to replace a given directed edge with a shorter directed edge is constructed for each directed graph under the condition that the number of directed edges forming the directed path does not exceed DDT.

The directed graph generation section 160 replaces a directed edge based on the following algorithm.

(Step 1) The directed graph generation section 160 extracts the directed edge which is set to active, is not yet processed (done is not set) and is the longest, among the directed edges constituting the directed graph I'. Further, the directed graph generation section 160 sets the length of the extracted directed edge as J'. If there are a plurality of directed edges with a length of J', the directed graph generation section 160 selects the directed edge that is farthest from the start point of the directed graph I' (S280). The selected directed edge is called WJ (Working Jump), the start point of the directed edge WJ is called WJS, and the end point is called WJE. Further, the number of directed edges forming the directed path that reaches WJS from the start point of the directed graph I' is denoted as D.

(Step 2) The directed graph generation section 160 decides whether the length J' of the directed edge WJ is $J' \leq 1$ (S282), and if $J' \leq 1$, it sets the directed graph that is made up only of the directed edges set to active as a desired directed graph I (S302). If $J' > 1$, it proceeds to (Step 3).

(Step 3) If the length J' of the directed edge WJ is $J' > 1$, the directed graph generation section 160 sets the directed path that reaches (WJE−1) from WJS as the current path CP (S284). (WJE−1) is a coordinate point just before WJE.

(Step 4) The directed graph generation section 160 extracts the longest directed edge among the directed edges forming the current path CP and sets its length as J (S286).

(Step 5) The directed graph generation section 160 decides whether the length J of the extracted directed edge is $J \leq 1$ (S288), and if $J \leq 1$, it sets active to all the directed edges forming the current path CP (S298) and sets done to the directed edge WJ (S300). After that, it starts again from the processing of (Step 1). (Step 6) If $J > 1$, the directed graph generation section 160 decides whether $\#JP(CP) + n^{1/k} - 1 \leq DDT - D$ or not (S290), and if $\#JP(CP) + n^{1/k} - 1 > DDT - D$, it sets active to all the directed edges forming the current path CP (S298) and sets done to the directed edge WJ (S300). After that, it starts again from the processing of (Step 1). (Step 7) If $\#JP(CP) + n^{1/k} - 1 \leq DDT - D$, the directed graph generation section 160 calculates a natural number j satisfying $J = n^{j/k}$ (S292).

(Step 8) The directed graph generation section 160 extracts the directed edge that is farthest from the start point of the current path CP among the directed edges with a length of J forming the current path CP (S294).

(Step 9) The directed graph generation section 160 adds one directed edge with a length of $n^{(j-1)/k}$ just after the $n^{1/k} - 1$ number of directed edges with a length of $n^{(j-1)/k}$ extending from the tail of the directed edge extracted in (Step 8), and removes the directed edge extracted in (Step 8) (S296). After that, it proceeds to (Step 3) and repeats the above-described steps.

The loop of the processing occurring in the above-described (Step 3) to (Step 9) ends when the directed path from WJS to WJE−1 is made up of the directed edges all having a length of 1 or when the number of directed edges forming the directed path from WJS to WJE−1 exceeds DDT if further replacement of the directed edges is performed. On the other hand, the loop of the processing occurring in the above-described (Step 1) to (Step 5) or (Step 6) ends when done is not set to any of the directed edges constituting the directed graph I' and there is no more directed edges with a length of 2 or longer. By the above processing, a desired directed graph I can be generated.

Figure 26:
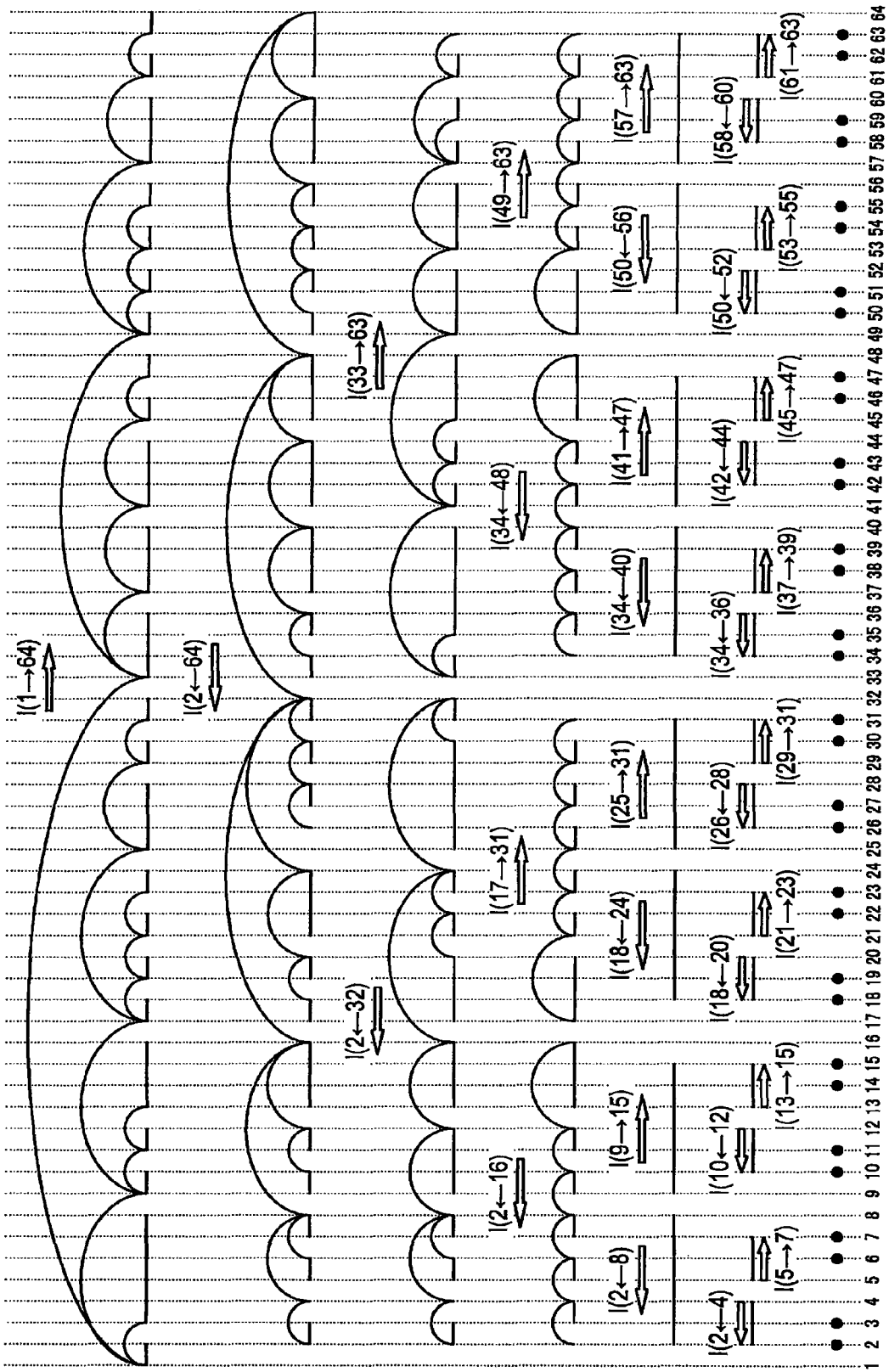
FIG. 26 An explanatory view showing one example of a directed graph (k=6) according to the embodiment.

Finally, an example of the directed graph I generated using the directed graph generation method described above is shown. FIG. 26 shows the directed graph I in the case of setting the parameter k=6 based on the complete binary tree with the number of leaf nodes n=64 shown in FIG. 3.

First, comparing the directed graph H (FIG. 4) generated based on the basic scheme and the directed graph I (FIG. 26) according to the embodiment, the following two points are obvious. (1) In the directed graph I, the number of directed edges with a length of 2 or longer decreases and the number of directed edges extending from one coordinate point decreases compared to the directed graph H. (2) The number of directed edges decreases for many directed paths on the directed graph I. Thus, it is confirmed that the directed graph I that enables reduction of the worst value of the amount of calculations necessary for generating the set key and reduction of the number of intermediate keys to be held by a user is generated.

In order to understand the effect of reducing the number of keys according to the embodiment more quantitatively, a comparison result between the basic scheme and the embodiment is shown in table format in FIG. 27. Referring to FIG. 27, the sum total of keys (the total number of keys) to be held by users and the average number of keys to be held by each user are reduced. Although the absolute value of the number of keys to be reduced is seemingly not so large because the above result is obtained in the implementation where the number n of users is as small as n=64, the effect of reduction is expected to appear as a significantly noticeable difference in the implementation environment because the number of users is larger in order of magnitude. Further, the worst value of the amount of calculations necessary for generating a set key is represented by the number of directed edges forming the longest directed path, and while the value is $(2k-1)*(n^{1/k}-1)$ in the directed graph H generated based on the basic scheme, it is reduced by half to $k*(n^{1/k}-1)$ in the directed graph I according to the embodiment.

The logic of generating the directed graph that enables reduction of the worst value of the amount of calculations necessary for generating a set key and reduction of the number of intermediate keys to be held by a user is described in the foregoing. Construction of the key generation logic (directed graph) described above is executed mainly by the key generation logic construction block constituting the key distribution server 152. However, in order to execute the encryption key distribution based on the above key generation logic, other elements are necessary. Thus, the other elements are described hereinafter with reference back to FIG. 19.

Referring back to FIG. 19, the key distribution server 152 includes the initial intermediate key setting section 162, the key generation section 164, the encryption section 166, the transmission section 168 and the subset determination section 170, in addition to the key generation logic construction block described above.

(Initial Intermediate Key Setting Section 162)

The initial intermediate key setting section 162 generates an intermediate key corresponding to the initial coordinate point of the directed graph I, for each directed graph I corresponding to each intermediate node of the tree. For example, the initial intermediate key setting section 162 may generate random numbers using the pseudo-random number generator and set the random numbers as each intermediate key corresponding to the above initial coordinate point (root) or may set given numerical values as each intermediate key.

(Key Generation Section 164)

For a certain directed edge constituting the directed graph I, when a given intermediate key assigned to the coordinate point indicated by the tail of the directed edge is input, the key generation section 164 outputs a set key corresponding to the coordinate point indicated by the tail of the directed edge and intermediate keys corresponding to the heads of all directed edges extending from the tail of the directed edge. Thus, the key generation section 164 corresponds to the PRSG of the basic scheme. However, the key generation section 164 is different from the PRSG of the basic scheme in that it outputs intermediate keys based on the directed graph I generated by the directed graph generation section 160. If the key generation section 164 is represented as being the same PRSG, when the intermediate key t(S0) corresponding to a certain coordinate point S0 of the directed graph I is input, it outputs the intermediate keys t(S1), t(S2), . . . , t(Sm) corresponding to the heads of the directed edges whose tails are at the coordinate point (corresponding to the subset S0) and the set key k(S0). Note that, m indicates the number of directed edges whose tails are at a certain coordinate point S0.

(Encryption Section 166)

The encryption section 166 encrypts the contents key using the set key. Although the number of the contents key is one, there are the same number of set keys as the number of subsets constituting the set system Φ. Therefore, the encryption section 166 encrypts the contents key using each set key corresponding to the subset selected by the subset determination section 170, which is described later, among all the subsets constituting the set system Φ. Thus, the encryption key 166 generates the encrypted contents keys corresponding to the respective set keys. Accordingly, if the number of selected subsets is m, the m-number of encrypted contents keys are generated. Alternatively, the encryption section 166 may encrypt contents. For example, the encryption section 166 may encrypt contents using the contents key or may encrypt contents using the respective set keys described above. The configuration that encrypts contents using the set key, however, is an alternative example of the embodiment.

(Transmission Section 168)

The transmission section 168 transmits the contents keys encrypted by the encryption section 166 to all users corresponding to the leaf nodes. Further, the transmission section 168 may distribute the intermediate key to each user by referring to the above-described directed graph I. At this time, the transmission section 168 may distribute the minimum necessary number of intermediate keys in such a way that each user can derive all the intermediate keys corresponding to the subsets to which it belongs. Specifically, the transmission section 168 may extract the subset to which a distribution destination user of the intermediate key belongs from the subsets constituting the set system Φ (cf. the above expression (1)), select a coordinate point such that the distribution destination user is not included in the subset corresponding to the tail of the directed edge reaching the coordinate point from the coordinate points of the directed graph I corresponding to the extracted subset, and distribute only the intermediate key corresponding to the selected coordinate point to the distribution destination user. If, however, the subset to which the distribution destination user of the intermediate key belongs corresponds to the initial coordinate point of the directed graph I, the transmission section 168 may distribute only the intermediate key corresponding to the initial coordinate point to the distribution destination user. Further, the transmission section 168 may function as a directed graph information distribution section that distributes information of the directed graph I to each user. Specifically, the transmission section 168 may distribute information related to a key generation algorithm (e.g. a key generation program) of the PRSG that outputs given intermediate key and set key based on the directed graph I upon input of each intermediate key.

Distribution of the intermediate key may be performed prior to distribution of contents, using a communication channel different from the one used for distribution of the contents. For example, the intermediate key for each terminal may be output from the key distribution server 152 and recorded on a recording medium, and the intermediate key for each terminal unit that is read from the recording medium may be stored into the corresponding terminal unit at the time of manufacturing the terminal in a manufacturing plant of the terminal unit.

(Subset Determination Section 170)

The subset determination section 170 determines a set (R) of excluded users for which decryption of the contents or the contents key should be disabled, and defines a set (N\R) of licensed users by eliminating the set (R) of excluded users from a set (N) of all users using a union of given subsets selected from the subsets corresponding to the coordinate points of the directed graph I, and then determines a group of subsets constituting the set (N\R) of licensed users in such a way that the number of subsets constituting the set (N\R) of licensed users is minimum. The subset determination section 170 may be composed of a licensed user set determination section for determining the set (N\R) of licensed users and a licensed user subset determination section for determining a group of subsets constituting the set (N\R) of licensed users.

After the subsets (S1, S2, . . . , Sm) that constitute the set of licensed users (N\R=S1∪S2∪ . . . ∪Sm; m is a natural number) are determined by the subset determination section 170 in the above way, the transmission section 168 distributes information indicating the set (N\R) of licensed users or the subsets (S1, S2, . . . , Sm) constituting the set (N\R) of licensed users to each user. Further, the encryption section 166 encrypts the contents or the contents key using the set keys corresponding to the subsets (S1, S2, . . . , Sm) determined by the subset determination section 170, and the transmission section 168 distributes the encrypted contents or contents keys to each user.

The configuration of the key distribution server 152 according to a preferred embodiment of the present invention is described in the foregoing. As described above, a feature of the embodiment is mainly the configuration of the key generation logic construction block. Particularly, the embodiment has a feature in the configuration of the directed graph generation section 160 for generating the directed graph that determines the key generation logic. The directed graph generation section 160 according to the embodiment can generate the key generation logic (directed graph) that enables reduction of the number of intermediate keys to be held by each user without increasing the amount of calculations necessary for each user to generate a set key. Consequently, it is possible to save the memory capacity necessary for each user to hold the intermediate keys and the amount of calculations for key generation and also reduce the distribution cost for distributing the intermediate keys to each user.

[Applications of the Encryption Key Distribution System 100]

Finally, applications of the above-described encryption key distribution system 100 are described hereinafter.

(Application 1)

First, as an application 1, the configuration of a broadcast encryption system 300 is shown in FIG. 28.

FIG. 28 is a block diagram showing the configuration of a broadcast encryption system using a broadcast satellite. In the broadcast encryption system 300, encrypted data (which is a so-called ciphertext) is transmitted to a receiver 310 through a broadcast channel. The broadcast channel in the broadcast encryption system 300 is a satellite broadcast distribution channel. The data transmitted as a ciphertext is contents containing an encryption key, audio data, video data, text data or the like, for example. A broadcast trusted center 304 in a satellite television broadcaster 302 transmits data to a broadcast satellite 306. The broadcast trusted center 304 selects a key for encryption or controls encryption of data and distribution of data, for example. The broadcast satellite 306 broadcasts data. The receiver 310 installed in a residence 308 includes a satellite broadcast receiver, for example, and receives the broadcasted data. A plurality of other receivers 310 can also receive the broadcasted data. In this way, the broadcast trusted center 304 can transmit data to each receiver 310 in a receiver group composed of receivers 310. As described later, the broadcast trusted center 304 encrypts broadcast data in such a way that only the authorized receiver 310 can decrypt the broadcasted data. Although FIG. 28 shows a broadcast system using the broadcast satellite 306, other broadcast channels may be used, such as a cable television and a computer network.

The configuration of the broadcast encryption system 300, which is one application of the encryption key distribution system 100, is described in the foregoing. Briefly summarizing the relationship with the encryption key distribution system 100, the broadcast trusted center 304 corresponds to the key distribution server 102, and the receiver 310 corresponds to the receiver 122. The broadcast satellite 306 mediates a network connecting them.

(Application 2)

Next, as an application 2, the configuration of a broadcast encryption system 400 is shown in FIG. 29.

FIG. 29 is a block diagram showing the configuration of a broadcast encryption system 400 using data media. In the broadcast encryption system 400, a broadcast channel is distribution of data media. A broadcast trusted center 404 in a media manufacturer 402 stores data in each article of data media of media 406 such as read-only media (e.g. CD-ROM, DVD-ROM etc.) and rewritable media (e.g. CD-RW, DVD-RW etc.). In the read-only media, the broadcast trusted center 404 records an encrypted contents key and encrypted contents, so that only an authorized user can decrypt data and access the encrypted contents (e.g. sounds, videos, texts etc.). On the other hand, in the rewritable media, the broadcast trusted center 404 records an encrypted contents key, so that only an authorized recording unit can record corresponding data into recording media. The media manufacturer 402 sends the media 406 to a distribution outlet 408 such as a retail store, for example. The distribution outlet 408 provides media 410 to a receiver 414 in a residence 412. For example, the distribution outlet 408 sells the media 410 to a person, and the person takes the media 410 to the residence 412 and inserts the media 410 into the receiver 414. For example, the receiver 414 may be a unit that reads and plays back data recorded in the media 410, such as a CD player, a DVD player and a computer. As another specific example, the receiver 414 may be a disk unit capable of recording data into the media 410 and reading data from the media 410, such as a DVD-RW drive. The broadcast trusted center 404 encrypts data in such a way that only the authorized receiver 414 can decrypt the encrypted data.

The configuration of the broadcast encryption system 400, which is one application of the encryption key distribution system 100, is described in the foregoing. Briefly summarizing the relationship with the encryption key distribution system 100, the broadcast trusted center 404 corresponds to the key distribution server 102, and the receiver 414 corresponds to the receiver 122. Further, in stead of a network connecting them, the distribution outlet 408 which distributes the media 406 and 410 exists as mediation.

Although a preferred embodiment of the present invention is described with reference to the drawings, the present invention is not limited thereto as a matter of course. It will be obvious to those skilled in the art that various changes and modifications may be made without departing from the scope of the claims and thus are intended for inclusion within the technological scope of the present invention.

For example, the above-described tree structure setting section 104 is assumed to form a tree structure in which branches become wider from top to bottom, it is not limited thereto, and a tree structure may be such that branches become wider from bottom to top, from left to right or from right to left. In such a case, it is necessary to change the definition of the subsets correlated with the respective intermediate nodes so as to fit it. However, the change is simply rotating the tree structure configured by the above-described tree structure setting section 104, and what is meant is completely the same in any case. Further, although the temporary directed graph generation section 108 and the directed graph generation section 110 construct the directed graphs I' and I by setting the coordinate axis from left to right or from right to left, this is the same for a change that reverses the left and the right. Specifically, although the parameters are defined on the basis of the vertical direction or the horizontal direction for convenience in the above description, based upon the common knowledge of general people or those skilled in the art, even if the tree structure or the directed graph is rotated or reversed to change the vertical and horizontal relationship, this is intended for inclusion within the completely identical technological scope.

For example, the temporary directed graph generation section 108 according to the embodiment of the present invention may generate the temporary directed graph based on another scheme, not only generating the temporary directed graph based on the above-described basic scheme. For example, the temporary directed graph may be a directed graph formed by simply combining a directed edge with a length of 1 and a directed edge with a length of 2, or a directed graph in which a longer directed edge is placed toward the position closer to or farther from the start point of the directed path. As a matter of course, it may be the temporary directed graph that is generated based on a more complicated logic than the above-described basic scheme. In this manner, the scope to which the basic concept of the present invention is applicable is not limited to the above-described basic scheme, but covers the directed graph generated by various schemes. As a matter of course, the information processing unit according to the embodiment may further include an acquisition section that acquires or receives a directed graph generated by another information processing unit and reconstruct the directed graph based on a given condition.

For example, the above-described tree structure setting section 154 is assumed to form a tree structure in which branches become wider from top to bottom, it is not limited thereto, and a tree structure may be such that branches become wider from bottom to top, from left to right or from right to left. In such a case, it is necessary to change the definition of the subsets correlated with the respective intermediate nodes so as to fit it. However, the change is simply rotating the tree structure configured by the above-described tree structure setting section 154, and what is meant is completely the same in any case. Further, although the temporary directed graph generation section 158 and the directed graph generation section 160 construct the directed graphs I' and I by setting the coordinate axis from left to right or from right to left, this is the same for a change that reverses the left and the right. Specifically, although the parameters are defined on the basis of the vertical direction or the horizontal direction for convenience in the above description, based upon the common knowledge of general people or those skilled in the art, even if the tree structure or the directed graph is rotated or reversed to change the vertical and horizontal relationship, this is intended for inclusion within the completely identical technological scope.

For example, the temporary directed graph generation section 158 according to the embodiment of the present invention may generate the temporary directed graph based on another scheme, not only capable of generating the temporary directed graph based on the above-described basic scheme. For example, the temporary directed graph may be a directed graph in which a longer directed edge is placed toward the position closer to or farther from the start point of the directed path. As a matter of course, it may be a temporary directed graph that is generated based on a more complicated logic than the above-described basic scheme. In this manner, the scope to which the basic concept of the present invention is applicable is not limited to the above-described basic scheme, but covers the directed graph generated by various schemes. Further, the information processing unit according to the embodiment may include an acquisition section that acquires a given directed graph. In this case, the information processing unit can generate a set key based on the acquired directed graph.

The invention claimed is:
1. An information processing unit, comprising:
a storage device; and
a processor coupled to the storage device, wherein the storage device stores a program for controlling the processor, and wherein the processor, being operative with the program, is configured to:
  obtain information associated with a temporary directed graph, the temporary directed graph comprising a plurality of directed edges, the directed edges forming a plurality of directed paths having corresponding path lengths;
  generate a modified temporary directed graph, based on at least a portion of the obtained information, wherein the processor is further configured to:
    identify a first one of the directed paths, the first directed path being associated with a maximum of the path lengths;
    determine a subset of the directed paths that fail to include a portion of the first directed path; and
    obtain a second directed path from the subset of directed paths, the second directed path being associated with a maximum of the path lengths of the subset; and
    modify the temporary directed graph by replacing the at least one of the directed edges with a shorter directed edge, the replacement being based on at least the path lengths of the first and second directed paths;
  establish a directed graph based on at least a portion of the modified temporary directed graph; and
  calculate at least one of a set key for encrypting or decrypting contents or a contents key, based on intermediate keys associated with the directed graph.

2. The information processing unit of claim 1, wherein the processor is further configured to replace the at least one directed edge constituting the temporary directed graph with the shorter directed edge so as not to exceed a maximum number of the successive directed edges among the plurality of directed edges of the temporary directed graph.

3. The information processing unit of claim 1, wherein in response to input of an intermediate key t(S) for a subset corresponding to a coordinate point in the directed graph, the processor is further configured to output a set key k(S) corresponding to a coordinate point and intermediate keys t(S1), t(S2), . . . , t(Sk) for coordinate points S1, S2, . . . , Sk at heads of the directed edges having tails at the coordinate point.

4. The information processing unit of claim 1, wherein in response to input of a set key k(S) for a subset corresponding to a coordinate point in the directed graph, the processor is further configured to output set keys k(S1), k(S2), . . . , k(Sk) for coordinate points S1, S2, . . . , Sk at heads of the directed edges having tails at a coordinate point.

5. The information processing unit of claim 1, wherein the processor is further configured to establish one or more random numbers as an intermediate key corresponding to a tail of the directed graph.

6. The information processing unit of claim 1, wherein the processor is further configured to encrypt at least one of contents or a contents key using the set key.

7. The information processing unit of claim 6, wherein the processor is further configured to transmit at least one of the encrypted contents or the encrypted contents key to terminal units correlated with one or more of a plurality of leaf nodes 1 to n of a binary tree.

8. The information processing unit of claim 7, wherein the processor is further configured to:
  define a subset of the leaf nodes 1 to n as Si;
  determine a set (N\R) of the terminal units allowed to decrypt the contents encrypted using the set key or the contents key; and
  determine m-number of subsets S1 to Sm satisfying the set (N\R)=S1∪S2∪ . . . ∪Sm.

9. The information processing unit of claim 8, wherein the processor is further configured to determine the subsets S1 to Sm so as to minimize the m.

10. The information processing unit of claim 8, wherein the processor is further configured to transmit at least one of information indicating the set (N\R) or information indicating the subsets S1 to Sm constituting the set (N\R) to the terminal units.

11. The information processing unit of claim 1, wherein the processor is further configured to position the shorter directed edge toward an end of at least one directed path composed of successive directed edges.

12. The information processing unit of claim 1, wherein the processor is further configured to decrypt at least one of contents or the content key using the set key.

13. The information processing unit of claim 12, wherein the processor is further configured to receive contents or a contents key encrypted using the set key from one or more leaf nodes of a binary tree.

14. The information processing unit of claim 13, wherein the processor is further configured to decrypt the received contents or contents key using one or more information processing units correlated with a first leaf node being an element of a set S including a second leaf node correlated with itself in a set Si defined as a subset of the leaf nodes.

15. An information processing unit, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j ($i \leq j$), it is assumed a set (i→j) is notated as $\{\{i\}, \{i, i+1\}, \ldots, \{i, i+1, \ldots, j-1, j\}\}$, and a set (i←j) is notated as $\{\{j\}, \{j, j-1\}, \ldots, \{j, j-1, \ldots, i+1, i\}\}$, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, the information processing unit comprising:
a storage device; and
a processor coupled to the storage device, wherein the storage device stores a program for controlling the processor, and wherein the processor, being operative with the program, is configured to:
a directed graph acquisition section to acquire a directed graph generated by replacing at least one of the directed edges constituting a temporary directed graph formed by arranging a plurality of directed edges with a length of $n^{i/k}$ (i=0, 1, . . . , x−1) on the first to fourth horizontal coordinate axes according to a natural number x satisfying $n^{(x-1)/k} < (rv-lv+1) \leq n^{x/k}$ for a given integer k, with a shorter directed edge; and
a key generation section to generate a set key for encrypting or decrypting contents or a contents key based on the directed graph acquired by the directed graph acquisition section.

16. An information processing unit, comprising:
a storage device; and
a processor coupled to the storage device, wherein the storage device stores a program for controlling the processor, and wherein the processor, being operative with the program, is configured to:
establish a binary tree made up of n-number of leaf nodes to which numbers 1 to n (n is a natural number) are assigned, a root node and a plurality of intermediate nodes different from the root node and the leaf nodes, and, defining a set (i→j) as $\{\{i\}, \{i, i+1\}, \ldots, \{i, i+1, \ldots, j-1, j\}\}$ and a set (i←j) as $\{\{j\}, \{j, j-1\}, \ldots, \{j, j-1, \ldots, i+1, i\}\}$ for natural numbers i and j ($i \leq j$), set a number assigned to a leaf node located at a left end as lv and a number assigned to a leaf node located at a right end as rv in a plurality of leaf nodes located lower than a certain intermediate node v or a certain root node v;
set a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left;
place one temporary coordinate point each on left of a coordinate point located at a left end of the first to fourth horizontal coordinate axes and on right of a coordinate point located at a right end of the second to fourth horizontal coordinate axes, and set a coordinate point located at a right end of the first horizontal coordinate axis as a temporary coordinate point;
generate temporary directed graphs respectively related to a set (1→n−1), the set (2←n), the set (lv+1←rv) and the set (lv→rv−1) by:
setting a given integer k:
calculating an integer x satisfying $n^{(x-1)/k} < (rv-lv+1) \leq n^{x/k}$; and
for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes;
generate a temporary directed graph related to the set (1→n) by adding a directed edge with a length of 1 having a head at the coordinate point located at the right end of the first horizontal coordinate axis to the temporary directed graph related to the set (1→n−1); and generate a directed graph by replacing the remaining directed edge with a shorter directed edge.

17. The information processing unit of claim 16, wherein the processor is further configured to generate a set key for encrypting contents or a contents key based on the directed graphs.

18. The information processing unit of claim 17, wherein in response to input of an intermediate key t(S) for a subset S corresponding to a certain coordinate point in the directed graph, the processor is further configured to output the set key k(S) corresponding to the subset S corresponding to the coordinate point and intermediate keys t(S1), t(S2), ..., t(Sk) for coordinate points S1, S2, ..., Sk at heads of the directed edges having tails at the coordinate point S.

19. The information processing unit of claim 17, wherein in response to input of a set key k(S) for a subset S corresponding to a certain coordinate point in the directed graph, the processor is further configured to output set keys k(S1), k(S2), ..., k(Sk) for coordinate points S1, S2, ..., Sk at heads of the directed edges having tails at the coordinate point S.

20. A terminal unit, comprising:

a storage device; and a processor coupled to the storage device, wherein the storage device stores a program for controlling the processor, and wherein the processor, being operative with the program, is configured to:

generate a set key for decrypting contents or a contents key based on a directed graph, wherein the processor is further configured to obtain the directed graph by:

configuring a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, ..., {i, i+1, ..., j−1, j}} and a set (i←j) as {{j}, {j, j−1}, ..., {j, j−1, ..., i+1, i}} for natural numbers i and j (i≦j), setting a number assigned to a leaf node located at a left end as lv and a number assigned to a leaf node located at a right end as rv in a plurality of leaf nodes located lower than a certain intermediate node v or a certain root node v;

setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left;

placing one temporary coordinate point each on left of a coordinate point located at a left end of the first to fourth horizontal coordinate axes and on right of a coordinate point located at a right end of the second to fourth horizontal coordinate axes, and setting a coordinate point located at a right end of the first horizontal coordinate axis as a temporary coordinate point;

generating temporary directed graphs respectively related to a set (1→n−1), the set (2←n), the set (lv+1←rv) and the set (lv→rv−1) by:

setting a given integer k;

calculating a natural number x satisfying $n^{(x-1)/k} < (rv-lv+1) \leq n^{x/k}$; and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes;

generating a temporary directed graph related to the set (1→n) by adding a directed edge with a length of 1 having a head at the coordinate point located at the right end of the first horizontal coordinate axis to the temporary directed graph related to the set (1→n−1);

determining the longest directed path with the maximum number of directed edges constituting the directed path among directed paths formed by the remaining directed edges; and replacing the directed edge constituting each directed path with a shorter directed edge in such a way that the number of directed edges of each directed path does not exceed the number of directed edges of the longest directed path.

21. The terminal unit of claim 20, wherein the processor is further configured to decrypt the encrypted contents or the encrypted contents key using the set key.

22. The terminal unit of claim 21, wherein the processor is further configured to decrypt the encrypted contents key using the set key and decrypts the encrypted contents using the decrypted contents key.

23. The terminal unit of claim 20, wherein in response to input of an intermediate key t(S) for a subset S corresponding to a certain coordinate point in the directed graph, the processor is further configured to output a set key k(S) corresponding to a coordinate point and intermediate keys t(S1), t(S2), ..., t(Sk) for subsets S1, S2, ..., Sk corresponding to coordinate points at heads of the directed edges having tails at the coordinate point.

24. The terminal unit claim 20, wherein in response to input of a set key k(S) for a subset S corresponding to a certain coordinate point in the directed graph, the processor is further configured to output section outputs set keys k(S1), k(S2), . . . , k(Sk) for coordinate points S1, S2, Sk at heads of the directed edges having tails at the coordinate point S.

25. The terminal unit of claim 20, when a subset of leaf nodes 1 to n of the tree is defined as Si, and when a set (N\R) of the terminal units allowed to decrypt the contents encrypted using the set key or the contents key is determined, m-number of subsets S1 to Sm satisfying the set (N\R)= S1∪S2∪ . . . ∪Sm are determined, and information indicating the set (N\R) or information indicating the subsets S1 to Sm constituting the set (N\R) is received, the processor is further configured to to decide whether the terminal unit belongs to any of the subsets S1 to Sm based on the received information and decide whether decryption of the encrypted contents is allowed based on the decision result.

26. The terminal unit of claim 25, wherein when it is decided that the terminal unit belongs to any of the subsets S1 to Sm, the processor is further configured to decrypt the contents or the contents key using the set key corresponding to the subset to which the terminal unit belongs.

27. A computer-implemented method, comprising:
   obtaining information associated with a temporary directed graph, the temporary directed graph comprising a plurality of directed edges, the directed edges forming a plurality of directed paths having corresponding path lengths;
   generating, using a processor, a modified temporary directed graph based on at least a portion of the obtained information, the generating comprising:
      identifying a first one of the directed paths, the first directed path being associated with a maximum of the path lengths;
      determining a subset of the directed paths that fail to include a portion of the first directed path;
      obtaining a second directed path from the subset of directed paths, the second directed path being associated with a path length that is a maximum of the path lengths of the subset; and
      modifying the temporary directed graph by replacing the at least one of the directed edges with a shorter directed edge, the replacement being based on at least the path lengths of the first and second directed paths;
   establishing a directed graph based on at least a portion of the modified temporary directed graph; and
   calculating, using the processor, at least one of a set key for encrypting or decrypting contents or a contents key for a user of a terminal, based on one or more intermediate keys associated with the directed graph.

28. The method of claim 27, wherein the intermediate keys correspond to intermediate users disposed along a directed path of the directed graph, the directed path being associated with the user and comprising the shorter directed edge.

29. A computer-implemented method, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≦j), it is assumed a set (i→j) is notated as {{i}, {i, i+1}, . . . , {i, i+1, . . . , j−1, j}}, and a set (i←j) is notated as {{j}, {j, j−1}, . . . , {i, j−1, . . . , i+1, i}}, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, the method comprising:
   obtaining information associated with a temporary directed graph, the temporary directed graph comprising a plurality of directed edges with lengths of $n^{i/k}$ (i=0, 1, . . . , x−1) on the first to fourth horizontal coordinate axes according to a natural number x satisfying $n^{(x-1)/k} < (rv-lv+1) \leq n^{x/k}$ for an integer k;
   generating, using a processor, a modified temporary directed graph based on at least a portion of the obtained information, the generating comprising:
      identifying a first one of the directed paths, the first directed path being associated with a maximum of the path lengths;
      determining a subset of the directed paths that fail to include a portion of the first directed path;
      obtaining a second directed path from the subset of directed paths, the second directed path being associated with a path length that is a maximum of the path lengths of the subset; and
      modifying the temporary directed graph by replacing the at least one of the directed edges with a shorter directed edge, the replacement being based on at least the path lengths of the first and second directed paths;
   establishing a directed graph based on at least a portion of the modified temporary directed graph; and
   calculating, using the processor, a set key for encrypting or decrypting contents or a contents key for a user of a terminal, based on one or more intermediate keys associated with the directed graph.

30. The method of claim 29, wherein the intermediate keys correspond to intermediate users disposed along a directed path of the directed graph, the directed path being associated with the user and comprising the shorter directed edge.

31. An information processing unit, comprising:
   a storage device; and
   a processor coupled to the storage device, wherein the storage device stores a program for controlling the processor, and wherein the processor, being operative with the program, is configured to:
      obtain information associated with a temporary directed graph, the temporary directed graph comprising a plurality of left-directed and right-directed edges, the directed edges forming a plurality of directed paths having corresponding path lengths;
      generate a modified temporary directed graph, based on at least a portion of the obtained information, wherein the processor is further configured to:
         identify a first one of the directed paths, the first directed path being associated with a maximum of the path lengths;
         determine a subset of the directed paths that fail to include a portion of the first directed path;

obtain a second directed path from the subset of directed paths, the second directed path being associated with a path length that is a maximum of the path lengths of the subset; and modify the temporary directed graph by replacing the at least one of the directed edges with a shorter directed edge, the replacement being based on at least the path lengths of the first and second directed paths;

generate a directed graph based on at least a portion of the modified temporary directed graph; and calculate at least one of a set key for encrypting or decrypting contents or a contents key, based on intermediate keys associated nodes of the directed graph.

32. The information processing unit of claim 31, wherein in response to input of an intermediate key t(S) for a subset corresponding to a coordinate point in the directed graph, the processor is further configured to output a set key k(S) corresponding to a coordinate point and intermediate keys t(S1), t(S2), . . . , t(Sk) for coordinate points S1, S2, . . . , Sk at heads of the directed edges having tails at the coordinate point.

33. The information processing unit of claim 31, wherein in response to input of a set key k(S) for a subset corresponding to a coordinate point in the directed graph, the processor is further configured to output set keys k(S1), k(S2), . . . , k(Sk) for coordinate points S1, S2, . . . , Sk at heads of the directed edges having tails at the coordinate point.

34. The information processing unit of claim 31, wherein the processor is further configured to encrypt contents or a contents key using the set key.

35. The information processing unit of claim 31, wherein the processor is further configured to transmit the encrypted contents or the encrypted contents key to terminal units correlated with one or more of a plurality of leaf nodes of a binary tree.

36. The information processing unit of claim 35, wherein the processor is further configured to:
define a subset of the leaf nodes 1 to n as Si;
determine a set (N\R) of the terminal units allowed to decrypt the contents encrypted using the set key or the contents key and
determine m-number of subsets S1 to Sm satisfying the set (N\R)=S1∪S2∪ . . . ∪Sm so as to minimize the m.

37. The information processing unit of claim 36, wherein the processor is further configured to transmit information indicating the set (N\R) or information indicating the subsets S1 to Sm constituting the set (N\R) to the terminal units.

38. The information processing unit of claim 31, wherein the processor is further configured to acquire the directed graph in which the directed edge is replaced in such a way that a shorter directed edge is placed toward an end of each directed path composed of the successive directed edges.

39. The information processing unit of claim 31, wherein the processor is further configured to decrypt contents or a content key using the set key.

40. The information processing unit of claim 31, wherein the processor is further configured to contents or a contents key encrypted using the set key from one or more leaf nodes of a binary tree.

41. The information processing unit of claim 40, wherein the encrypted contents or the encrypted contents key received by the reception section can be decrypted by one or more information processing units correlated with the leaf node being an element of a set S including the leaf node correlated with itself in a set Si defined as a subset of the leaf nodes 1 to n.

42. An information processing unit to process a temporary directed graph formed by arranging a plurality of directed edges with a length of $n^{i/k}$ (i=0, 1, . . . , x−1) on first to fourth horizontal coordinate axes according to a natural number x satisfying $n^{(x-1)/k} < (rv-lv+1) \leq n^{x/k}$ for a given integer k, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≦j), it is assumed a set (i→j) is notated as {{i}, {i, i+1}, . . . , {i, i+1, . . . , j−1, j}}, and a set (i←j) is notated as {{j}, {j, j−1}, . . . , {j, j−1, . . . , i+1, i}}, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, the information processing unit comprising:

a storage device; and
a processor coupled to the storage device, wherein the storage device stores a program for controlling the processor, and wherein the processor, being operative with the program, is configured to:
acquire the temporary directed graph;
generate a directed graph by leaving a longer directed edge among a plurality of directed edges constituting the temporary directed graph acquired by the temporary directed graph acquisition section;
determine a maximum number of the successive directed edges among the plurality of directed edges constituting the directed graph;
reconstruct the directed graph by replacing at least one directed edge constituting the directed graph with a shorter directed edge so as not to exceed the maximum number of the successive directed edges; and
generate a set key for encrypting contents or a contents key based on the directed graph reconstructed by the directed edge replacement section.

43. An information processing unit comprising:
a storage device; and
a processor coupled to the storage device, wherein the storage device stores a program for controlling the processor, and wherein the processor, being operative with the program, is configured to:
configure a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, . . . , {i, i+1, ..., j−1, j}} and a set (i←j) as {{j}, {j, j−1}, ..., {j, j−1, ..., i+1, i}} for natural numbers i and j (i≦j), set a number assigned to a leaf node located at a left end as lv and a number assigned to a leaf node located at a right end as rv in a plurality of leaf nodes located lower than a certain intermediate node v or a certain root node v;

set a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left;

place two temporary coordinate points each on right of a coordinate point located at a right end of the third horizontal coordinate axis and on left of a coordinate point located at a left end of the second and fourth horizontal coordinate axes;

set a coordinate point located at a right end of the first horizontal coordinate axis as a first temporary coordinate point and place a second temporary coordinate point on right of the first temporary coordinate point;

generate temporary directed graphs respectively related to a set (1→n−1), the set (2←n), the set (lv+1←rv) and the set (lv→rv−1) by setting a given integer k;

calculate an integer x satisfying $n^{(x-1)/k} < (rv-lv+1) \leq n^{x/k}$, and for each of integer i=0 to x−1, form a directed path having a tail at a leftmost coordinate point on the first and third horizontal coordinate axes by coupling one or a plurality of rightward directed edges with a length of $n^{i/k}$, form a directed path having a tail at a rightmost coordinate point on the second and fourth horizontal coordinate axes by coupling one or a plurality of leftward directed edges with a length of $n^{i/k}$, exclude all directed edges having tails or heads at the temporary, coordinate points for each of the first to fourth horizontal coordinate axes, and exclude directed edges other than the longest directed edge from the directed edges reaching each coordinate point on the first to fourth horizontal coordinate axes;

generate a temporary directed graph related to the set (1→n) by adding a directed edge with a length of 1 having a head at the first temporary coordinate point on the first horizontal coordinate axis to the temporary directed graph related to the set (1→n−1);

determine the longest directed path with the maximum number of directed edges constituting the directed path among the directed paths formed by the successive directed edges; and generate a directed graph by replacing the directed edge constituting each directed path with a shorter directed edge in such a way that the number of directed edges of each directed path does not exceed the number of directed edges of the longest directed path.

44. The information processing unit of claim 43, wherein the processor is further configured to generate a set key for encrypting contents or a contents key based on the directed graphs.

45. The information processing unit of claim 44, wherein in response to input of an intermediate key t(S) for a subset corresponding to a coordinate point in the directed graph, the processor is further configured to output a set key k(S) corresponding a coordinate point and intermediate keys t(S1), t(S2), ..., t(Sk) for coordinate points S1, S2, ..., Sk at heads of the directed edges having tails at the coordinate point.

46. The information processing unit of claim 44, wherein in response to input of a set key k(S) for a subset corresponding to a coordinate point in the directed graph, the processor is further configured to output set keys k(S1), k(S2), ..., k(Sk) for coordinate points S1, S2, ..., Sk at heads of the directed edges having tails at the coordinate point.

47. A terminal unit comprising:
a storage device; and
a processor coupled to the storage device, wherein the storage device stores a program for controlling the processor, and wherein the processor, being operative with the program, is configured to:
generate a set key for decrypting contents or a contents key based on a directed graph, wherein the directed graph is obtained by:
configuring a binary tree made up of n-number of leaf nodes to which numbers 1 to n (n is a natural number) are assigned, a root node and a plurality of intermediate nodes different from the root node and the leaf nodes, and, defining a set (i→j) as {{i}, {i, i+1}, ... {i, i+1, ..., j−1, j}} and a set (i←j) as {{j}, {j, j−1}, ..., {j, j−1, ..., i+1, i}} for natural numbers i and j (i≦j), setting a number assigned to a leaf node located at a left end as lv and a number assigned to a leaf node located at a right end as rv in a plurality of leaf nodes located lower than a certain intermediate node v or a certain root node v;

setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1→rv) and arranged on a horizontal coordinate axis with a degree of inclusion increasing from right to left;

placing two temporary coordinate points each on right of a coordinate point located at a right end of the third horizontal coordinate axis and on left of a coordinate point located at a left end of the second and fourth horizontal coordinate axes;

setting a coordinate point located at a right end of the first horizontal coordinate axis as a first temporary coordinate point and placing a second temporary coordinate point on right of the first temporary coordinate point;

generating temporary directed graphs respectively related to a set (1→n−1), the set (2←n), the set (lv+1←rv) and the set (lv→rv−1) by:

setting a given integer k;

calculating an integer x satisfying $n^{(x-1)/k} < (rv-lv+1) \leq n^{x/k}$; and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than the longest directed edge from the directed edges reaching each coordinate point on the first to fourth horizontal coordinate axes;

generating a temporary directed graph related to the set (1→n) by adding a directed edge with a length of 1 having a head at the first temporary coordinate point on the first horizontal coordinate axis to the temporary directed graph related to the set (1→n−1);

determining the longest directed path with the maximum number of directed edges constituting the directed path among directed paths formed by the successive directed edges and replacing the directed edge constituting each directed path with a shorter directed edge in such a way that the number of directed edges of each directed path does not exceed the number of directed edges of the longest directed path.

48. The information processing unit of claim 47, wherein in response to input of an intermediate key t(S) for a subset corresponding to a coordinate point in the directed graph, the processor is further configured to output a set key k(S) corresponding to a coordinate point and intermediate keys t(S1), t(S2), . . . , t(Sk) for coordinate points S1, S2, . . . , Sk at heads of the directed edges having tails at the coordinate point.

49. The terminal unit of claim 48, wherein the processor is further configured to decrypt the encrypted contents key using the set key and decrypt the encrypted contents using the decrypted contents key.

50. The terminal unit according to claim 49, when a subset of leaf nodes 1 to n of the tree is defined as Si, and when a set (N\R) of the terminal units allowed to decrypt the contents encrypted using the set key or the contents key is determined, m-number of subsets S1 to Sm satisfying the set (N\R)= S1∪S2∪ . . . ∪Sm are determined, and information indicating the set (N\R) or information indicating the subsets S1 to Sm constituting the set (N\R) is received, a decision section to decide whether the terminal unit belongs to any of the subsets S1 to Sm based on the received information and decide whether decryption of the encrypted contents is allowed based on the decision result, wherein when it is decided that the terminal unit belongs to any of the subsets S1 to Sm, the processor is further configured to decrypt the contents or the contents key using the set key corresponding to the subset to which the terminal unit belongs.

51. The terminal unit of claim 47, wherein in response to input of a set key k(S) for a subset corresponding to a coordinate point in the directed graph, the processor is further configured to output set keys k(S1), k(S2), . . . , k(Sk) for coordinate points S1, S2, . . . , Sk at heads of the directed edges having tails at the coordinate point.

52. A computer-implemented method, comprising:

obtaining information associated with a directed graph, the temporary directed graph comprising a plurality of left-directed and right-directed edges, the directed edges forming a plurality of directed paths having corresponding path lengths;

generating, using a processor, a modified temporary directed graph based on at least a portion of the obtained information, the generating comprising:

identifying a first one of the directed paths, the first directed path being associated with a maximum of the path lengths;

determining a subset of the directed paths that fail to include a portion of the first directed path;

obtaining a second directed path from the subset of directed paths, the second directed path being associated with a path length that is a maximum of the path lengths of the subset; and modifying the directed graph by leaving longer directed edges among the plurality of directed edges constituting the temporary directed graph and replacing at least one of the left-directed edges with a shorter directed edge, the replacement being based on the path lengths of the first and second directed paths;

establishing a directed graph based on at least a portion of the modified temporary directed; and calculating at least one of a set key for encrypting or decrypting contents or a contents key, based on one or more intermediate keys associated with the directed graph.

53. The method of claim 52, wherein the intermediate keys corresponding to intermediate users disposed along a directed path of the directed graph, the directed path being associated with the user and comprising the shorter directed edge.

* * * * *